US012751366B2

(12) United States Patent
Barnett et al.

(10) Patent No.: US 12,751,366 B2
(45) Date of Patent: Oct. 6, 2026

(54) FLEXING HEADER WITH FLOAT SYSTEM

(71) Applicant: MACDON INDUSTRIES LTD, Winnipeg (CA)

(72) Inventors: Neil Barnett, LaSalle (CA); Cyrus Nigon, Deforest, WI (US); Reid Christ, Evansville, WI (US); Karl Hundt, Lake Mills, WI (US); Scott Dietsche, Colfax, WI (US)

(73) Assignee: MACDON INDUSTRIES LTD, Winnipeg (CA)

( * ) Notice: Subject to any disclaimer, the term of this patent is extended or adjusted under 35 U.S.C. 154(b) by 431 days.

(21) Appl. No.: 18/284,874

(22) PCT Filed: Mar. 29, 2022

(86) PCT No.: PCT/US2022/022317

§ 371 (c)(1),
(2) Date: Sep. 29, 2023

(87) PCT Pub. No.: WO2022/212355

PCT Pub. Date: Oct. 6, 2022

(65) Prior Publication Data

US 2024/0180078 A1 Jun. 6, 2024

Related U.S. Application Data

(60) Provisional application No. 63/167,194, filed on Mar. 29, 2021.

(51) Int. Cl.
*A01D 41/14* (2006.01)
*A01D 45/02* (2006.01)

(52) U.S. Cl.
CPC ......... *A01D 41/144* (2013.01); *A01D 41/141* (2013.01); *A01D 45/021* (2013.01)

(58) Field of Classification Search
CPC .. A01D 41/144; A01D 41/141; A01D 45/021; A01D 41/145; A01D 75/287
See application file for complete search history.

(56) References Cited

U.S. PATENT DOCUMENTS 4,441,307 A * 4/1984 Enzmann .............. A01D 41/14 56/208
4,487,004 A 12/1984 Kejr
(Continued)

FOREIGN PATENT DOCUMENTS

CA 3012682 A1 * 1/2019 ............. A01D 34/22
CA 3040217 A1 * 2/2020 ........... A01D 41/141
(Continued)

*Primary Examiner* — Arpad Fabian-Kovacs
(74) *Attorney, Agent, or Firm* — Miller Canfield

(57) ABSTRACT

A row crop header for harvesting crop in a field comprises a header frame having a center section and a pair of side wing sections operatively coupled to the center section. An upper link is pivotally coupled between the center section and each one of the side wing sections adjacent the top portion thereof. A lower link is pivotally coupled between the center section and each one of the side wing sections adjacent the bottom portion thereof. The upper links and lower links provide independent pivotal movement of the side wing sections relative to the center section to contour to the surface of the field of crops to be harvested. An automatic float system is operatively coupled between the center section and each one of the side wing sections to adjust the weight of the side wing sections on the surface of the field and allow the side wing sections to float relative to the center section.

20 Claims, 69 Drawing Sheets

(56) References Cited

U.S. PATENT DOCUMENTS

| | | | | |
|---|---|---|---|---|
| 4,573,308 | A * | 3/1986 | Ehrecke | A01D 41/14 56/15.8 |
| 5,724,798 | A * | 3/1998 | Stefl | A01D 41/144 56/119 |
| 6,289,659 | B1 * | 9/2001 | Fox | A01D 46/08 56/DIG. 3 |
| 7,614,206 | B2 * | 11/2009 | Tippery | A01D 41/144 56/15.8 |
| 8,635,842 | B2 | 1/2014 | Markt | |
| 8,919,086 | B2 | 12/2014 | Markt | |
| 9,072,222 | B2 | 7/2015 | Bomleny et al. | |
| 9,144,199 | B2 * | 9/2015 | Ritter | A01D 41/14 |
| 9,198,349 | B2 | 12/2015 | Ritter et al. | |
| 9,198,353 | B2 | 12/2015 | Ritter et al. | |
| 9,198,355 | B2 | 12/2015 | Heim et al. | |
| 9,538,709 | B2 * | 1/2017 | Bassett | A01D 89/002 |
| 9,801,343 | B2 | 10/2017 | Markt | |
| 9,992,924 | B2 * | 6/2018 | van Vooren | A01D 41/144 |
| 9,999,178 | B2 * | 6/2018 | Leiston | A01D 89/003 |
| 10,070,575 | B2 * | 9/2018 | Wenger | A01B 73/06 |
| 10,433,483 | B2 * | 10/2019 | Cook | A01B 73/06 |
| 10,531,607 | B2 * | 1/2020 | Schroeder | A01D 41/141 |
| 10,568,266 | B2 * | 2/2020 | Vandeven | A01D 41/145 |
| 10,609,865 | B2 | 4/2020 | Markt | |
| 10,765,066 | B2 * | 9/2020 | Schulze Selting | A01D 41/145 |
| 10,993,371 | B2 | 5/2021 | Markt | |
| 12,096,718 | B2 * | 9/2024 | Laugen | A01D 41/141 |
| 2007/0186532 | A1 * | 8/2007 | Mossman | A01D 41/14 56/119 |
| 2007/0204585 | A1 | 9/2007 | Lovett et al. | |
| 2014/0033670 | A1 * | 2/2014 | Cressoni | A01D 45/021 56/104 |
| 2019/0029174 | A1 * | 1/2019 | Talbot | A01D 41/148 |
| 2019/0110404 | A1 | 4/2019 | Vandeven et al. | |
| 2020/0000033 | A1 * | 1/2020 | Shearer | A01D 41/141 |
| 2020/0229345 | A1 | 7/2020 | Markt | |
| 2020/0390035 | A1 * | 12/2020 | Hunt | A01D 41/141 |
| 2021/0153434 | A1 * | 5/2021 | Hunt | A01D 41/127 |
| 2022/0279719 | A1 * | 9/2022 | Hunt | A01D 41/141 |

FOREIGN PATENT DOCUMENTS

| | | | | |
|---|---|---|---|---|
| CA | 2974643 | C * | 8/2020 | A01B 63/11 |
| EP | 3586598 | | 1/2020 | |
| RU | 2529576 | C1 | 9/2014 | |
| SU | 0993869 | A1 | 2/1983 | |
| SU | 998862 | A1 | 2/1983 | |
| WO | 2020097229 | | 5/2020 | |
| WO | WO-2020101886 | A1 * | 5/2020 | A01D 41/141 |

* cited by examiner

FLEXING HEADER WITH FLOAT SYSTEM

CROSS-REFERENCE TO RELATED APPLICATIONS

This application claims priority to U.S. Provisional Application No. 63/167,194, filed Mar. 29, 2021.

BACKGROUND OF THE INVENTION

1. Field of the Invention

The present invention relates to a row crop harvesting header, and more particularly, to a row crop header having a center section and independently pivotal side wing sections operatively coupled to opposite sides of the center section for following the contour of the field of crops to be harvested.

2. Description of Related Art

Headers for harvesting row crops, such as corn, are known in the art. Typical headers for harvesting row crops include a header frame that may either be limitedly pivotable or flexible for helping contour to a field as the header is moved across the field for harvesting the row crops. However, these headers known in the art are generally not designed or optimized for harvesting on farmable terraces, which are common near large river basins such as the Mississippi River and the Missouri River due to steep hillsides present there. The farmable terraces typically have 15 to 25 foot "back-slopes" cut into them, thereby separating the steep hillside into smaller sections to control water erosion, among other reasons. Typical headers, especially as farming equipment has grown larger for increased harvesting efficiency, are generally unable to fit into the existing back-slopes of the farmable terraces or contour to the numerous sections of the farmable terraces. Operators may therefore be forced to hang a portion of the header over an edge of the back-slope or buy a smaller, specialized header specifically for harvesting on the back-slopes, which could compromise harvesting efficiency.

SUMMARY OF THE INVENTION

A row crop header for harvesting crop in a field comprises a header frame extending between opposite ends. The header frame includes a center section adapted to removably couple the header to a harvester and a pair of side wing sections operatively coupled to the center section. The center section includes a top portion and a bottom portion extending laterally between a pair of opposing side edges. Each of the side wing sections includes an upper support beam and lower support beam extending laterally between a pair of inner and outer support members. An upper link is pivotally coupled between the center section and each one of the side wing sections adjacent the top portion and upper support beam. A lower link is pivotally coupled between the center section and each one of the side wing sections adjacent the bottom portion and lower support beam. The upper links and lower links provide independent pivotal movement of the side wing sections relative to the center section to contour to the surface of the field.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
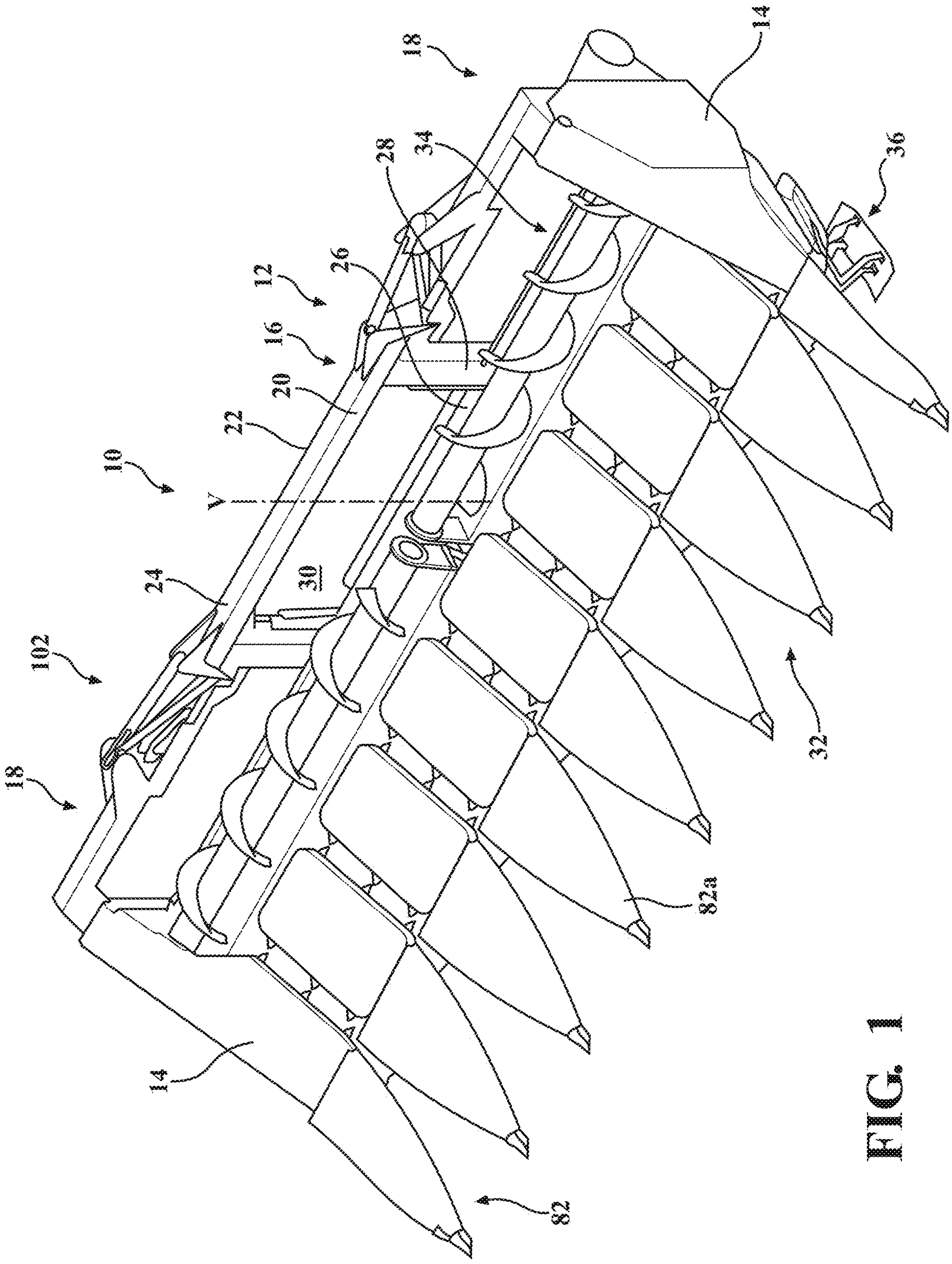
FIG. 1 is a perspective view of a header for harvesting row crops according to a first embodiment of the present invention.
Figure 2:
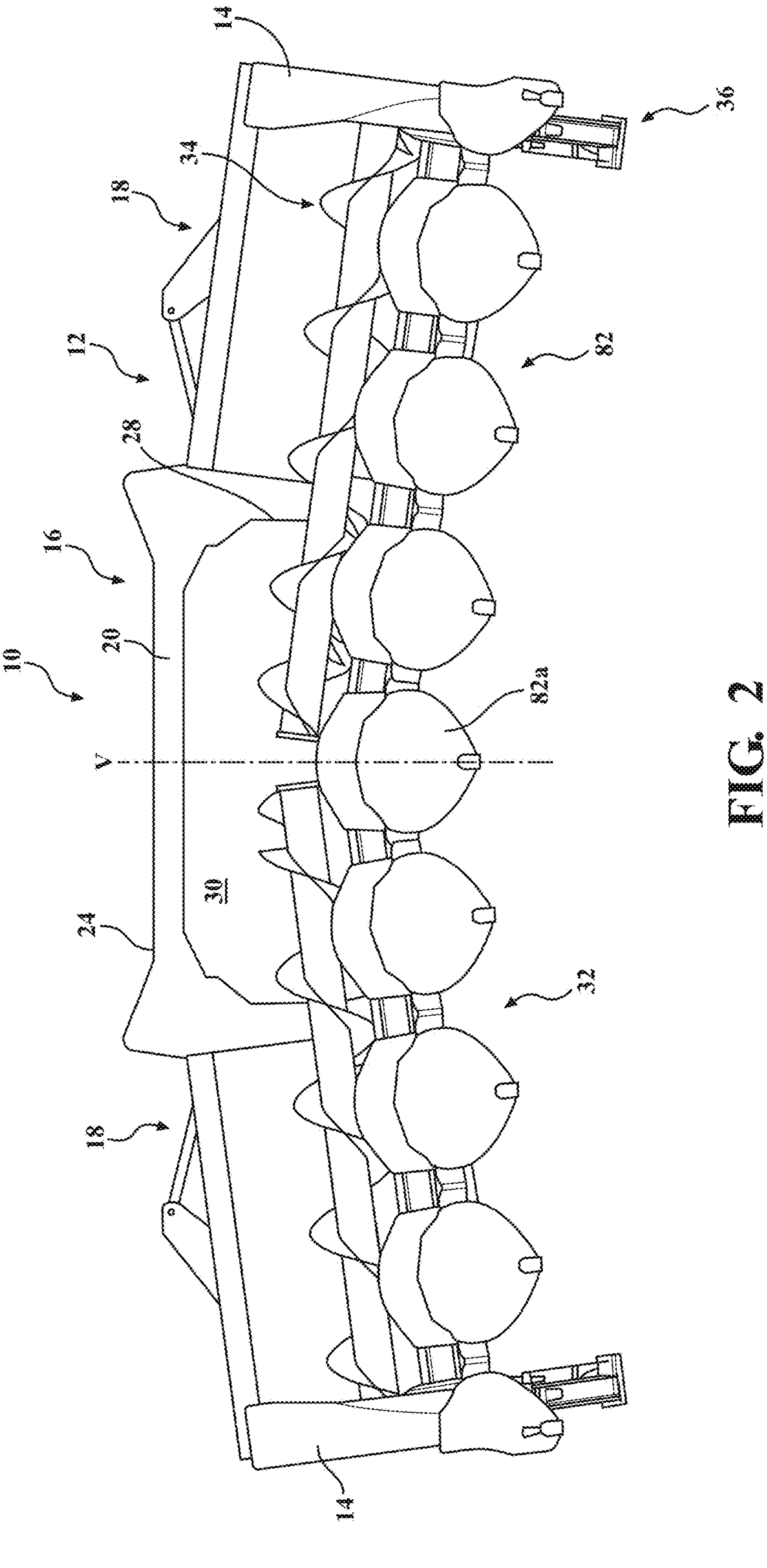
FIG. 2 is a front view of the header of FIG. 1 showing a pair of side wing sections of a header frame pivoting downwardly relative to a center section of the header frame.
Figure 3:
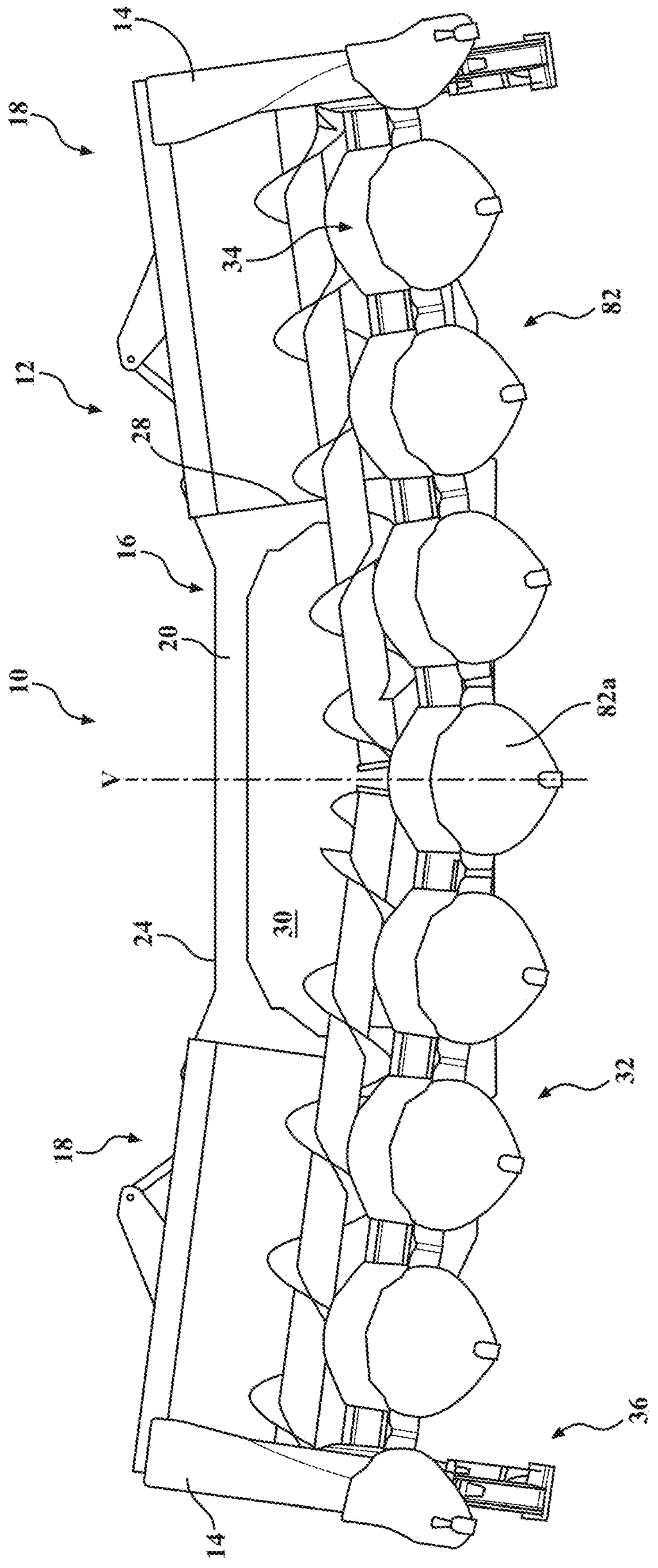
FIG. 3 is a front view of the header of FIG. 1 showing the side wing sections of the header frame pivoting upwardly relative to the center section of the header frame.

Referring to the Figures, wherein like numerals indicate like or corresponding parts throughout the several views, a header for harvesting row crops, especially corn, is shown generally at 10. The header 10 includes a header frame 12 extending laterally between opposing ends 14 with a center section 16 and a pair of side wing sections 18 pivotally coupled thereto, where a vertical line V bisects the header frame 12 substantially equidistant between the ends 14 thereof. The center section 16 has a front-facing side 20 and a rear-facing side 22 and includes a top portion 24 and a bottom portion 26 extending laterally between a pair of opposing edges 28, as shown in FIG. 1. The center section 16 of the header frame 12 is adapted for mounting to an agricultural implement or harvester, such as a combine, and remains substantially stationary relative to the agricultural implement during harvesting. The side wing sections 18 are independently pivotable upwardly and downwardly relative to the center section 16 of the header frame 12 to contour to a surface of a field as the header 10 is moved across the field for harvesting the row crops, as shown in FIGS. 2 and 3. An aperture 30 extends through the center section 16 of the header frame 12 between the front-facing and rear-facing sides 20, 22 thereof to transfer crops from the header 10 to the agricultural implement for collection or further processing. The header 10 further includes a crop cutting and conditioning system, shown generally at 32, operatively mounted on the header frame 12 between the ends 14 thereof for cutting, crimping, and conditioning the crops to be harvested. An auger assembly, shown generally at 34, is operatively coupled to the header frame 12 behind the crop cutting and conditioning system 32 and functions as a conveyor system to assist in transporting cut crops through the aperture 30. A skid shoe assembly 36 is further attached adjacent to each end 14 of the header frame 12 for setting and maintaining a cut height of the header 10 and engaging the surface of the field as the header 10 is moved across the field for harvesting the row crops.

Figure 4:
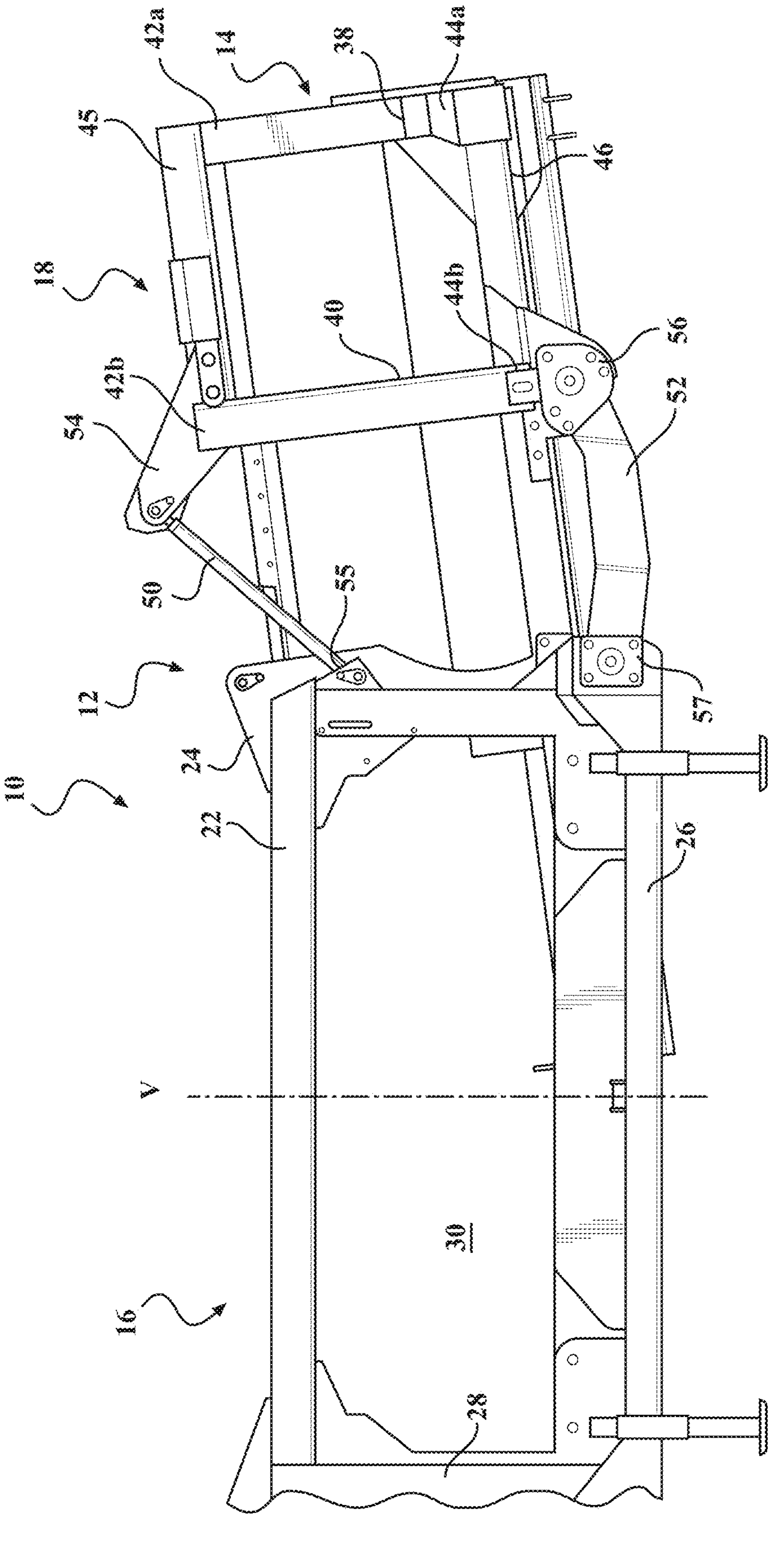
FIG. 4 is a fragmentary rear view of the header of FIG. 1.
Figure 5:
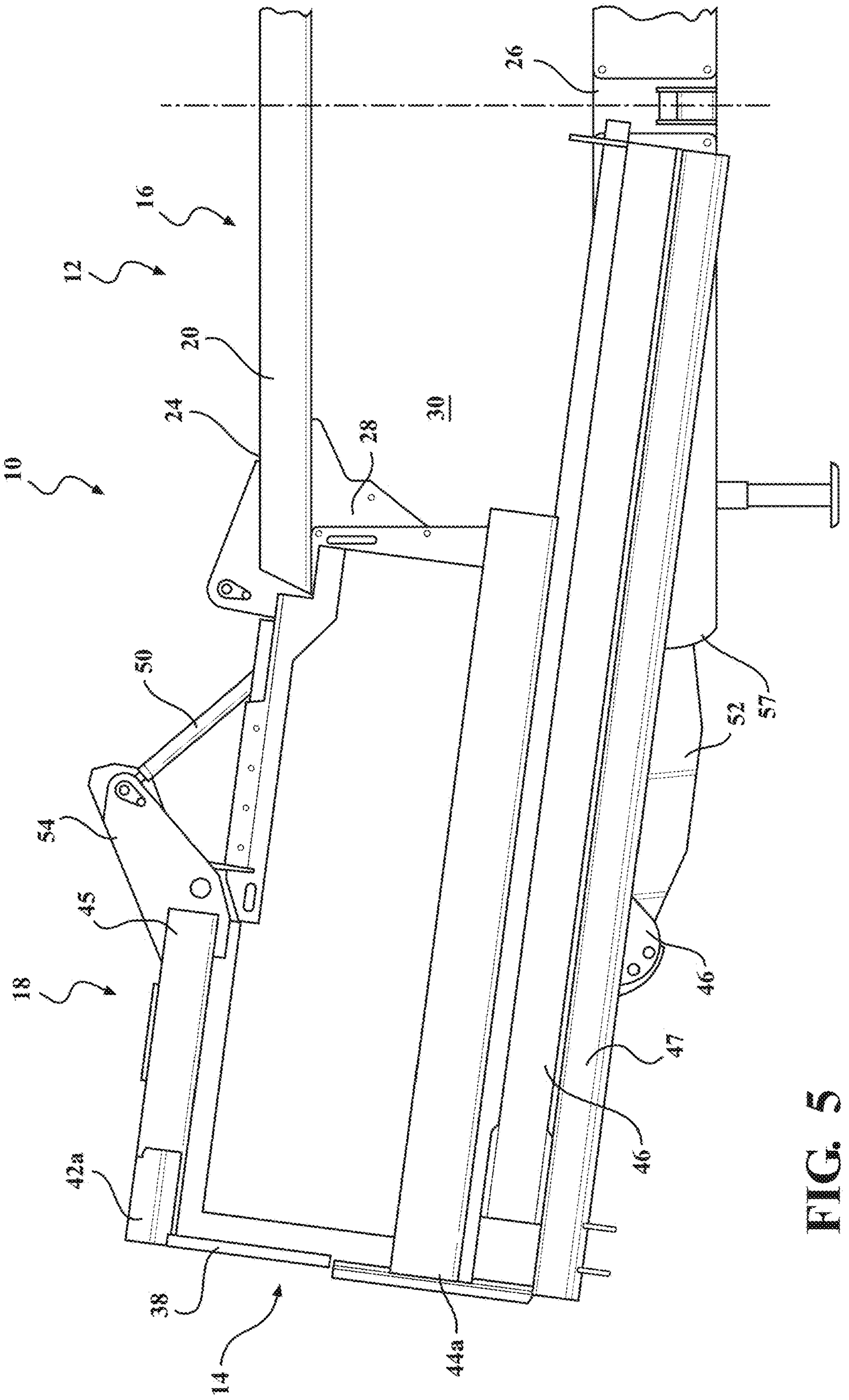
FIG. 5 is a fragmentary front view of the header of FIG. 1.
Figure 6:
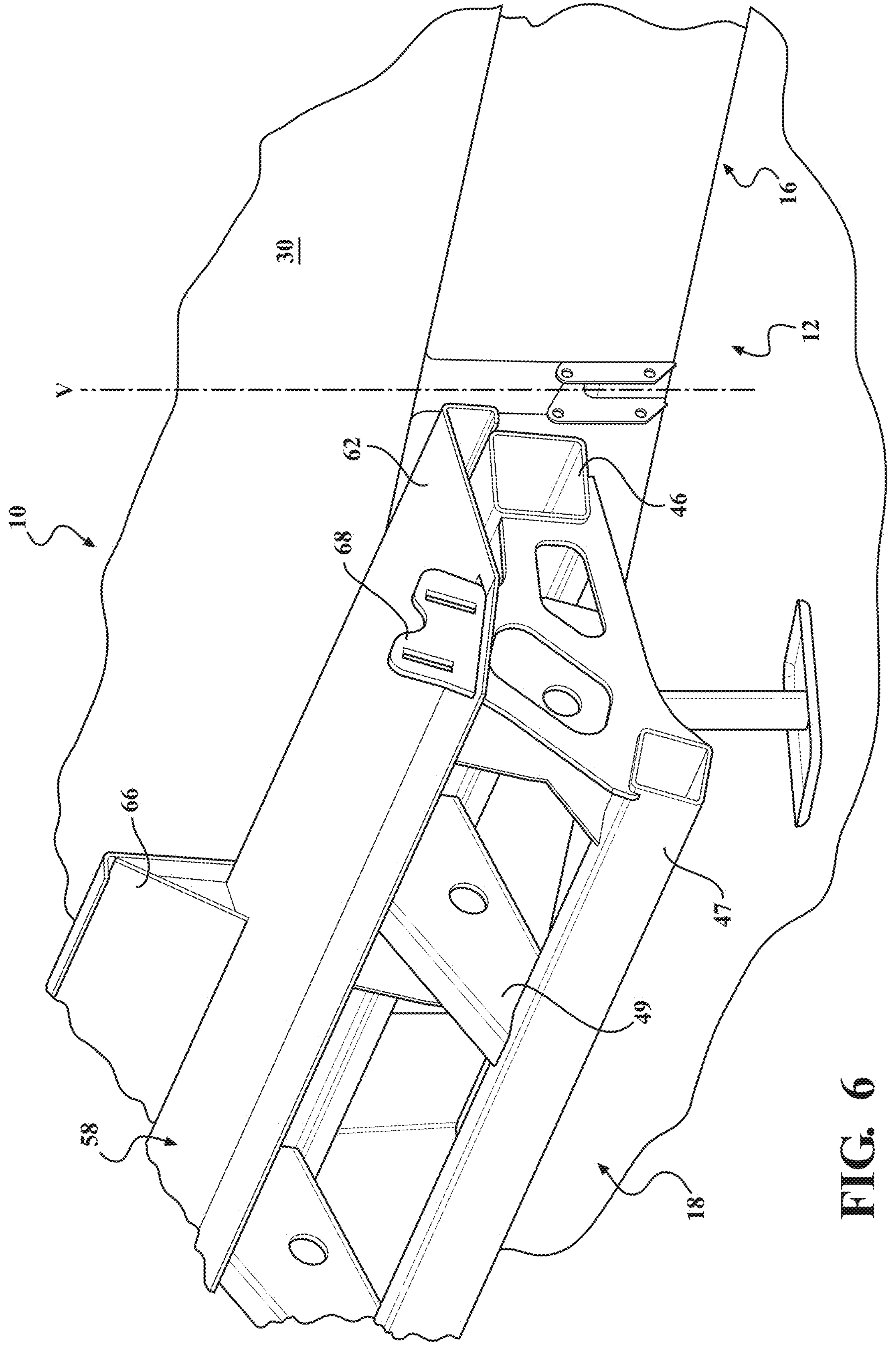
FIG. 6 is an enlarged fragmentary perspective view of the header of FIG. 1 showing one of the pair of side wing sections of the header frame.
Figure 7:
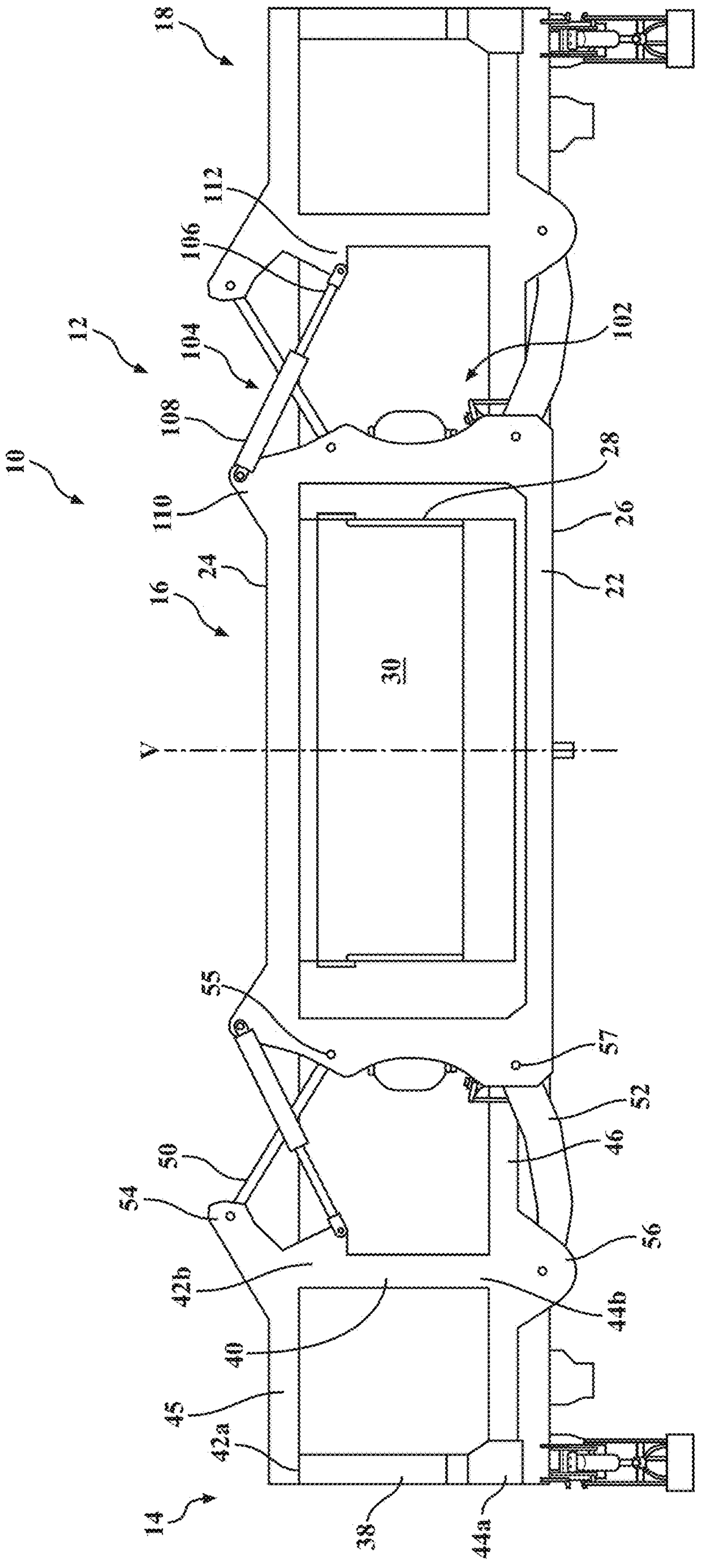
FIG. 7 is a rear view of the header of FIG. 1 showing a hydraulic float system and each of the side wing sections of the header frame level relative to the center section of the header frame.
Figure 8:
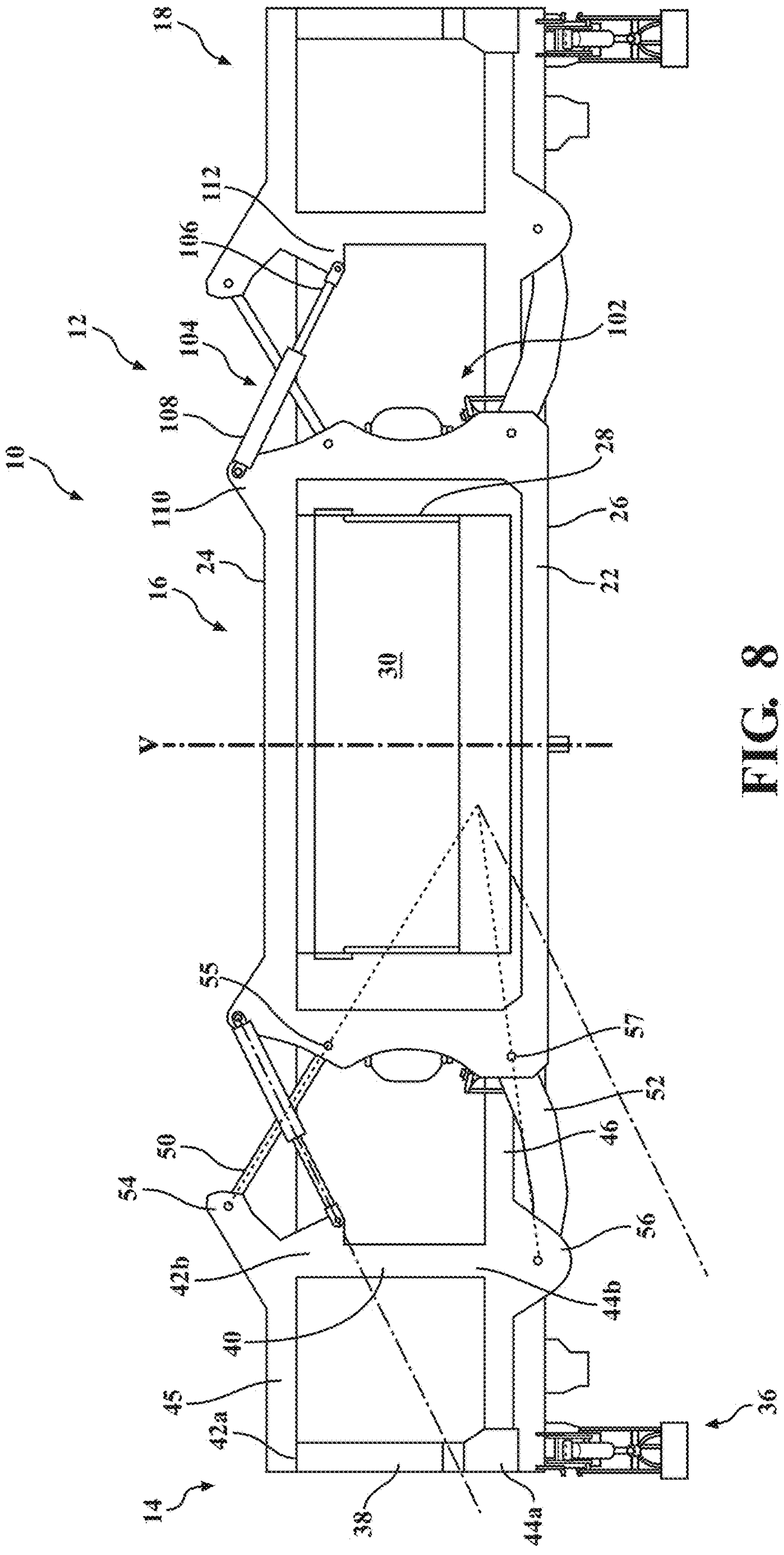
FIG. 8 is a rear view of the header of FIG. 1 further showing the hydraulic float system and each of the side wing sections of the header frame level relative to the center section of the header frame.
Figure 9:
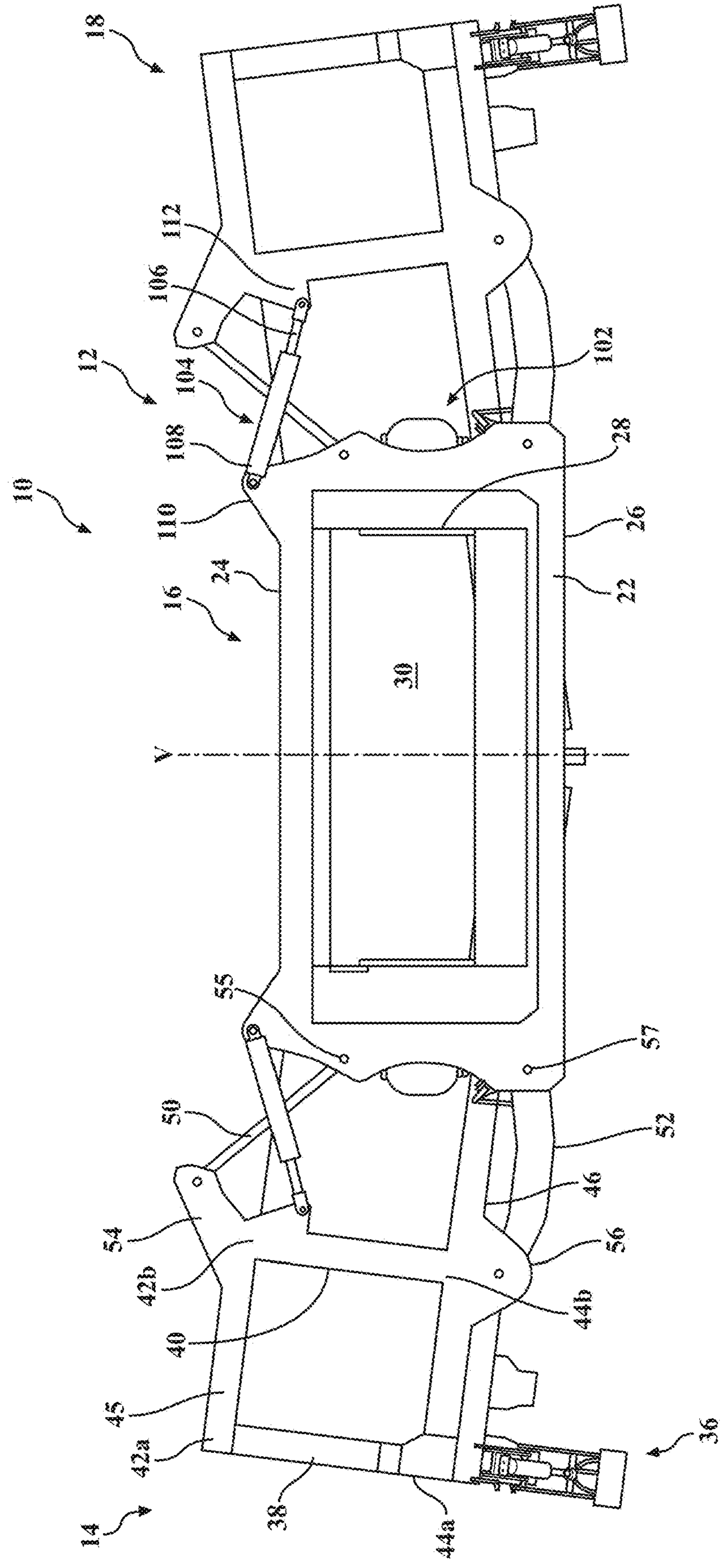
FIG. 9 is a rear view of the header of FIG. 1 showing the hydraulic float system and each of the side wing sections of the header frame pivoted upwardly relative to the center section of the header frame.
Figure 10:
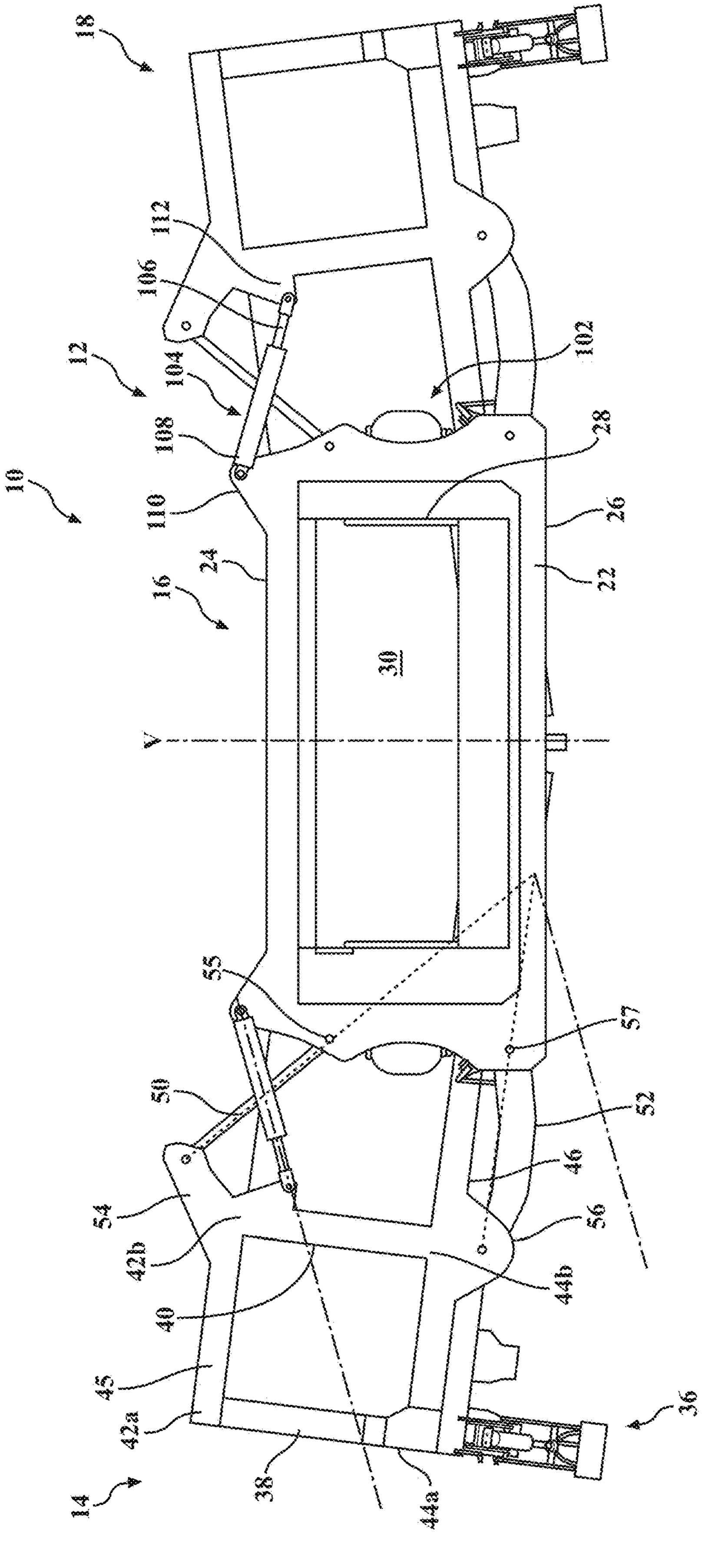
FIG. 10 is a rear view of the header of FIG. 1 further showing the hydraulic float system and each of the side wing sections of the header frame pivoted upwardly relative to the center section of the header frame.
Figure 11:
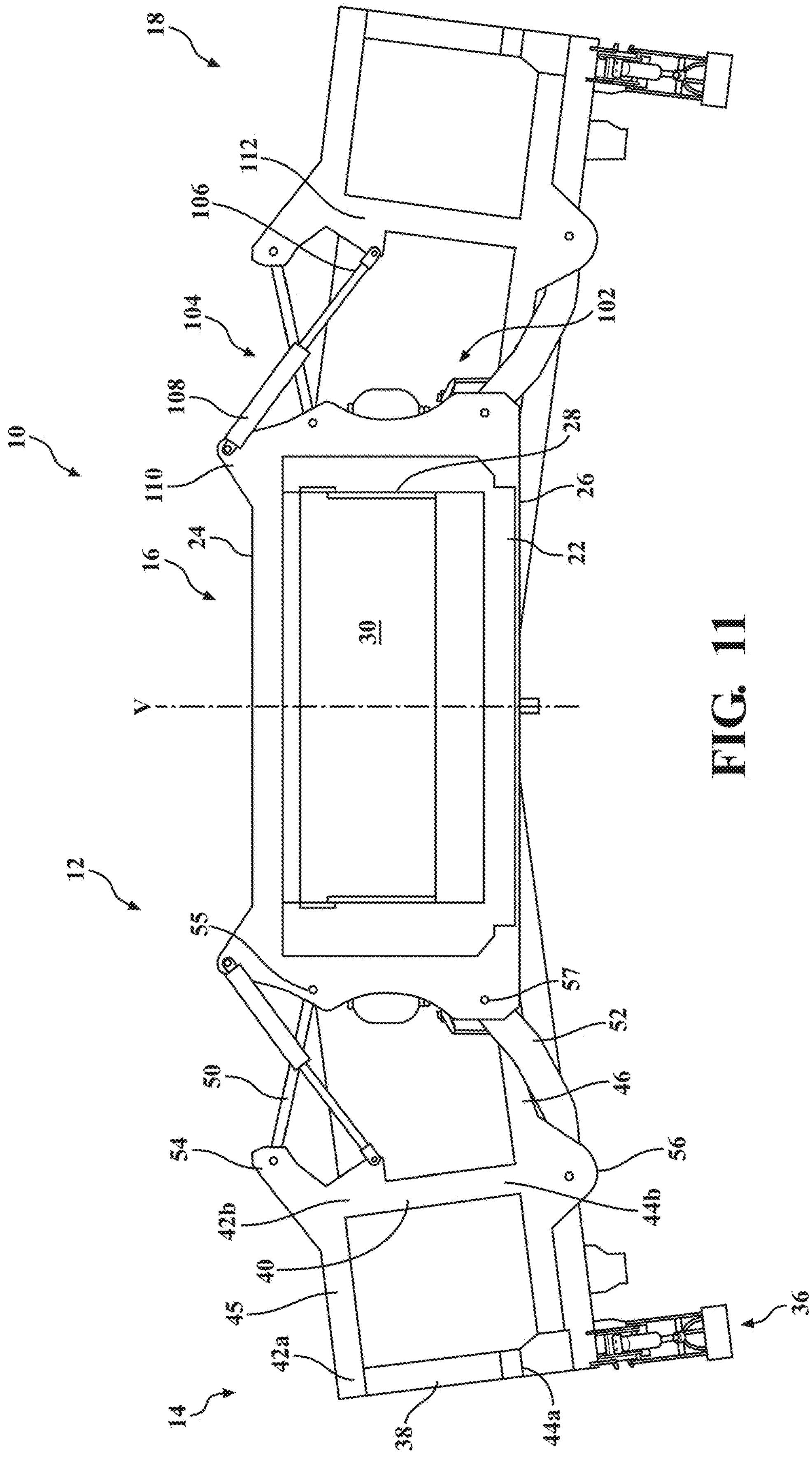
FIG. 11 is a rear view of the header of FIG. 1 showing the hydraulic float system and each of the side wing sections of the header frame pivoted downwardly relative to the center section of the header frame.
Figure 12:
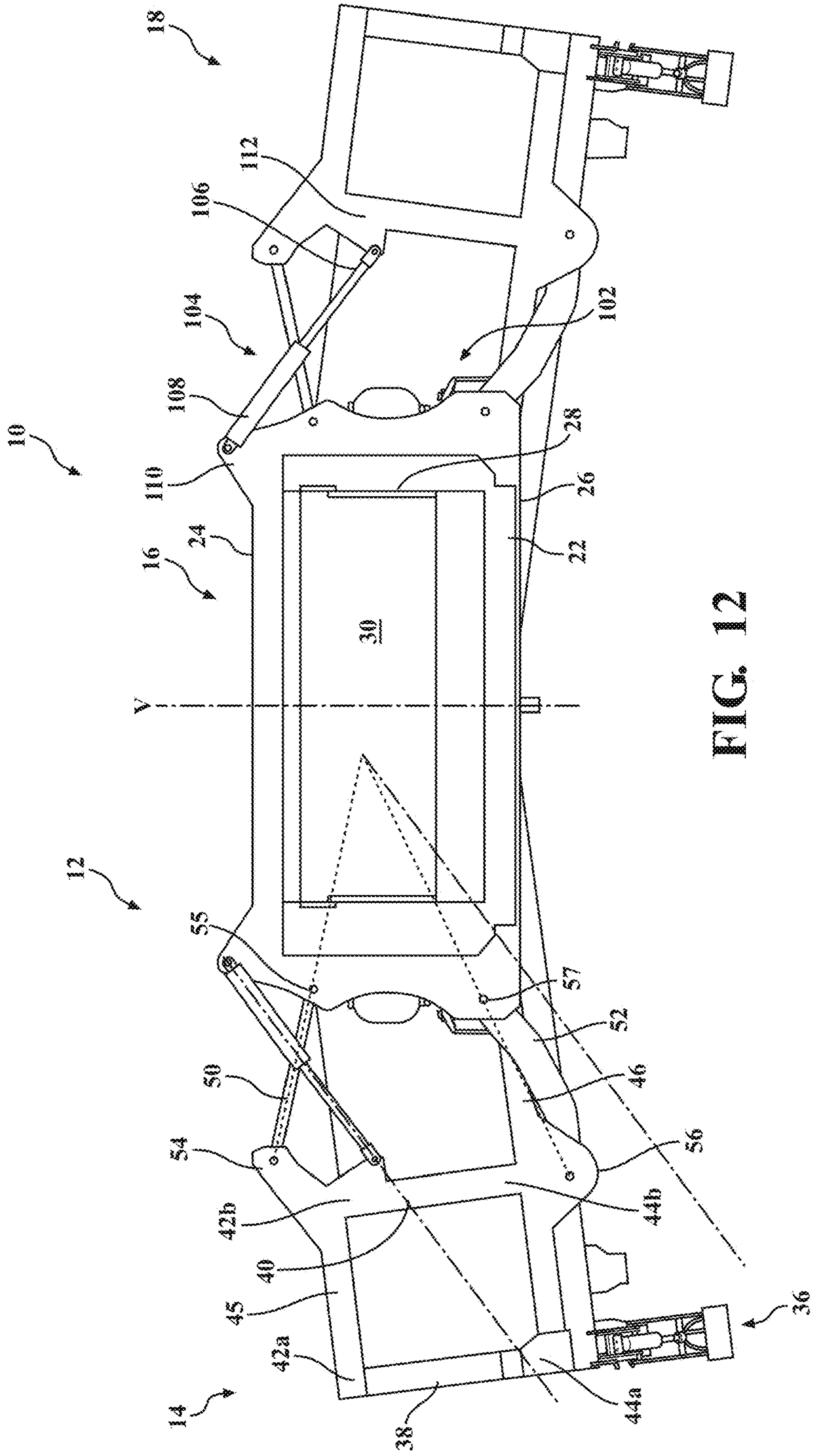
FIG. 12 is a rear view of the header of FIG. 1 further showing the hydraulic float system and each of the side wing sections of the header frame pivoted downwardly relative to the center section of the header frame.
Figure 13:
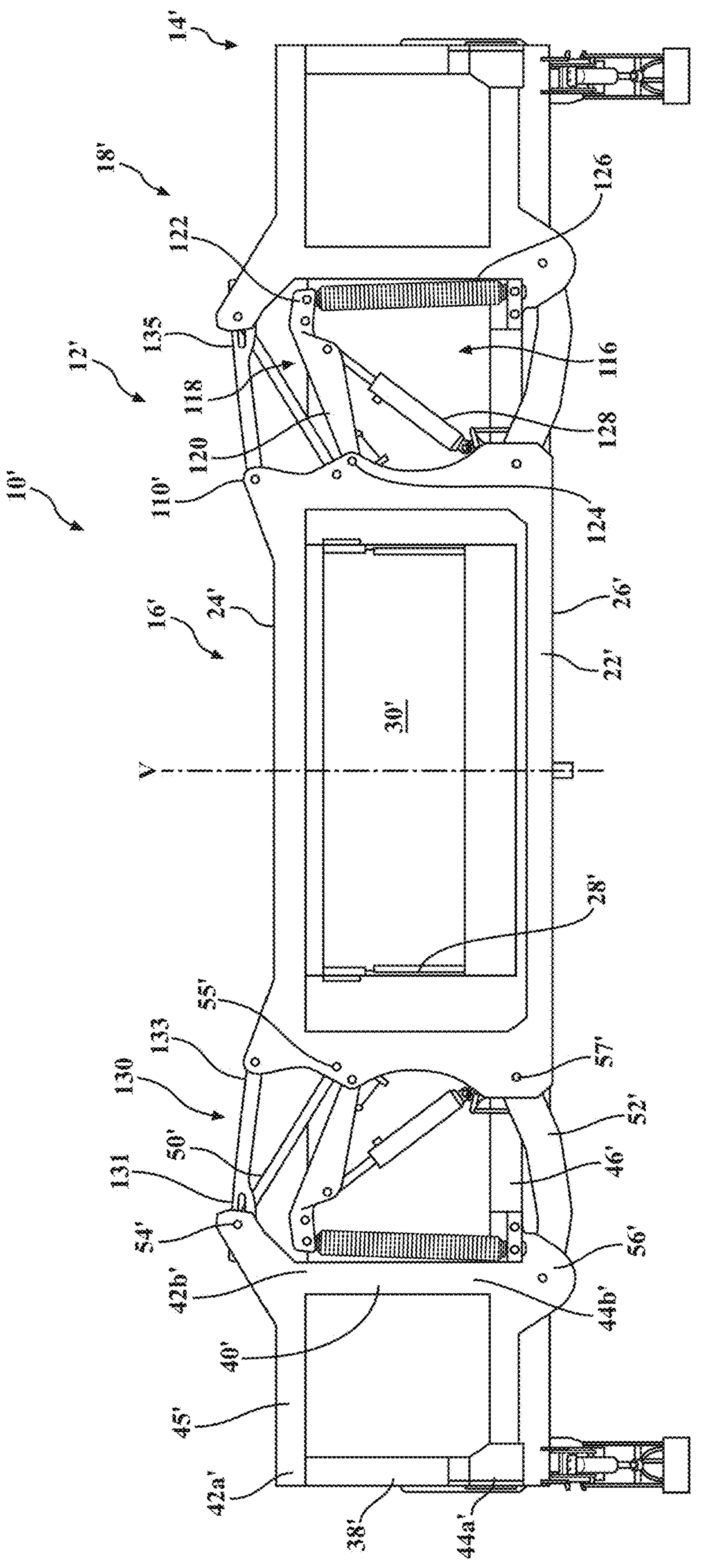
FIG. 13 is a rear view of a header for harvesting row crops according to a second embodiment of the present invention showing a spring float system and each of the side wing sections of the header frame level relative to the center section of the header frame.
Figure 14:
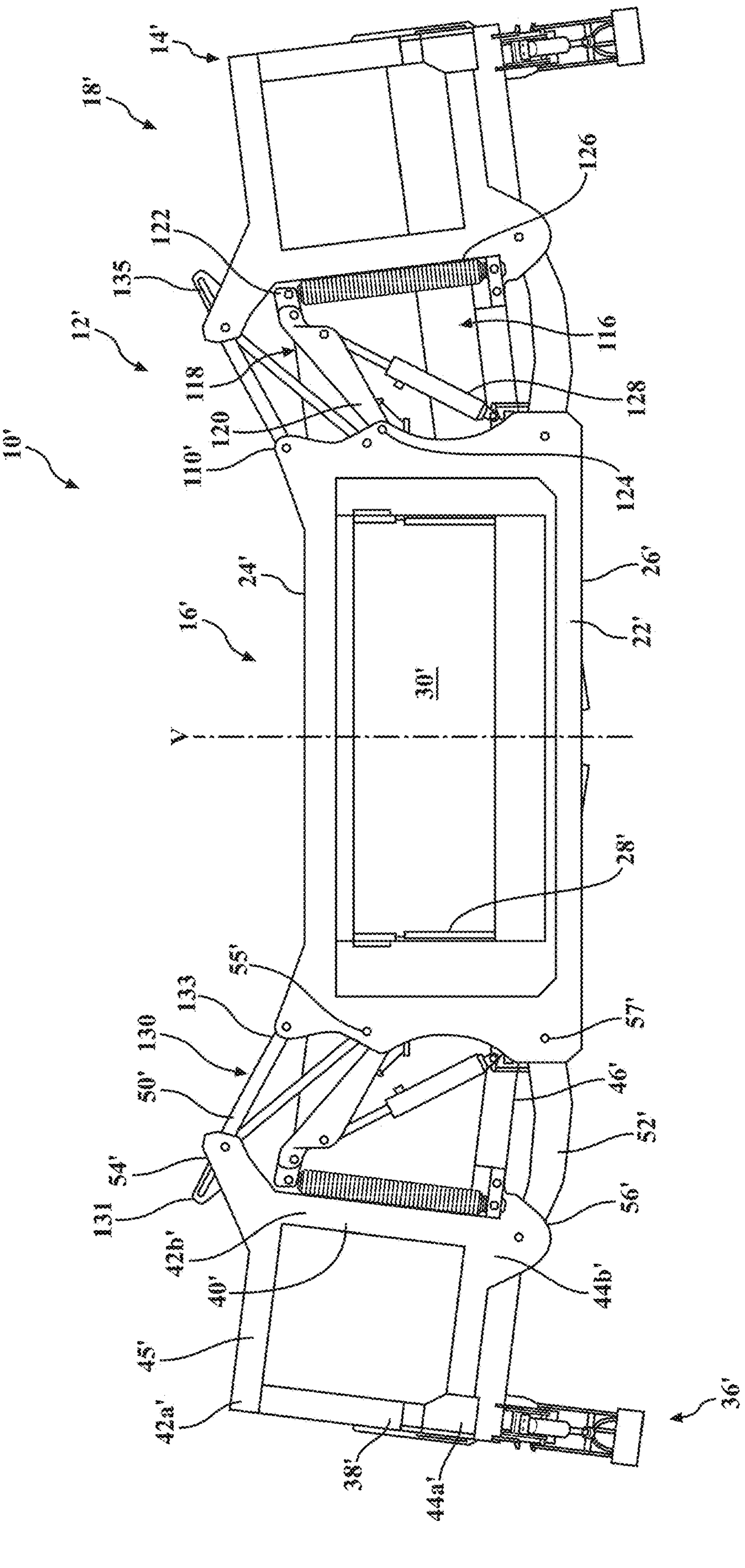
FIG. 14 is a rear view of the header of FIG. 13 showing the spring float system and each of the side wing sections of the header frame pivoted upwardly relative to the center section of the header frame.
Figure 15:
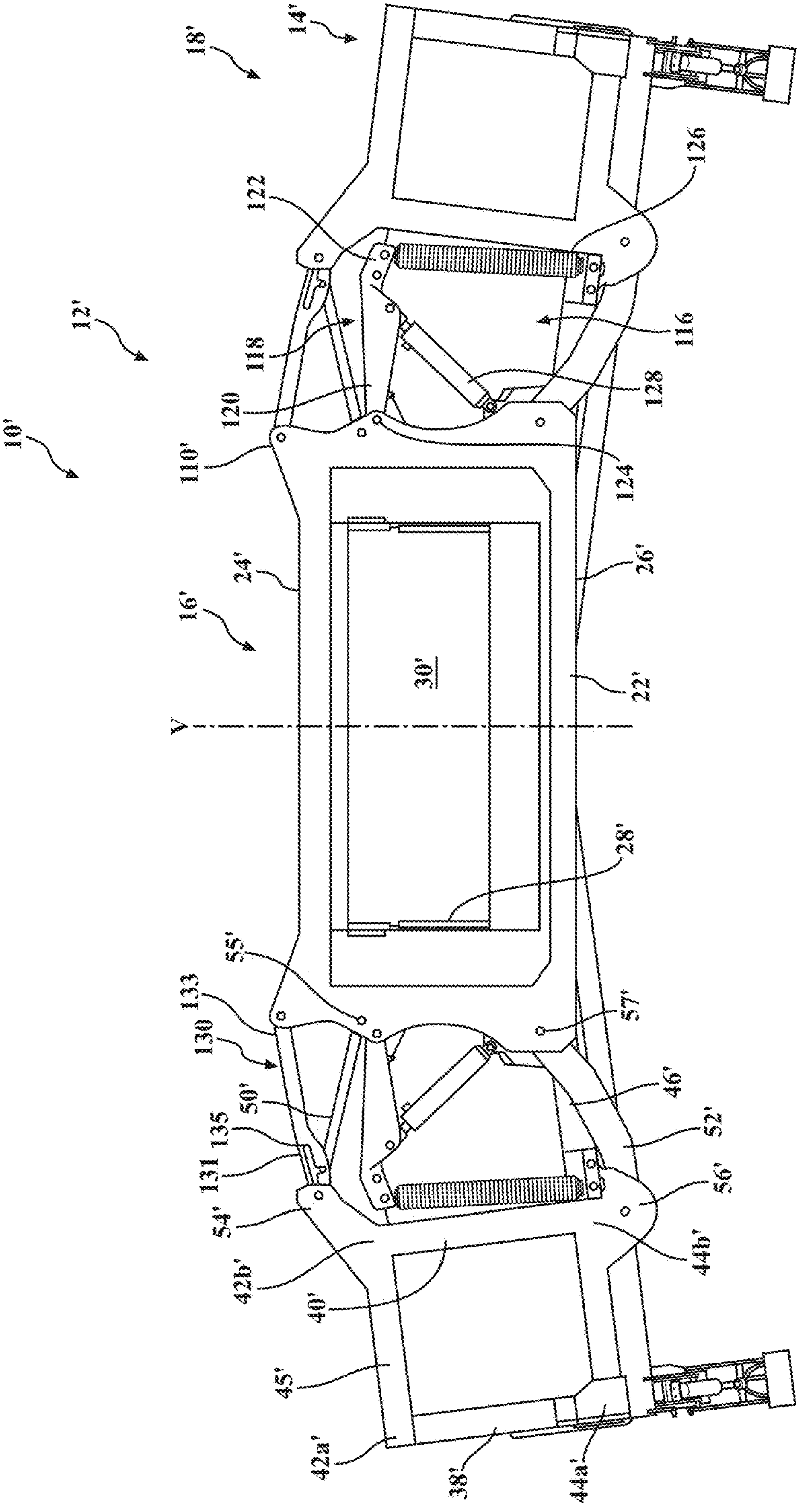
FIG. 15 is a rear view of the header of FIG. 13 showing the spring float system and each of the side wing sections of the header frame pivoted downwardly relative to the center section of the header frame.
Figure 16:
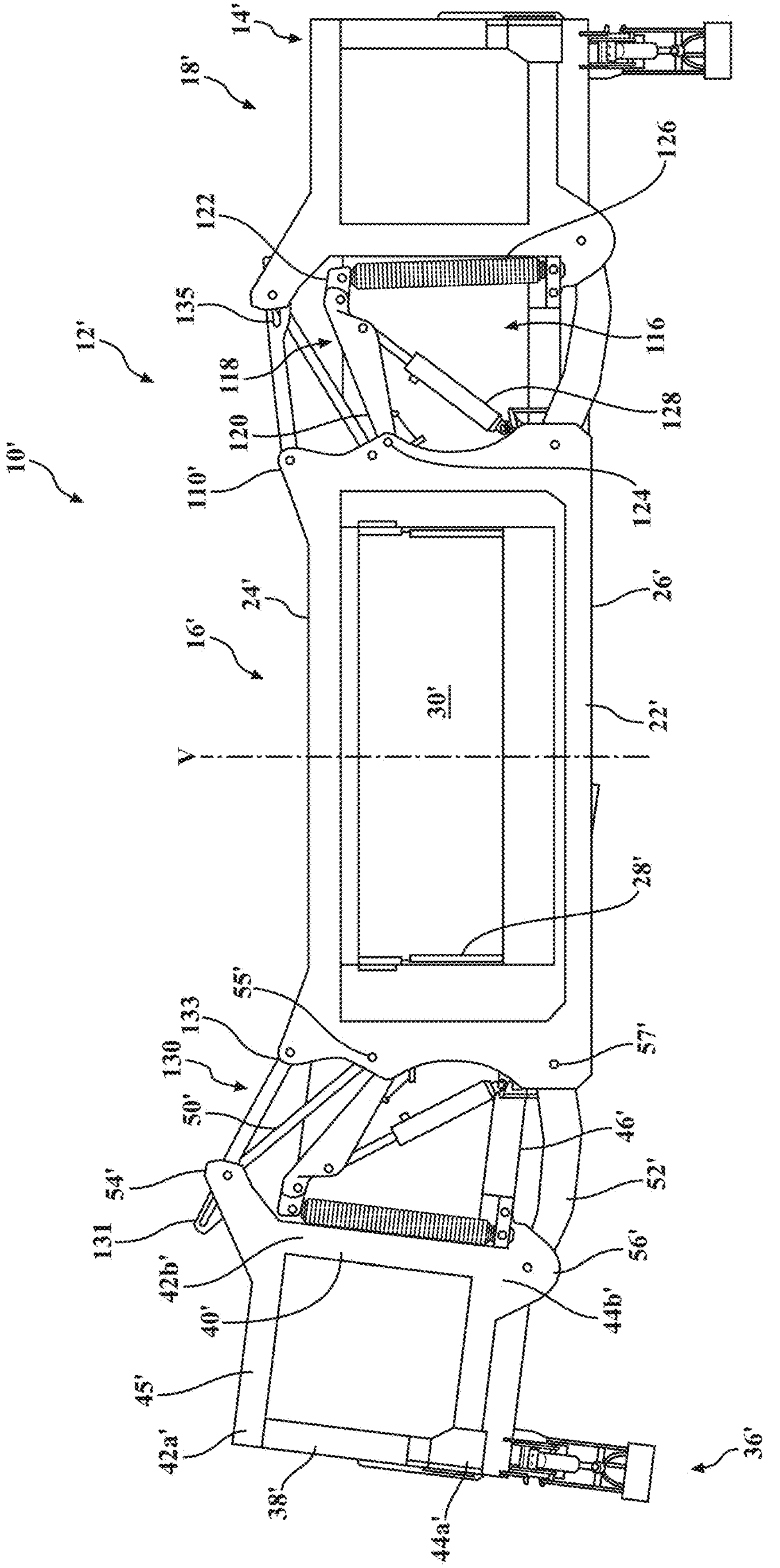
FIG. 16 is a rear view of the header of FIG. 13 showing the spring float system and one of the pair of side wing sections of the header frame pivoted upwardly relative to the center section of the header frame.
Figure 17:
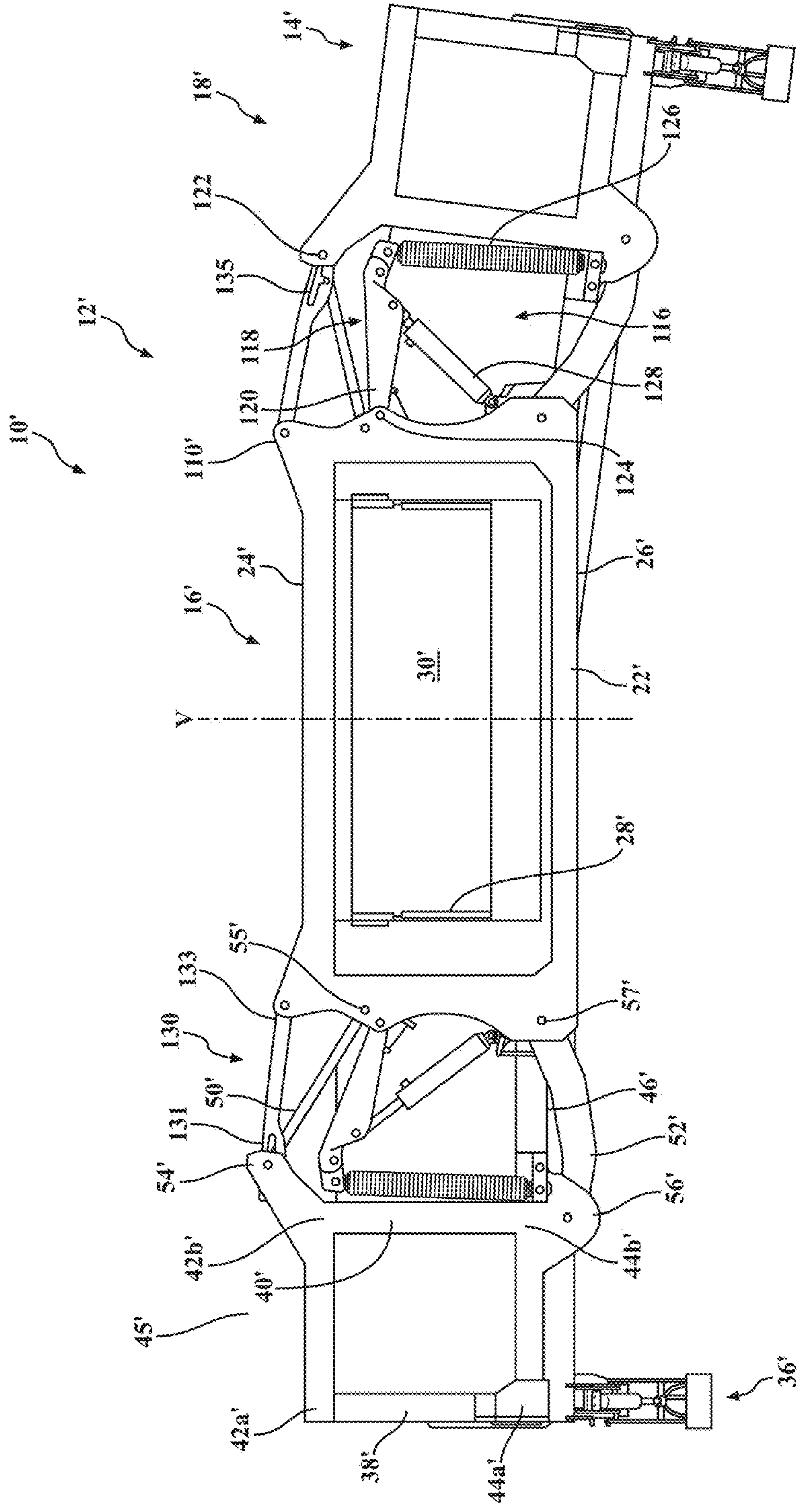
FIG. 17 is a rear view of the header of FIG. 13 showing the spring float system and one of the pair of side wing sections of the header frame pivoted downwardly relative to the center section of the header frame.
Figure 18:
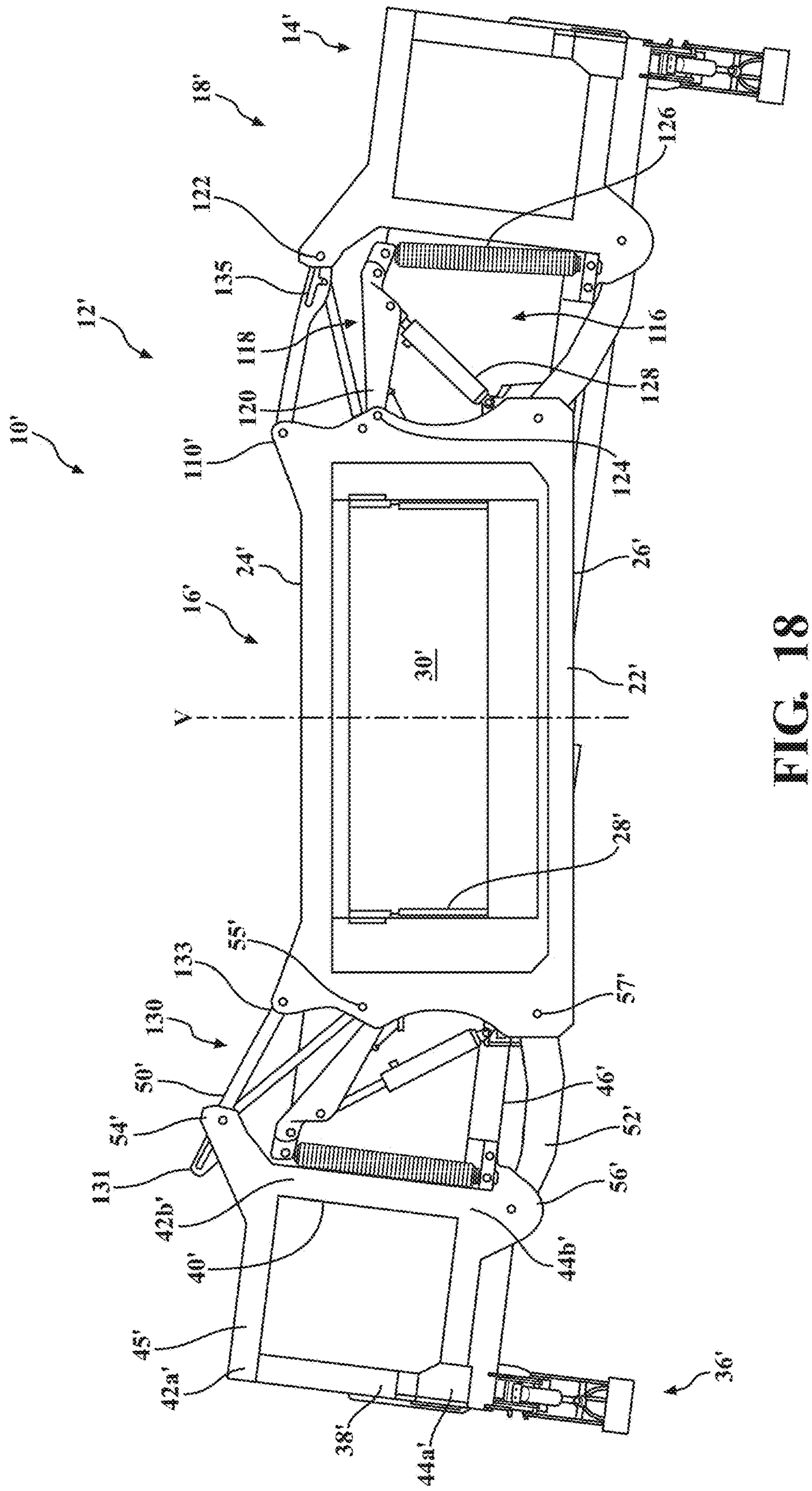
FIG. 18 is a rear view of the header of FIG. 13 showing the spring float system and one of the pair of side wing sections of the header frame pivoted upwardly relative to the center section of the header frame and one of the pair of side wing sections of the header frame pivoted downwardly relative to the center section of the header frame.

Referring to FIG. 4, each side wing section 18 of the header frame 12 includes an outer vertical support member 38 spaced laterally apart from an inner vertical support member 40. The outer and inner support members 38, 40 each extend vertically between a first end 42*a*, 42*b* and an opposite second end 44*a*, 44*b*. An upper support beam 45 extends laterally between the first ends 42*a*, 42*b* of each respective outer and inner support member 38, 40. Referring to FIGS. 4 and 5, a first cantilevered lower support beam 46 extends laterally inward from the second end 44*a* of each respective outer support member 38, intersects the second end 44*b* of each respective inner support member 40, and terminates along the front-facing side 20 of the center section 16 adjacent vertical line V. A second lower support beam 47 is spaced in front of each first lower support beam 46 and is fixedly coupled thereto by a plurality of intermediate supports 49 extending therebetween, as shown in FIG. 6.

Referring to FIG. 4, each side wing section 18 is pivotally coupled to the center section 16 by at least an upper link 50 and a lower link 52. A first attachment bracket 54 extends upwardly and inwardly from each side wing section 18 adjacent the first end 42*b* of the inner support member 40, and a second attachment bracket 56 extends downwardly from each side wing section 18 adjacent the second end 44*b* of the inner support member 40. Each upper link 50 is rotatably coupled to, and extends between, the first attachment bracket 54 on the side wing section 18 and a first attachment point 55 disposed at the edge 28 of the center section 16 adjacent the top portion 24 thereof. Each lower link 52 is rotatably coupled to, and extends between, the second attachment bracket 56 on the side wing section 18 and a second attachment point 57 disposed at the edge 28 of the center section 16 adjacent the bottom portion 26 thereof. The upper and lower links 50, 52 allow the side wing sections 18 to independently pivot upwardly and downwardly relative to the center section 16, as shown in FIGS. 7-18, to contour to the surface of the field, including various sections of a farmable terrace, as determined by the cut height of the header 10. It is also contemplated that the header 10 may further include a wing position sensor for each side wing section 18, or any of a number of other position-determining sensors or dongles, to monitor the position of the center section 16 of the header frame 12 and to monitor the positions of the side wing sections 18 relative to the center section 16 of the header frame 12.

Figure 19:
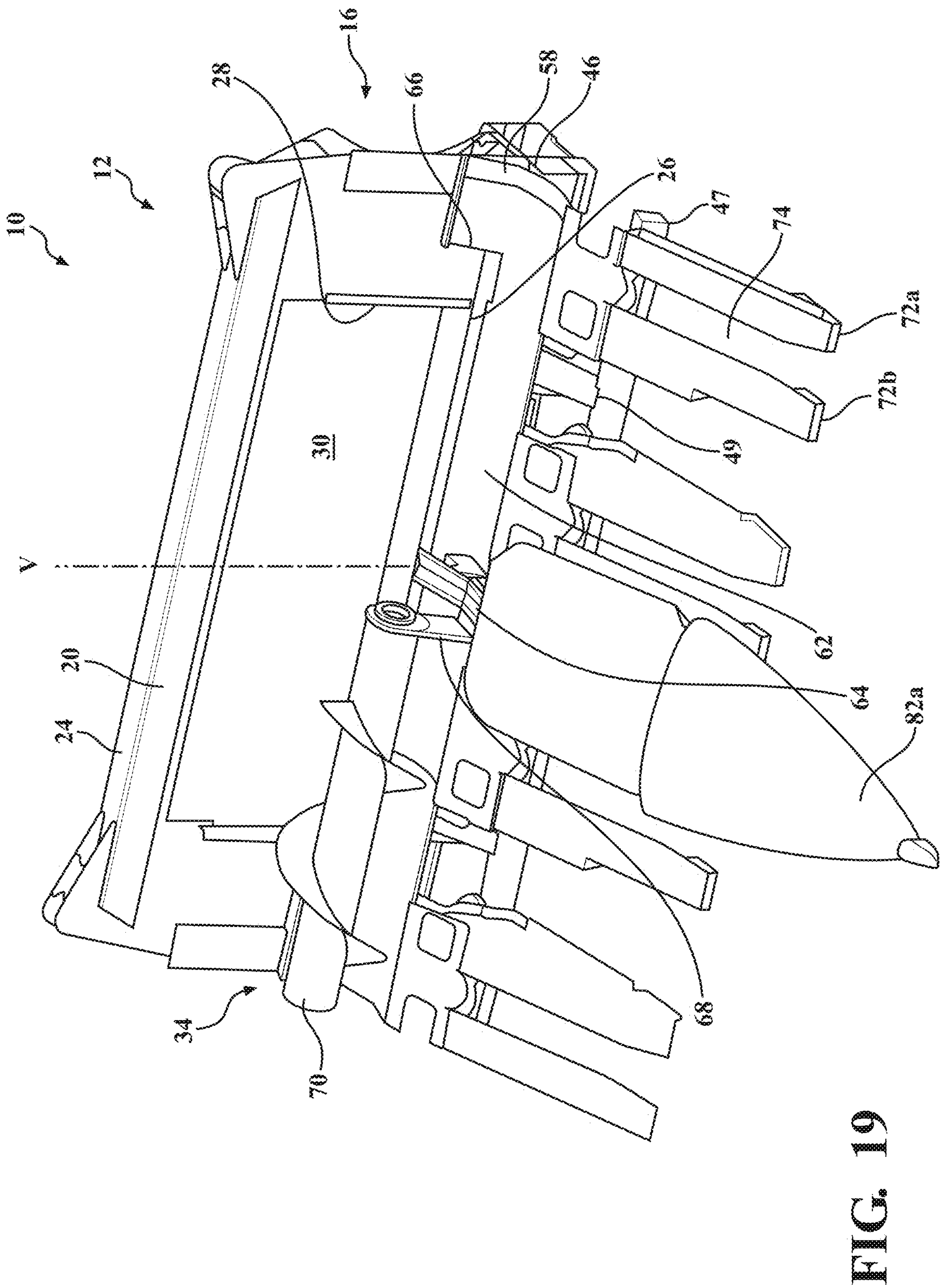
FIG. 19 is a fragmentary perspective view of the header of FIG. 1 showing a medial end of each of a pair of auger pans of an auger assembly.
Figure 20:
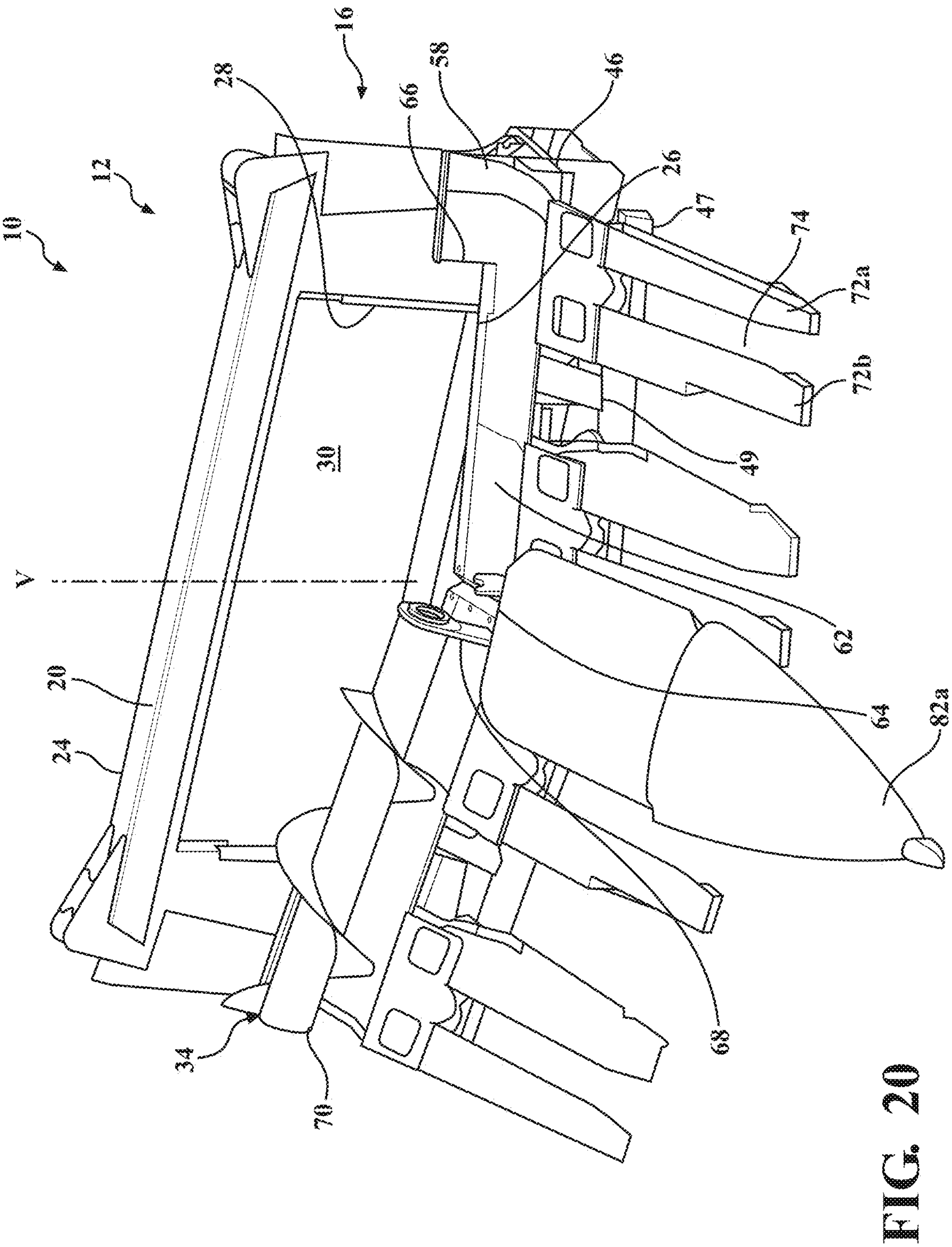
FIG. 20 is a fragmentary perspective view of the header of FIG. 1 further showing the medial end of each of the pair of auger pans of the auger assembly.
Figure 21:
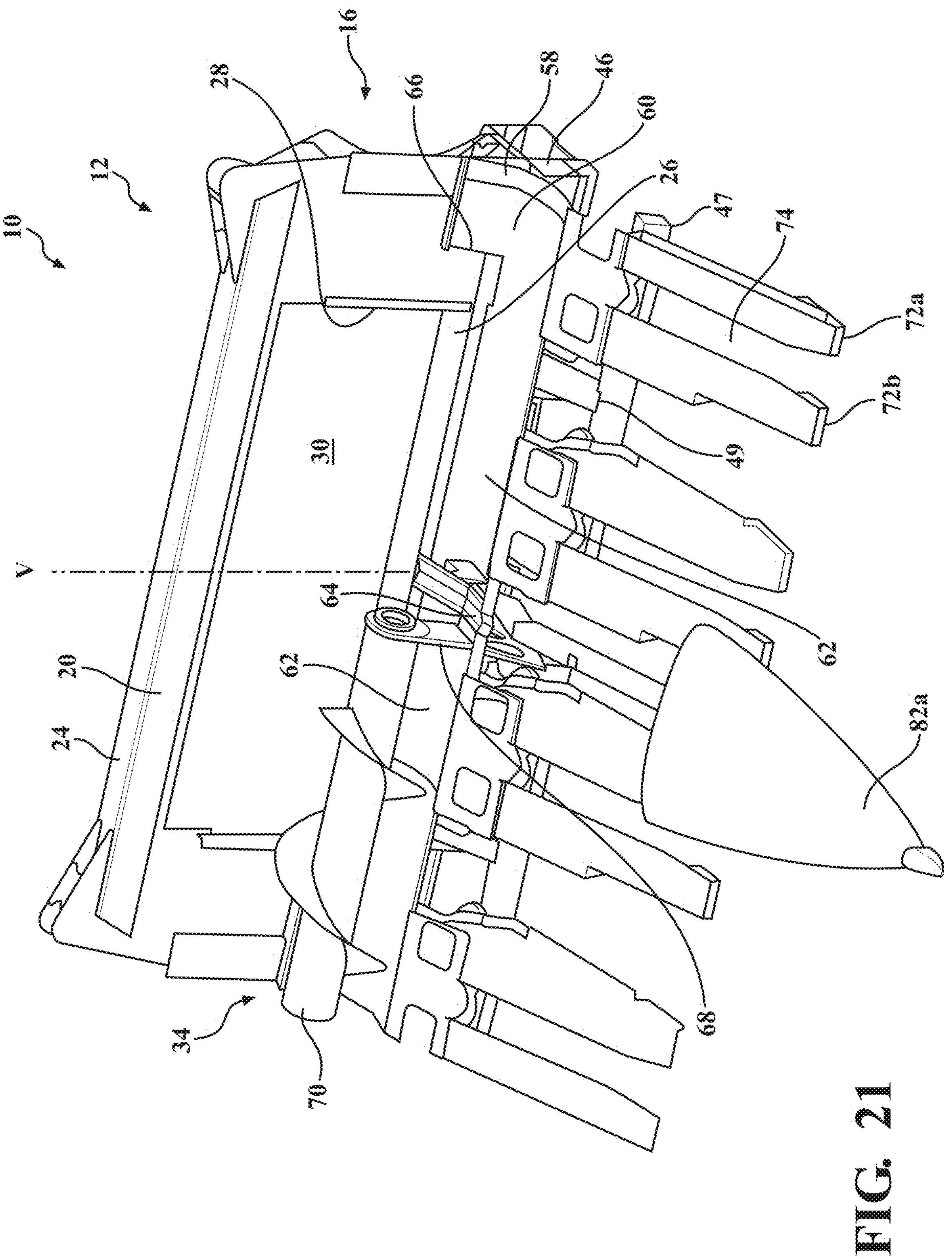
FIG. 21 is a fragmentary perspective view of the header of FIG. 1 further showing the medial end of each of the pair of auger pans of the auger assembly.
Figure 22:
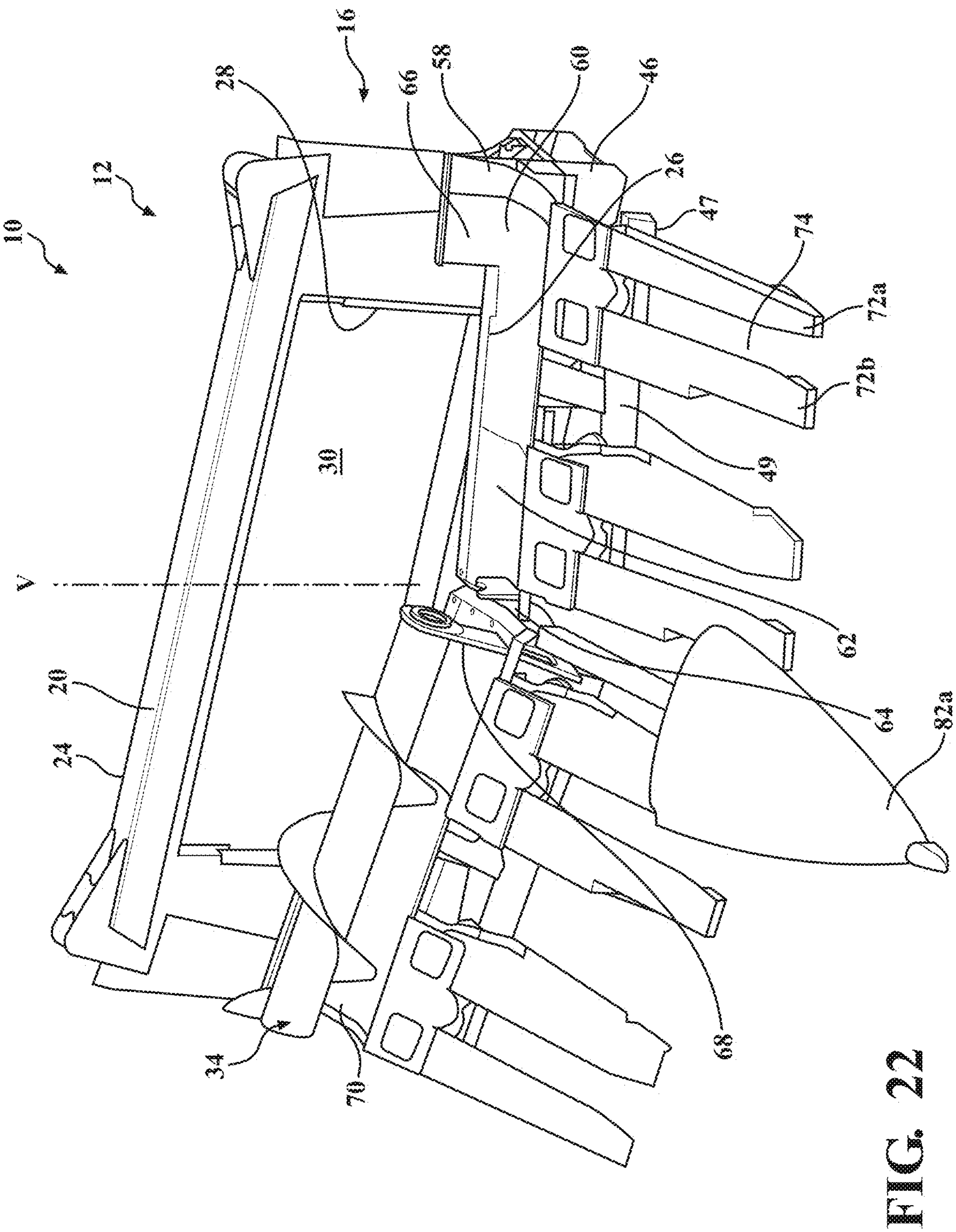
FIG. 22 is a fragmentary perspective view of the header of FIG. 1 further showing the medial end of each of the pair of auger pans of the auger assembly.
Figure 23:
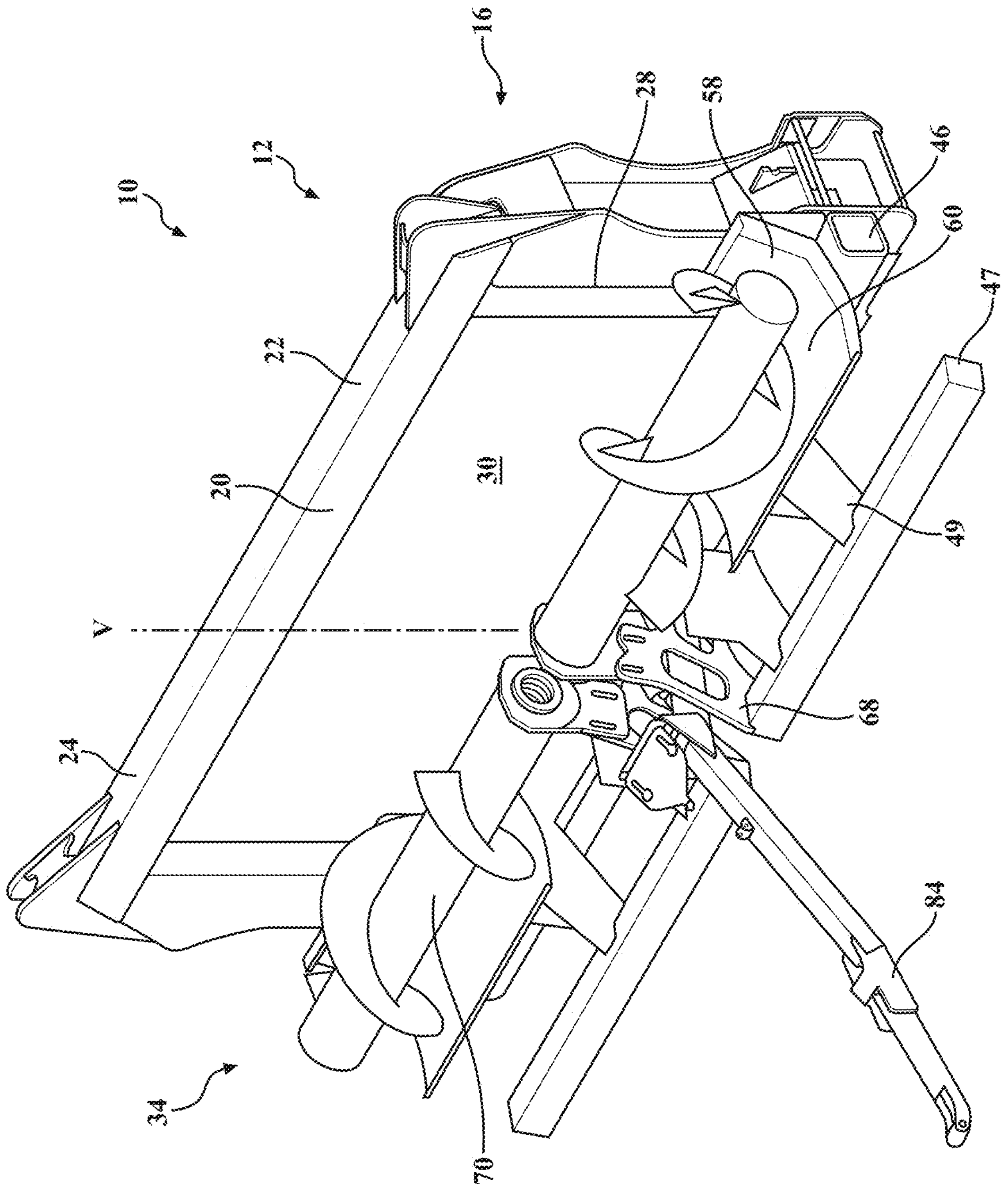
FIG. 23 is a fragmentary perspective view of the header of FIG. 1 showing a center snout support and the auger assembly.
Figure 24:
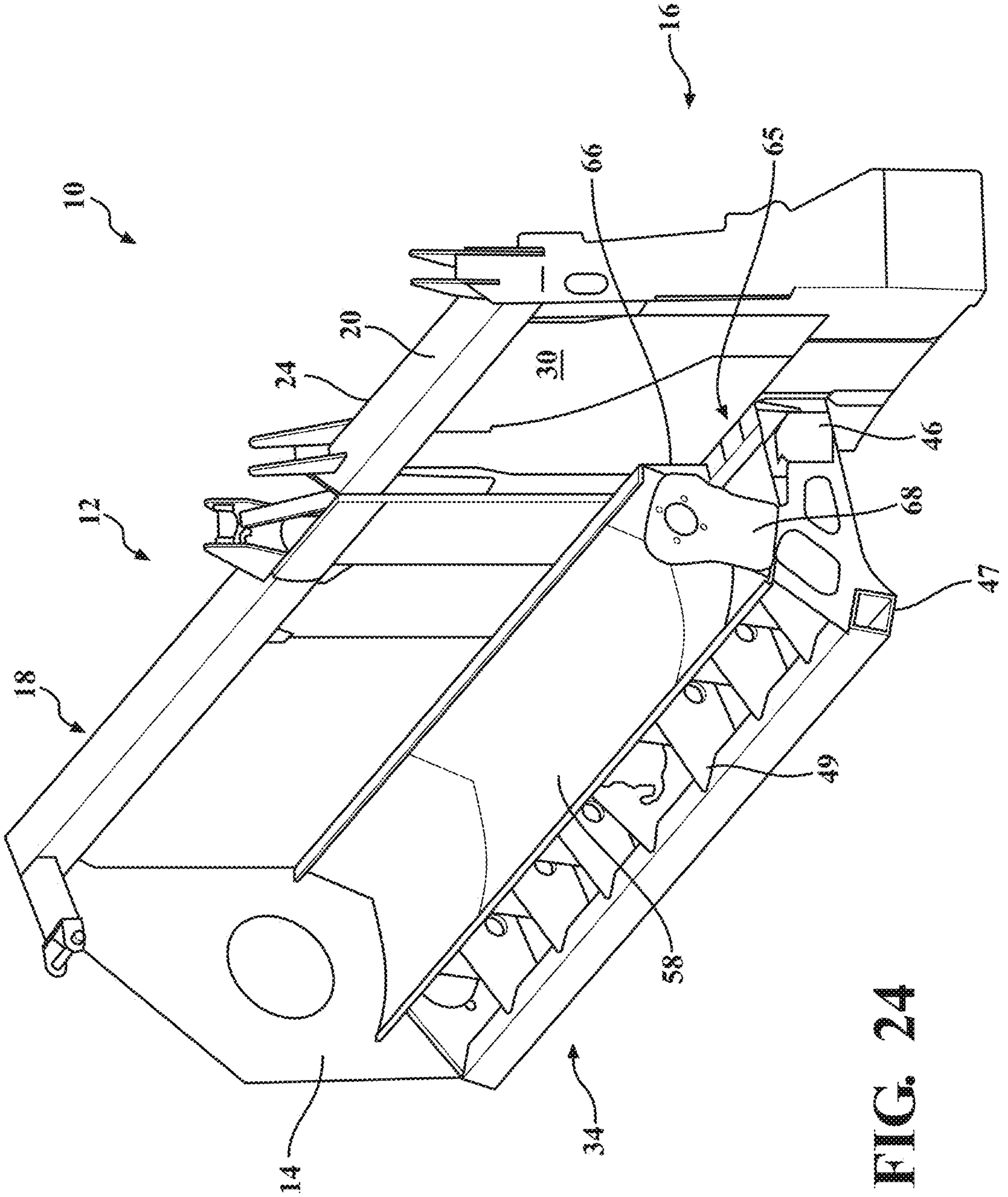
FIG. 24 is a fragmentary perspective view of the header of FIG. 1 showing a spring seal extending between a cutout portion of the auger pans and an aperture in the center section of the header frame.
Figure 25B:
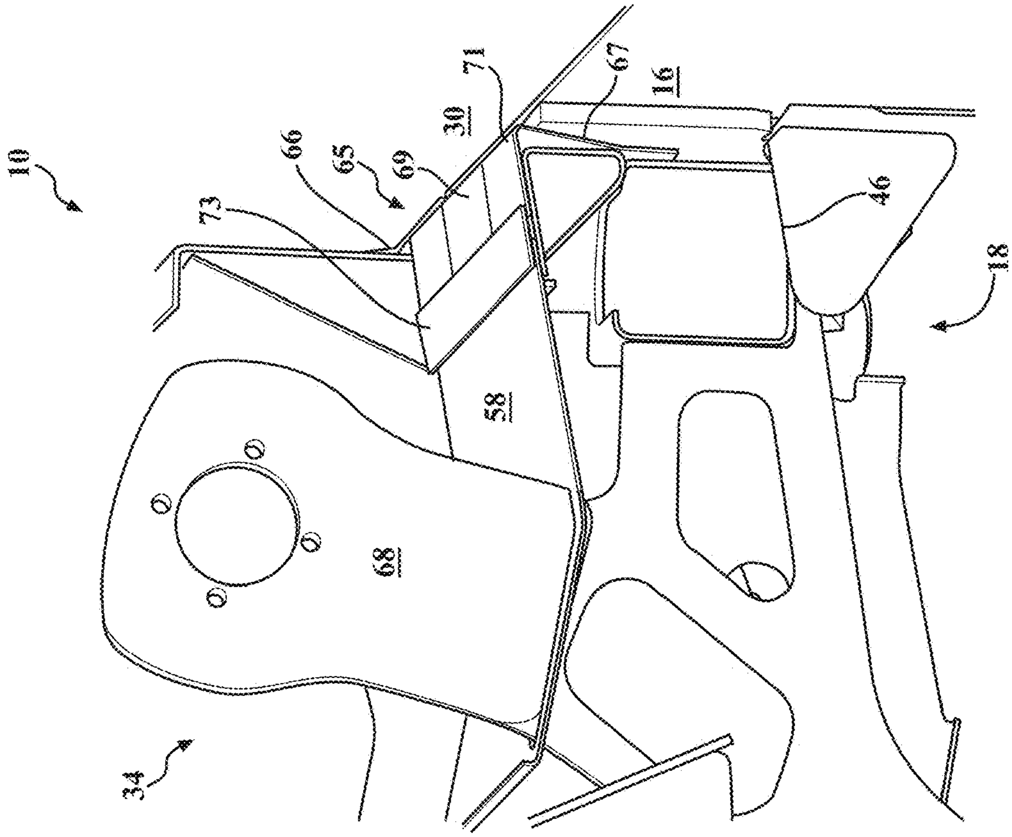
FIG. 25B is an enlarged fragmentary perspective view of the header of FIG. 1 showing the spring seal flexing to cover a gap between the cutout portion of the auger pans and the aperture in the center section of the header frame.
Figure 25A:
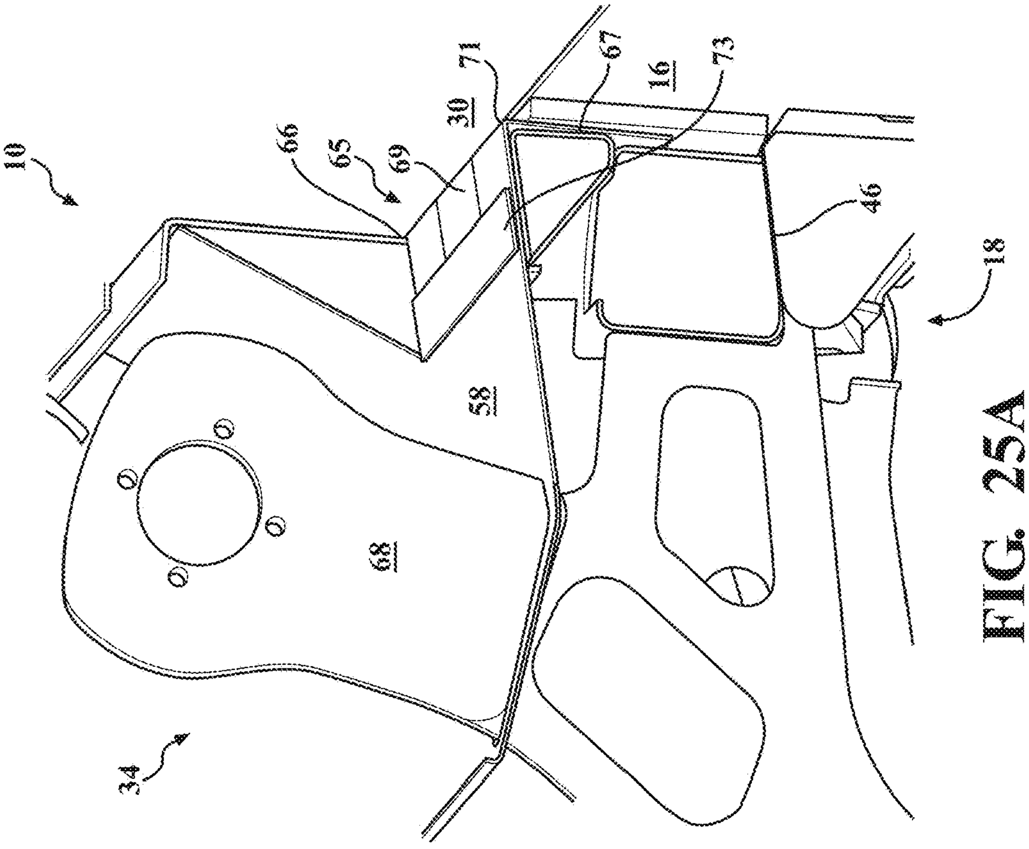
FIG. 25A is an enlarged fragmentary perspective view of the header of FIG. 1 further showing the spring seal.

Referring to FIGS. 6 and 19-23, the auger assembly 34 includes an auger pan 58 fixedly coupled to, and extending across, each first lower support beam 46 and the respective intermediate supports 49 such that the auger pans 58 together extend laterally across the header frame 12 between the ends 14 thereof. Each auger pan 58 has a lateral end 60 and an opposite medial end 62. The medial ends 62 of each auger pan 58 are disposed adjacent vertical line V and are connected with a flexible material 64, as shown in FIGS. 19 and 21. The flexible material 64 extends between the medial ends 62 of each auger pan 58, thereby allowing the auger pans 58 to independently pivot with the respective side wing sections 18 of the header frame 12 while also preventing loss of crop material from between the auger pans 58. Referring to FIGS. 21-23, each auger pan 58 has a generally arcuate shape with a cutout portion 66 disposed adjacent to the medial ends 62 thereof to allow crops to enter the aperture 30 in the center section 16 of the header frame 12.

Figure 26B:
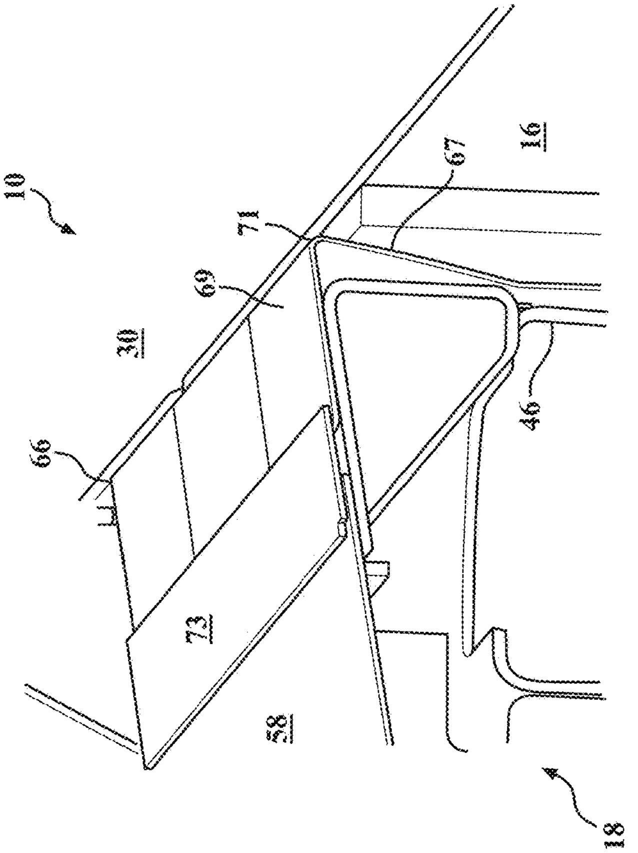
FIG. 26B is an enlarged fragmentary perspective view of the header of FIG. 1 further showing the spring seal flexing to cover the gap between the cutout portion of the auger pans and the aperture in the center section of the header frame.
Figure 26A:
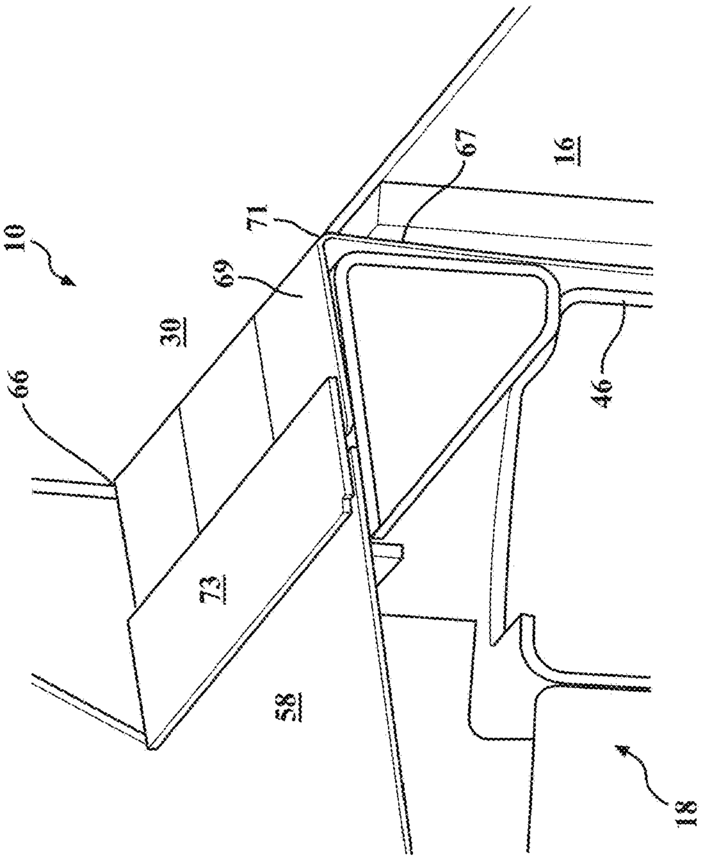
FIG. 26A is an enlarged fragmentary perspective view of the header of FIG. 1 further showing the spring seal.

Referring to FIGS. 24-26B, a plurality of spring seals 65 operatively extend between the cutout portions 66 of the auger pans 58 and the aperture 30 in the center section 16 of the header frame 12 to prevent crop material from falling therebetween. Each spring seal 65 includes a vertical portion 67 and a horizontal portion 69 intersecting at an upper edge 71, as shown in FIGS. 25A and 26A. At least part of the vertical portion 67 of each spring seal 65 is coupled to the first lower support beam 46. The horizontal portion 69 of each spring seal 65 extends forwardly from the vertical portion 67 at the upper edge 71 and slots under a planar flange 73 fixedly coupled to and extending across the cutout portion 66 of each auger pan 58. As the side wing sections 18 pivot relative to the center section 16 of the header frame 12, the vertical portion 67 of each spring seal 65 is loaded to flex rearwardly, thereby correspondingly sliding the horizontal portion 69 rearwardly and bridging any gap between the cutout portions 66 of the auger pans 58 and the aperture 30, as shown in FIGS. 25B and 26B.

The auger assembly 34 further includes an auger mount 68 disposed adjacent the lateral and medial ends 60, 62 of each auger pan 58, as shown in FIGS. 23, 25A, 25B, and 27. The auger mounts 68 are coupled between the first and second lower support beams 46, 47 and extend upwardly though the auger pans 58 at the lateral and medial ends 60, 62 thereof. An auger 70 is rotatably coupled between the auger mounts 68 on each auger pan 58. The augers 70) are adapted such that rotation of the augers 70 conveys cut crops laterally along the auger pans 58 to the cutout portions 66 thereof for transferring the cut crops through the aperture 30 in the center section 16 of the header frame 12 for collection or further processing.

Figure 27:
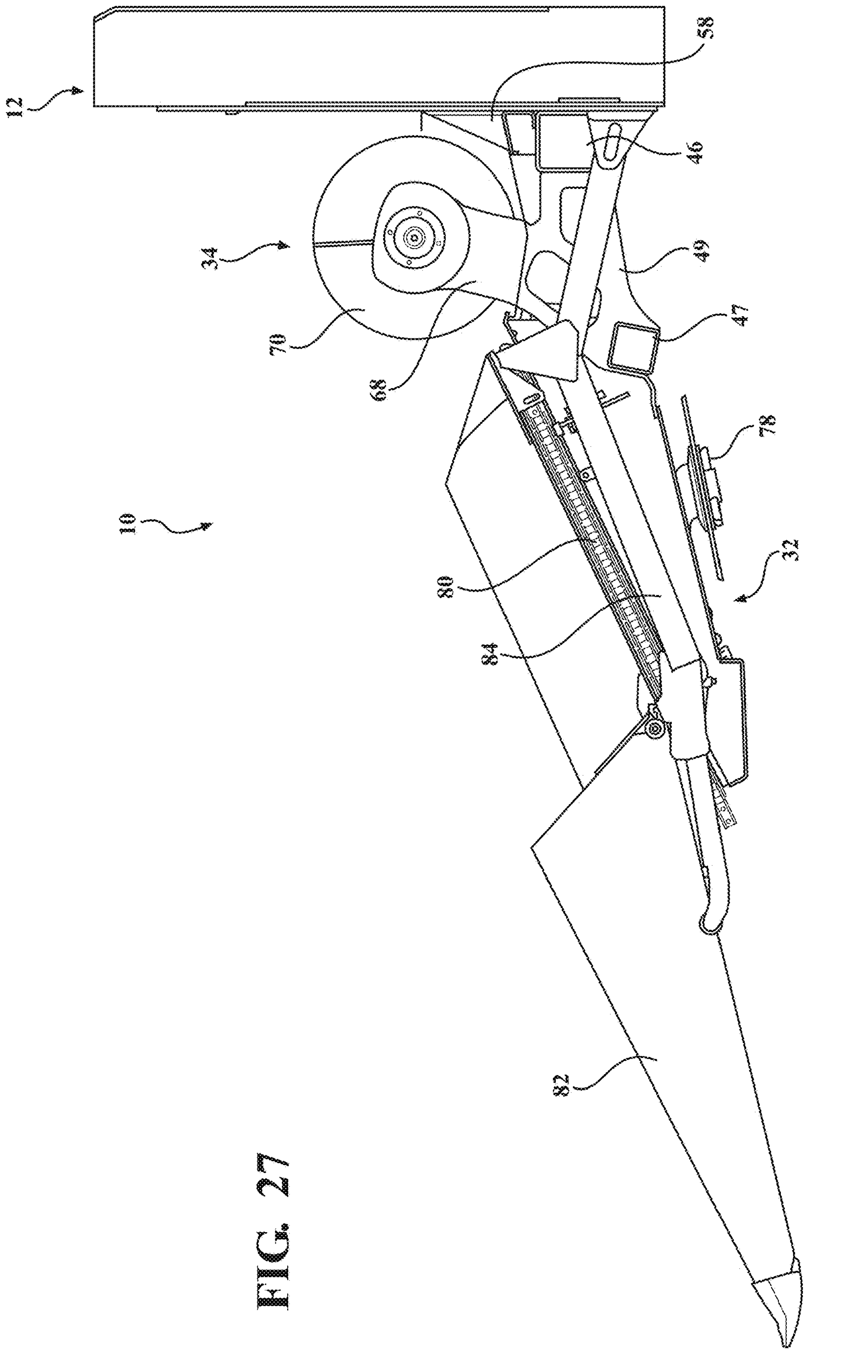
FIG. 27 is a fragmentary side view of the header of FIG. 1 showing the auger assembly and a crop cutting and conditioning system.
Figure 28:
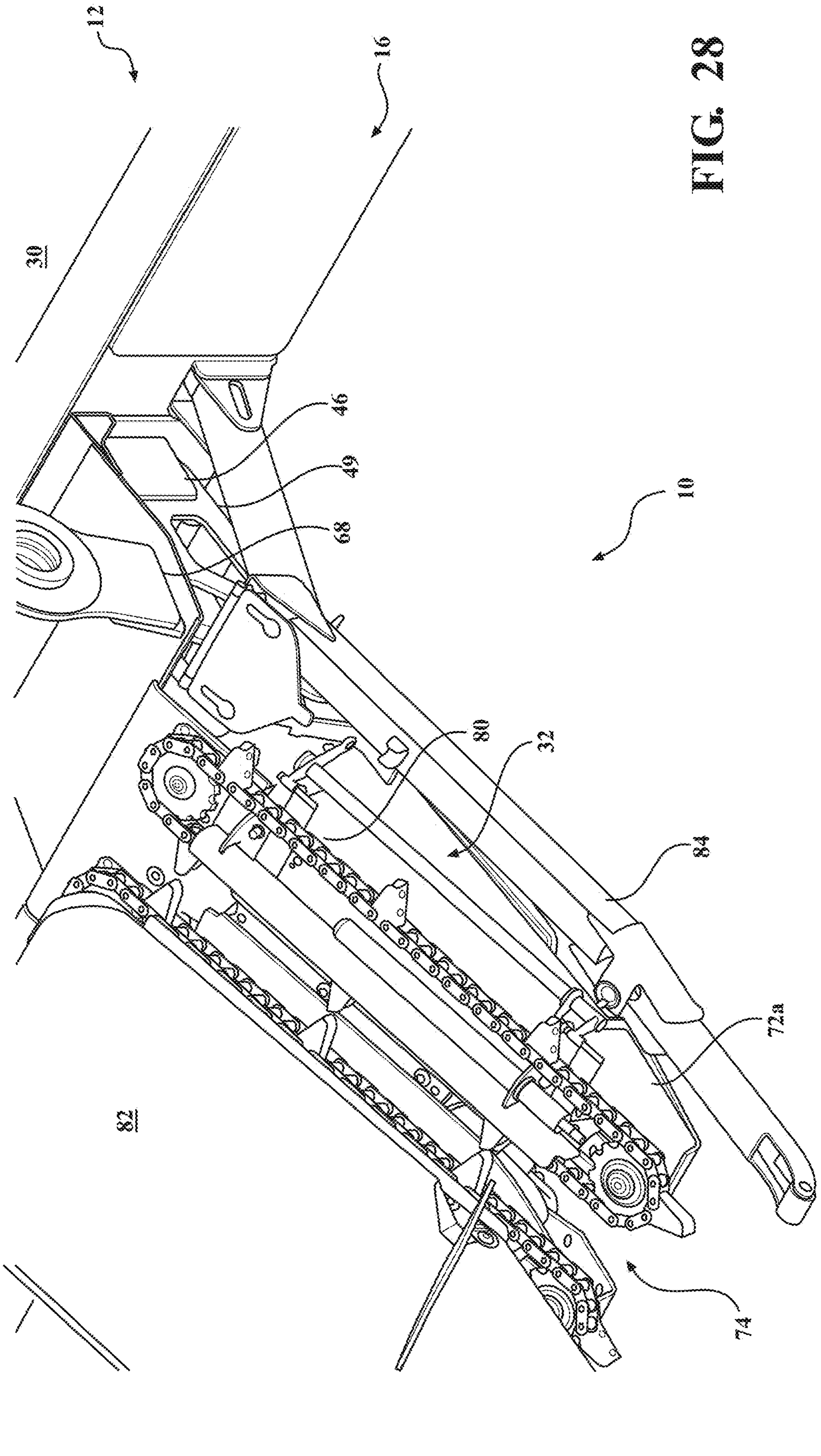
FIG. 28 is an enlarged fragmentary perspective view of the header of FIG. 1 further showing the crop cutting and conditioning system.
Figure 29:
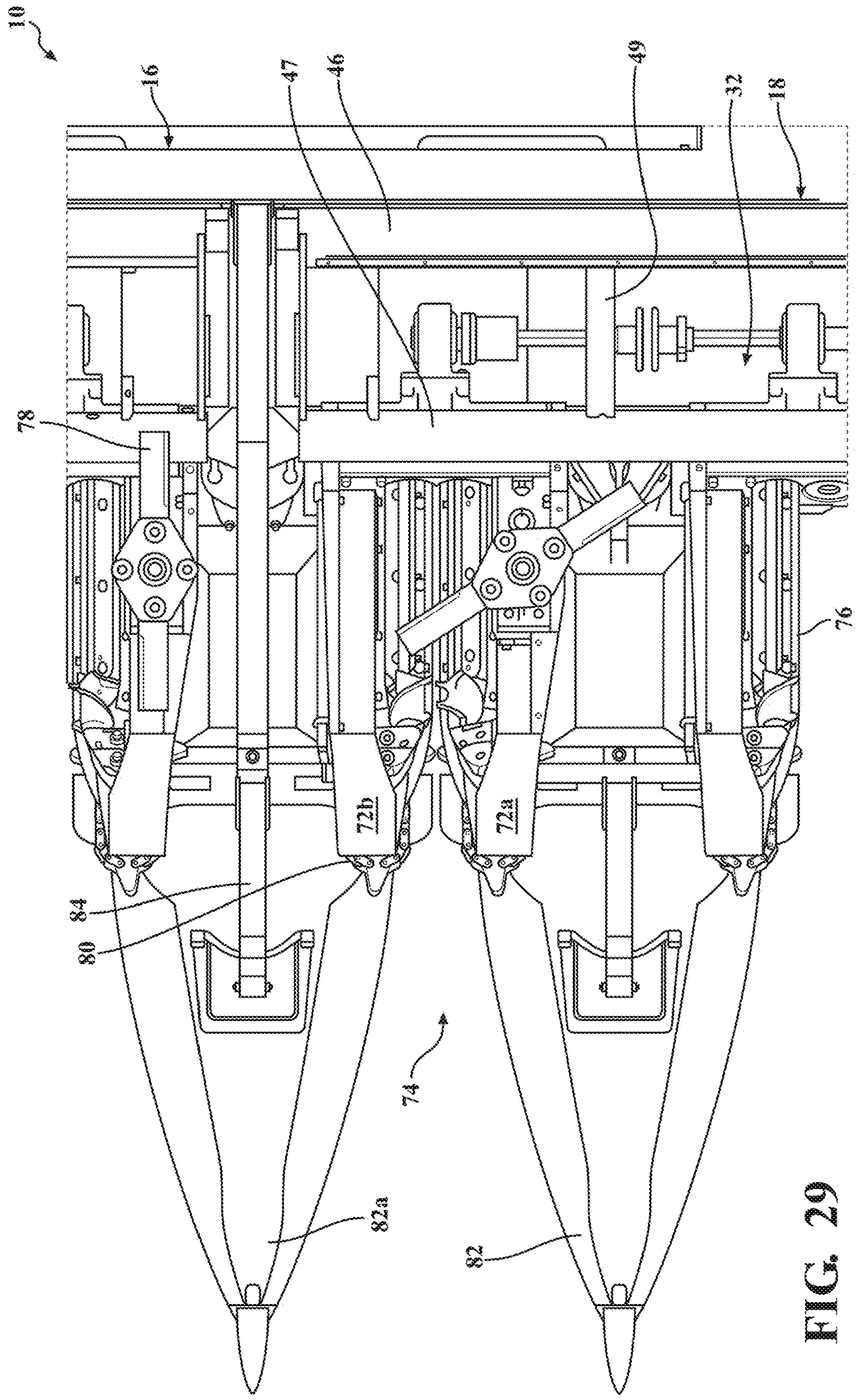
FIG. 29 is an enlarged fragmentary bottom view of the header of FIG. 1 further showing the crop cutting and conditioning system.

Referring to FIGS. 21 and 22, a plurality of row unit pairs 72*a*, 72*b* extend forwardly and downwardly from the second lower support beam 47 and the auger pans 58 on each side wing section 18 of the header frame 12 to correspondingly pivot with the side wing sections 18 relative to the center section 16. Each pair of row units 72*a*, 72*b* has a channel 74 running therebetween. Referring to FIGS. 27-29, various components of the crop cutting and conditioning system 32, as is known in the art, such as snap rolls 76, chopping knives 78, and gathering chain drives 80, are operatively mounted on the row units 72*a*, 72*b* to cut, crimp, and condition stalks of the row crops as the stalks enter the channels 74 between each pair of row units 72*a*, 72*b*. A plurality of conical snouts 82 are positioned on the side wing sections 18 above the row units 72*a*, 72*b*, as is known in the art, to direct the crops into the channels 74 between each pair of row units 72*a*, 72*b*. The conical snouts 82 therefore correspondingly pivot with the row unit pairs 72*a*, 72*b*, as shown in FIGS. 2 and 3. Referring to FIGS. 21-23, a center conical snout 82*a* is instead supported by a center snout support 84 extending forwardly from the center section 16 of the header frame 12. The center snout support 84 is adapted and arranged such that components of the crop cutting and conditioning system 32, including the chopping knives 78, are not impeded, therefore allowing the crop cutting and conditioning system 32 to cut, crimp, and condition crops entering the channels 74 directly adjacent to the center conical snout 82*a*, as shown in FIG. 29.

Figure 30:
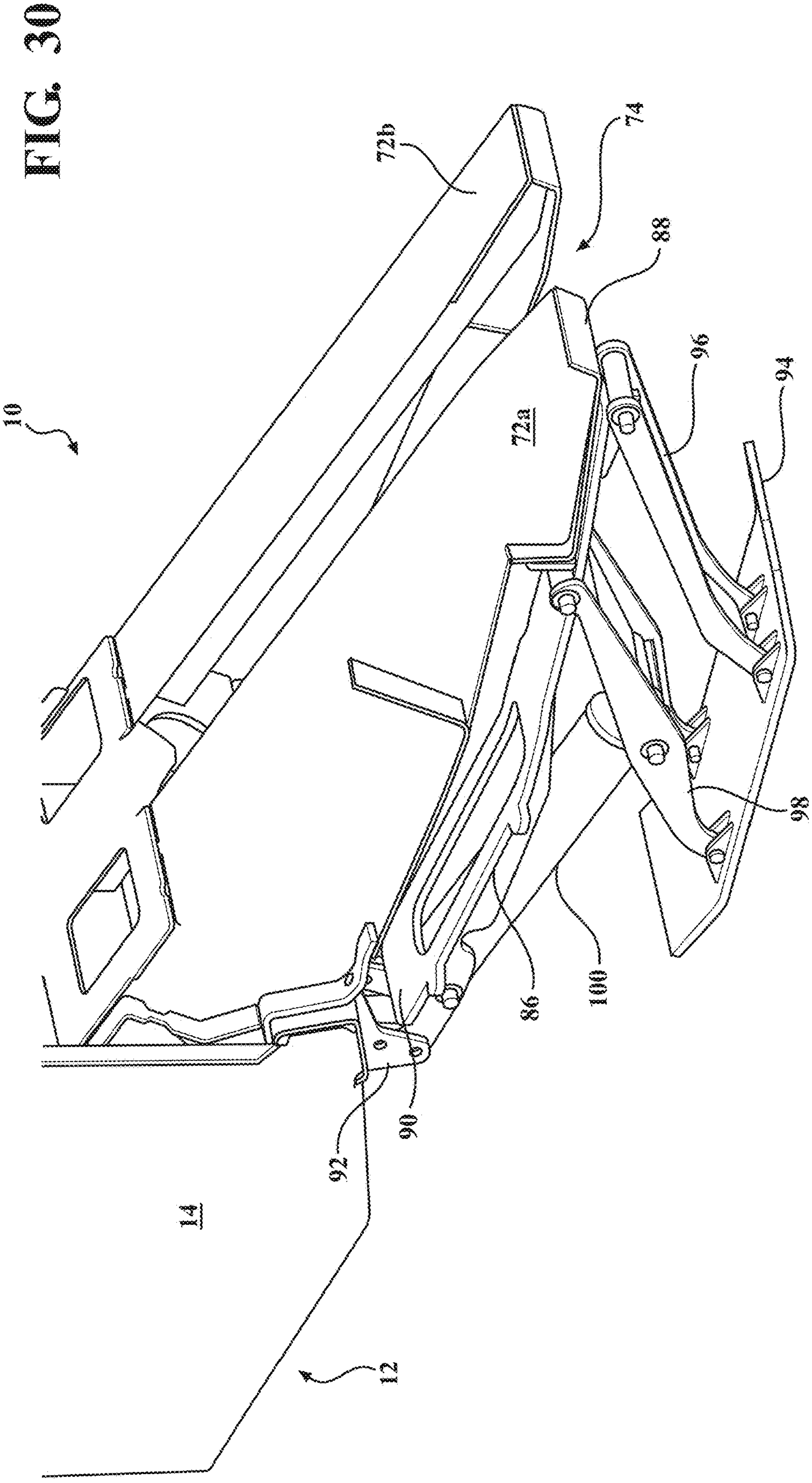
FIG. 30 is an enlarged fragmentary perspective view of the header of FIG. 1 showing one of a pair of skid shoe assemblies in an extended position.
Figure 31:
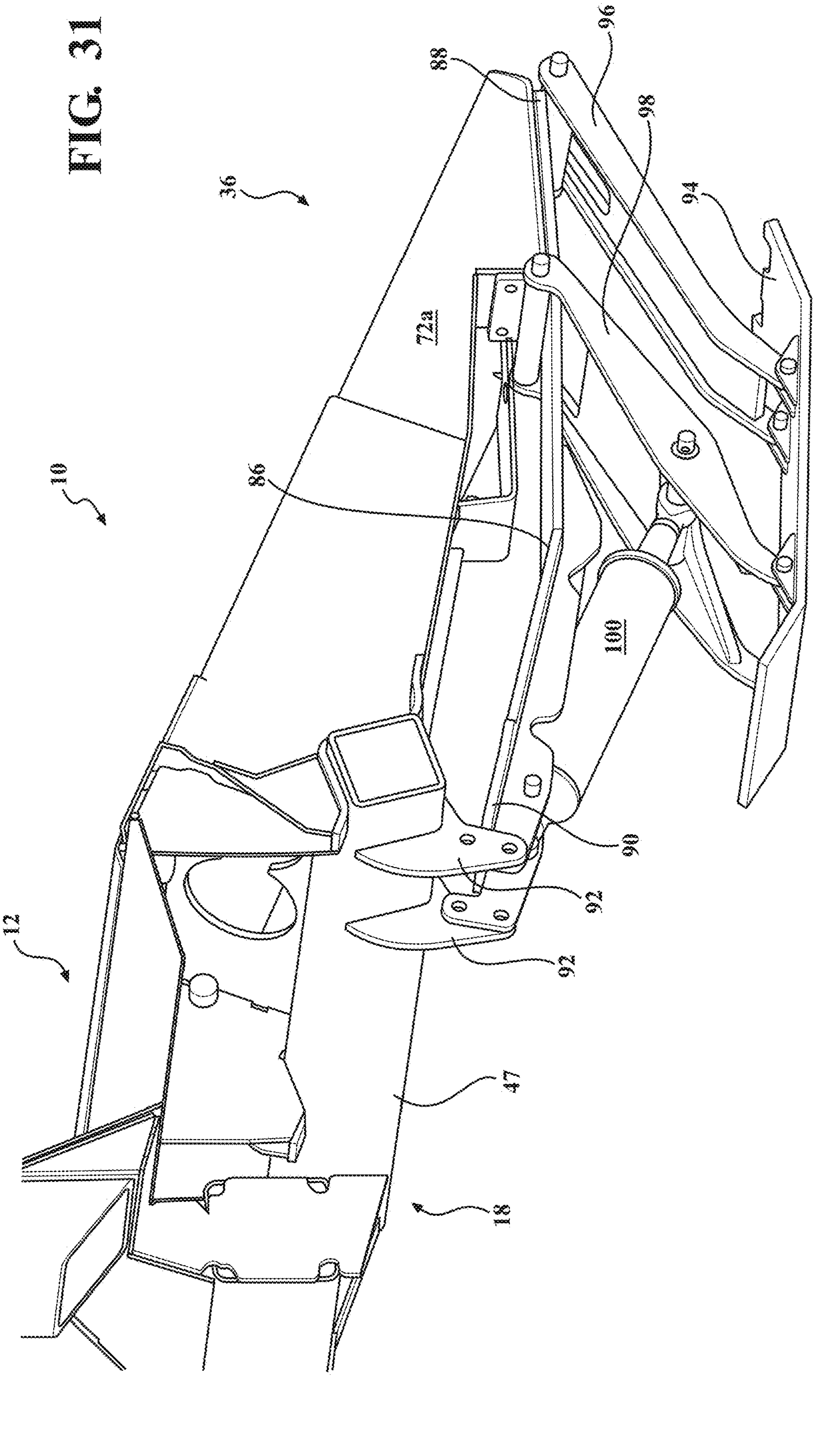
FIG. 31 is an enlarged fragmentary perspective view of the header of FIG. 1 further showing one of the pair of skid shoe assemblies in the extended position.
Figure 32A:
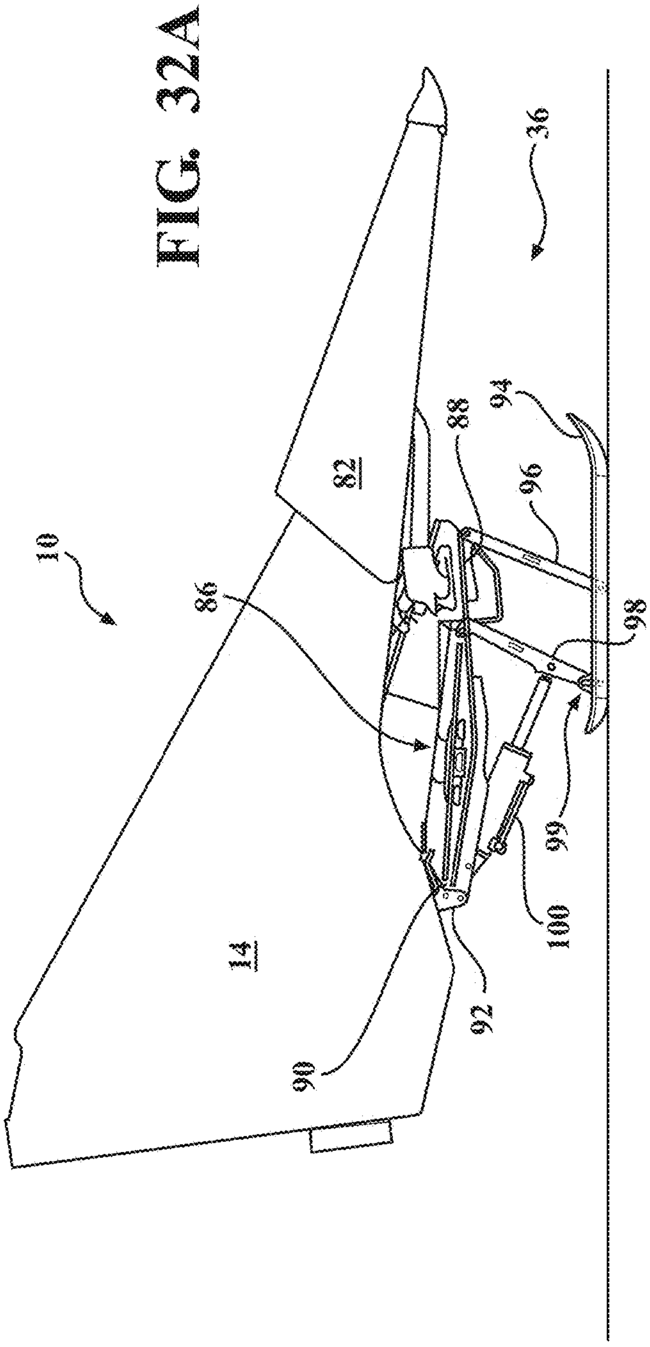
FIG. 32A is a side view of the header of FIG. 1 further showing one of the pair of skid shoe assemblies in the extended position.
Figure 32B:
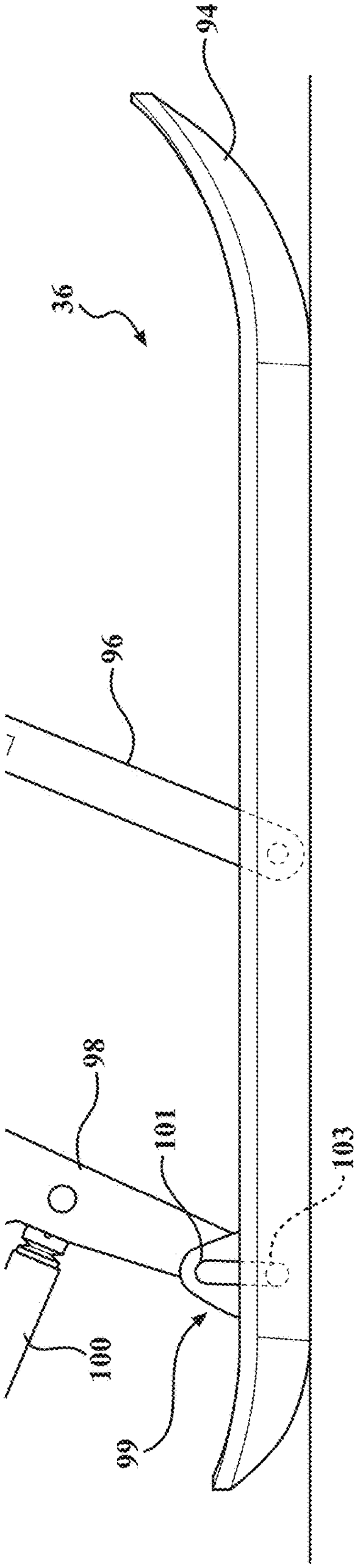
FIG. 32B is an enlarged fragmentary side view of the header of FIG. 1 showing a portion of a rear attachment arm received in a corresponding vertically-elongated slot of a skid shoe plate.
Figure 33A:
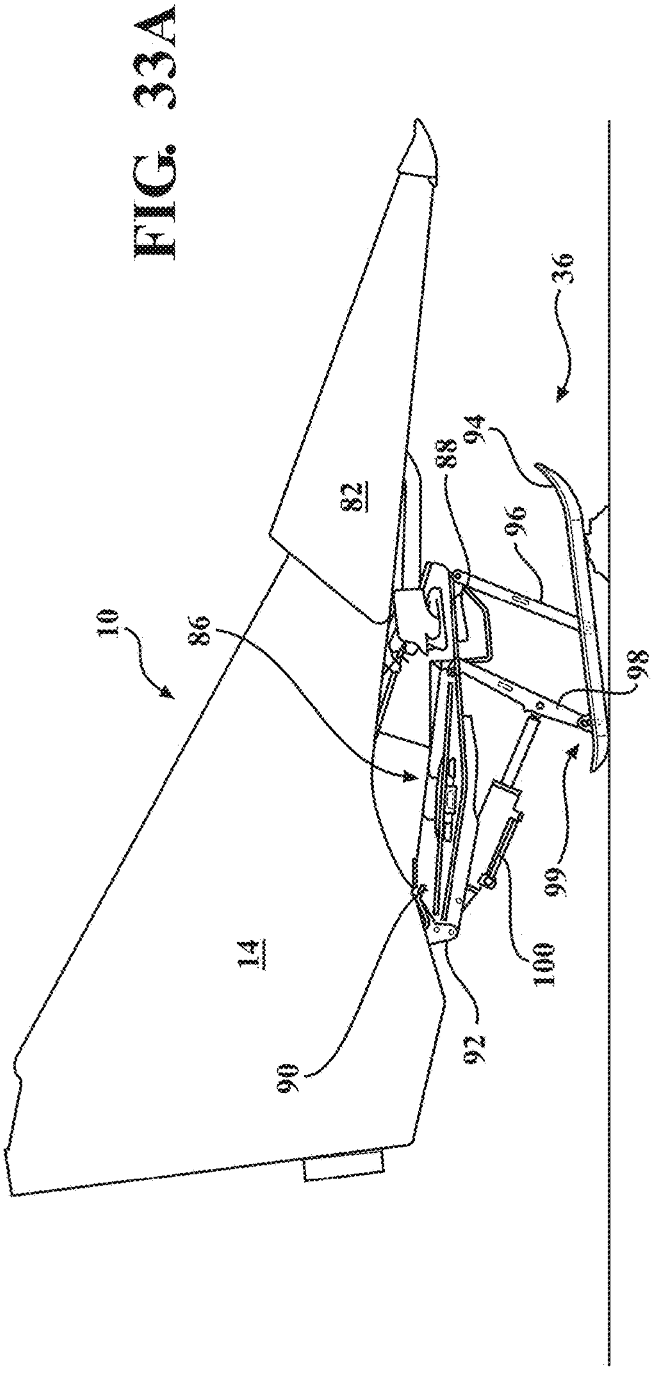
FIG. 33A is a side view of the header of FIG. 1 further showing one of the pair of skid shoe assemblies in the extended position and the skid shoe plate pivoting to pass over an obstacle on a field.
Figure 33B:
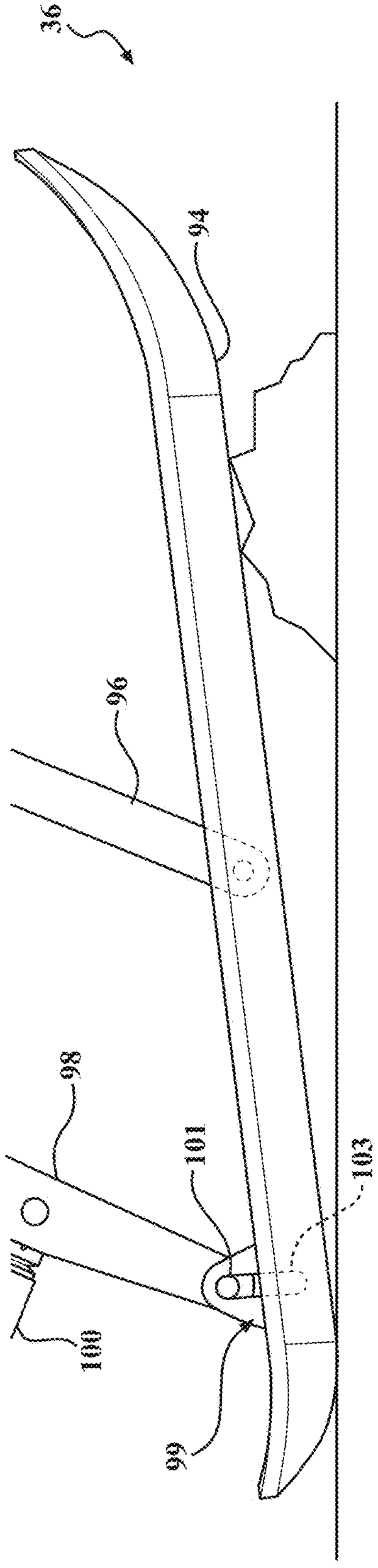
FIG. 33B is an enlarged fragmentary side view of the header of FIG. 1 showing the portion of the rear attachment arm received in the corresponding vertically-elongated slot of the skid shoe plate and additionally showing the skid shoe plate pivoting to pass over the obstacle on the field.

Referring to FIGS. 30 and 31, the skid shoe assemblies 36 are operatively attached to the row units 72*a* adjacent the ends 14 of the header frame 12 for setting and maintaining the cut height of the header 10 and engaging the surface of the field as the header 10 is moved across the field for harvesting the row crops. The skid shoe assemblies 36 each include a skid shoe bracket 86 affixed to the respective row units 72*a*. The skid shoe brackets 86 extend between a front end 88 and an opposite rear end 90. Each rear end 90 thereof is secured between a pair of mounting brackets 92 extending downwardly from the respective second lower support beam 47, as shown in FIG. 31. Each front end 88 is secured by to mounting bracket 93 to the row unit 72*a*. Each skid shoe assembly 36 further includes a skid shoe plate 94 for engaging the surface of the field. Each skid shoe plate 94 is rotatably coupled to the respective skid shoe bracket 86 by substantially parallel front and rear pairs of attachment arms 96, 98, as shown in FIGS. 30 and 31. Referring to FIGS. 32A-33B, lower portions of the rear attachment arms 98 are received in corresponding vertically-elongated slots 99 in the skid shoe plates 94, with each slot 99 extending between a top portion 101 and an opposite bottom portion 103. When the skid shoe plates 94 engage the field, the lower portions of the rear attachment arms 98 are typically disposed in the bottom portions 103 of the respective slots 99 to keep the skid shoe plates 94 fully engaged with the surface of the field, as shown in FIGS. 32A and 32B. However, when the skid shoe plates 94 encounter obstacles or debris on the field, the slots 99 allow the lower portions of the rear attachment arms 98 to temporarily move to the top portions 101 of the respective slots 99 for upwardly pivoting the skid shoe plates 94, as shown in FIGS. 33A and 33B. While upwardly pivoted, the skid shoe plates 94 can pass over, rather than push or accumulate, the obstacles or debris.

Figure 34:
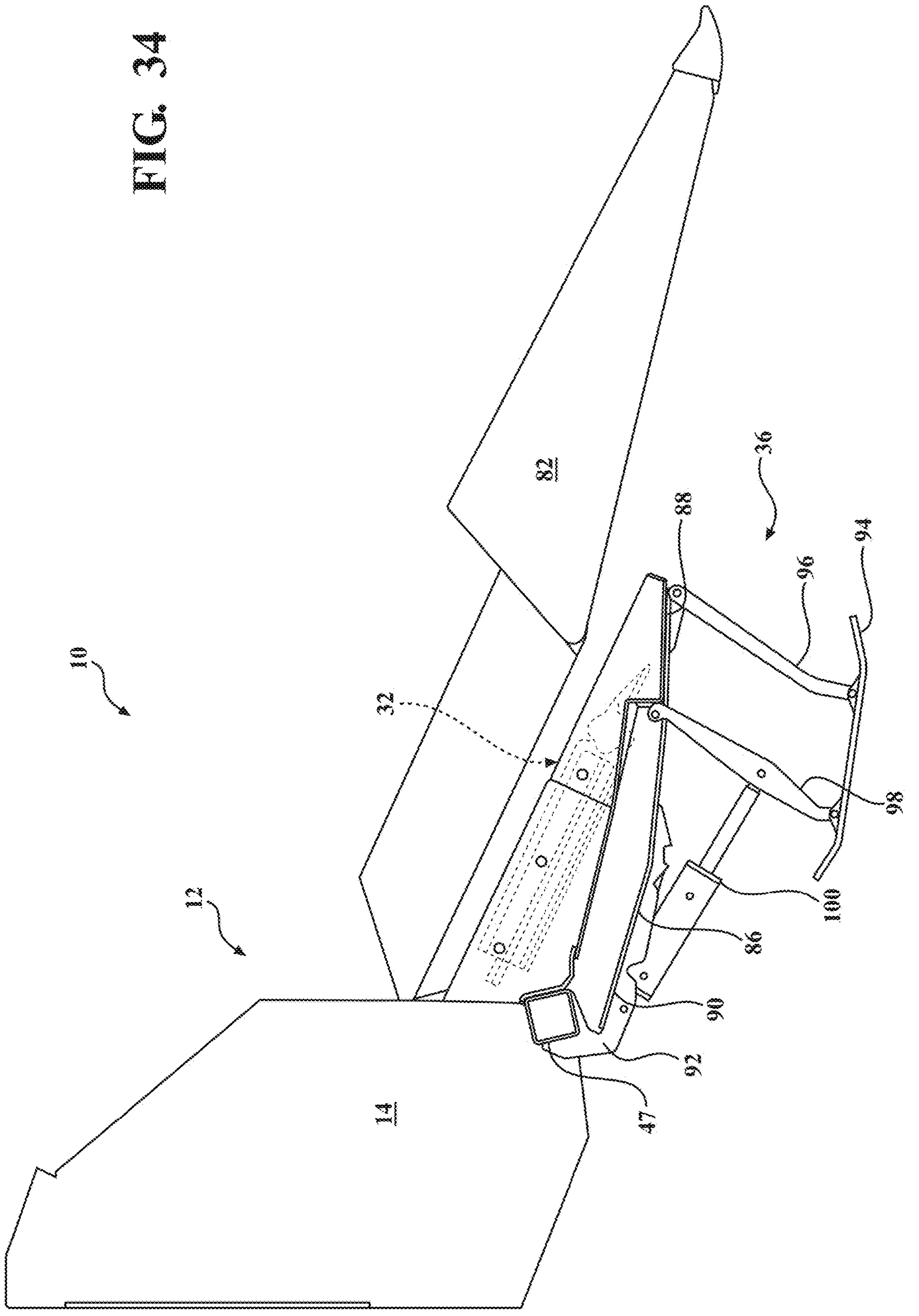
FIG. 34 is a side view of the header of FIG. 1 showing one of the pair of skid shoe assemblies in the extended position.
Figure 35:
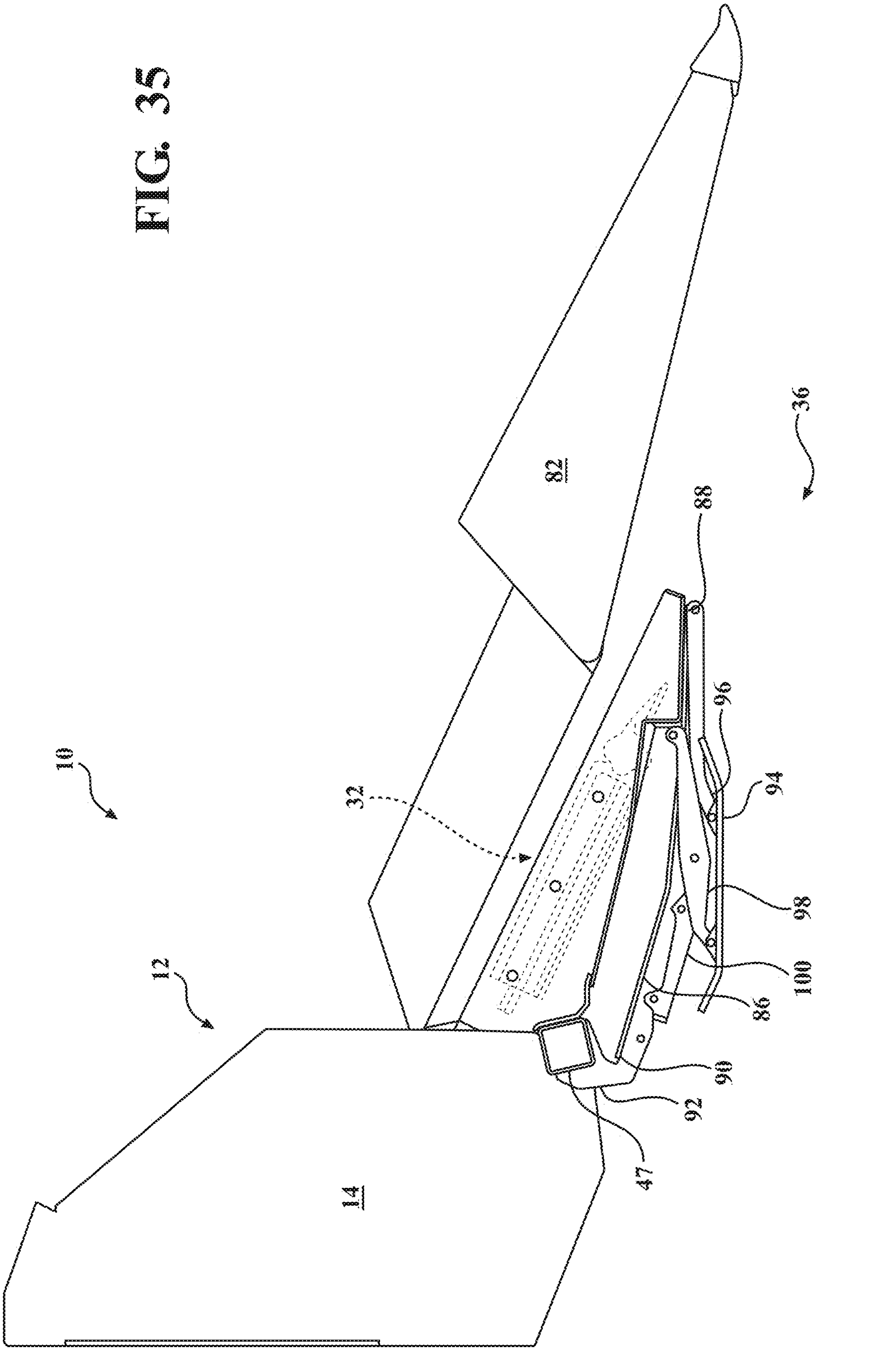
FIG. 35 is a side view of the header of FIG. 1 showing one of the pair of skid shoe assemblies in a retracted position.

Referring to FIGS. 30 and 31, a hydraulic cylinder 100 extends between the rear end 90 of each skid shoe bracket 86 and the respective pairs of rear attachment arms 98 for correspondingly rotating the front and rear pairs of attachment arms 96, 98 to move the skid shoe plates 94 between a plurality of extended and retracted positions relative to the side wing sections 18 of the header frame 12, as shown in FIGS. 34 and 35. It is to be appreciated that the skid shoe assemblies 36 may include any suitable number of attachment arm pairs 96, 98 and hydraulic cylinders 100, and may be coupled to the header frame 12 in any suitable manner, without varying the scope of the invention. The position of the skid shoe plates 94 relative to the side wing sections 18 of the header frame 12 is adjustable by an operator, as described in further detail below, to set and maintain the cut height of the header 10. The header frame 12 therefore remains a consistent height above the surface of the field as determined by the extended or retracted position of the skid shoe plates 94, regardless of the surface over which the header 10 travels, including various sections of the farmable terraces. It is also contemplated that the skid shoe assemblies 36 may each include a proximity sensor to monitor the positions of the skid shoe plates 94 relative to the respective side wing sections 18 of the header frame 12.

The header 10 further includes a float system operatively coupled between the center and side wing sections 16, 18 of the header frame 12 to reduce weight on the skid shoe plates 94 as the skid shoe plates 94 engage the surface of the field. Reducing weight on the skid shoe plates 94 helps to prevent the skid shoe plates 94 from digging into the surface of the field as the header 10 travels across the field, thereby allowing the skid shoes plates 94 to "float" over the surface of the field at a predetermined, consistent load, even as the side wing sections 18 of the header frame 12 pivot relative to the center section 16. Referring to a first embodiment of the header 10, shown in FIGS. 7-12, the float system is a hydraulic float system, shown generally at 102. The hydraulic float system 102 includes a hydraulic cylinder 104 corresponding to each side wing section 18 of the header frame 12 for operatively reducing weight on the skid shoe plates 94, the operation of which is described in further detail below. Each hydraulic cylinder 104 extends between a first end 106 and an opposite second end 108. The first end 106 of each hydraulic cylinder 104 is operatively coupled to a third attachment bracket 112 extending from the inner support member 40 of the side wing section 18 underneath and adjacent to the first attachment bracket 54. The second end 108 of each hydraulic cylinder 104 is operatively coupled to a fourth attachment bracket 110 extending upwardly from the center section 16 of the header frame 12 above and adjacent to the first attachment point 55.

Referring to FIGS. 36-39, the first embodiment of the header 10 further includes mechanical locking links 111 rotatable between a storage position and a locked position for selectively preventing pivoting of the side wing sections 18 of the header frame 12. Each locking link 111 extends between a first end 113 and an opposite second end 114 and further includes an aperture 115 adjacent the first end 113 thereof and an elongated slot 117 adjacent the second end 114 thereof. The second end 114 of each locking link 111 is rotatably coupled to the center section 16 of the header frame 12 at the attachment bracket 110 such that a portion of each attachment bracket 110 extends through the respective elongated slot 117.

Figure 36:
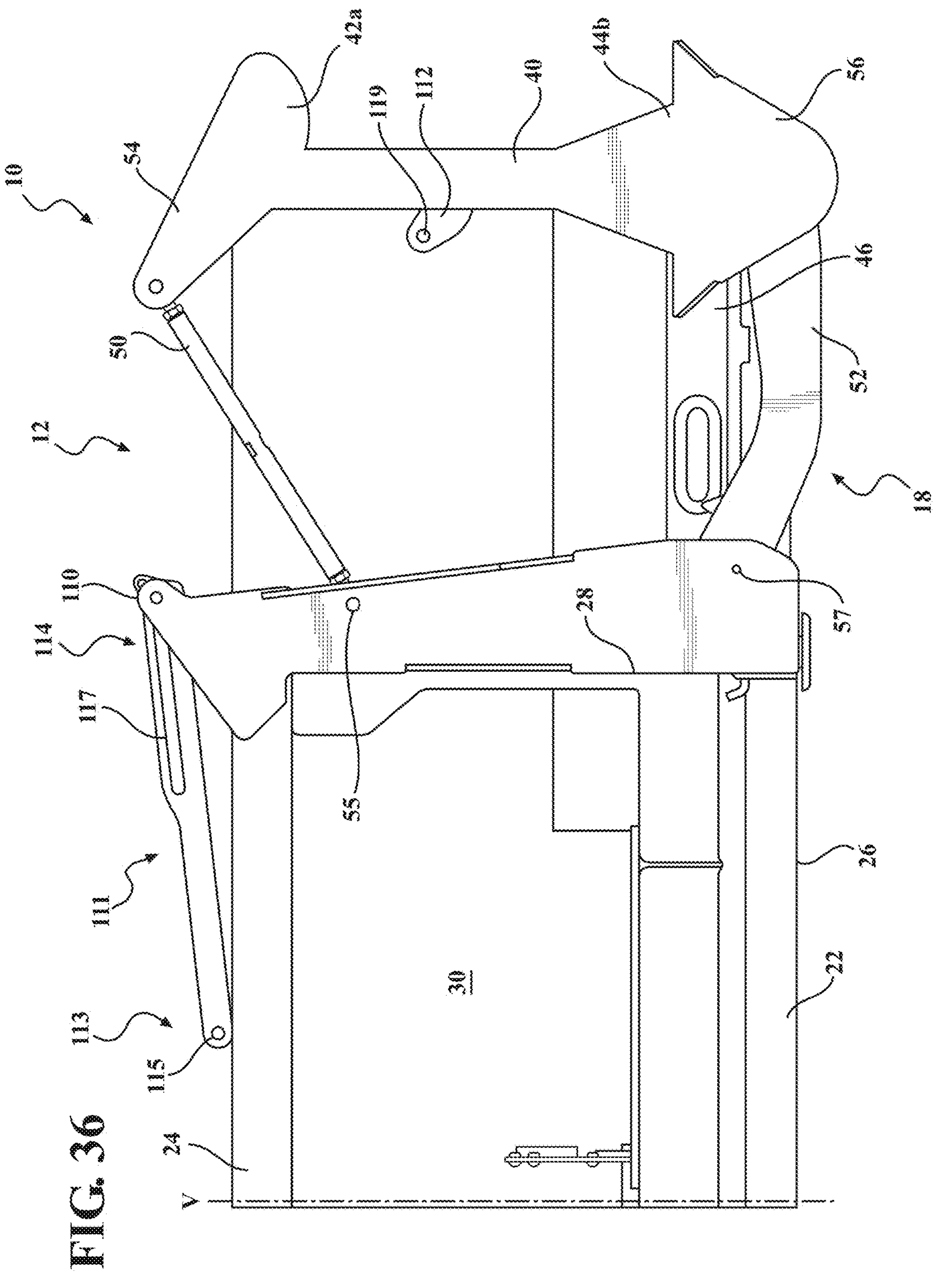
FIG. 36 is a fragmentary rear view of the header of FIG. 1 showing a mechanical locking link in a storage position.
Figure 37:
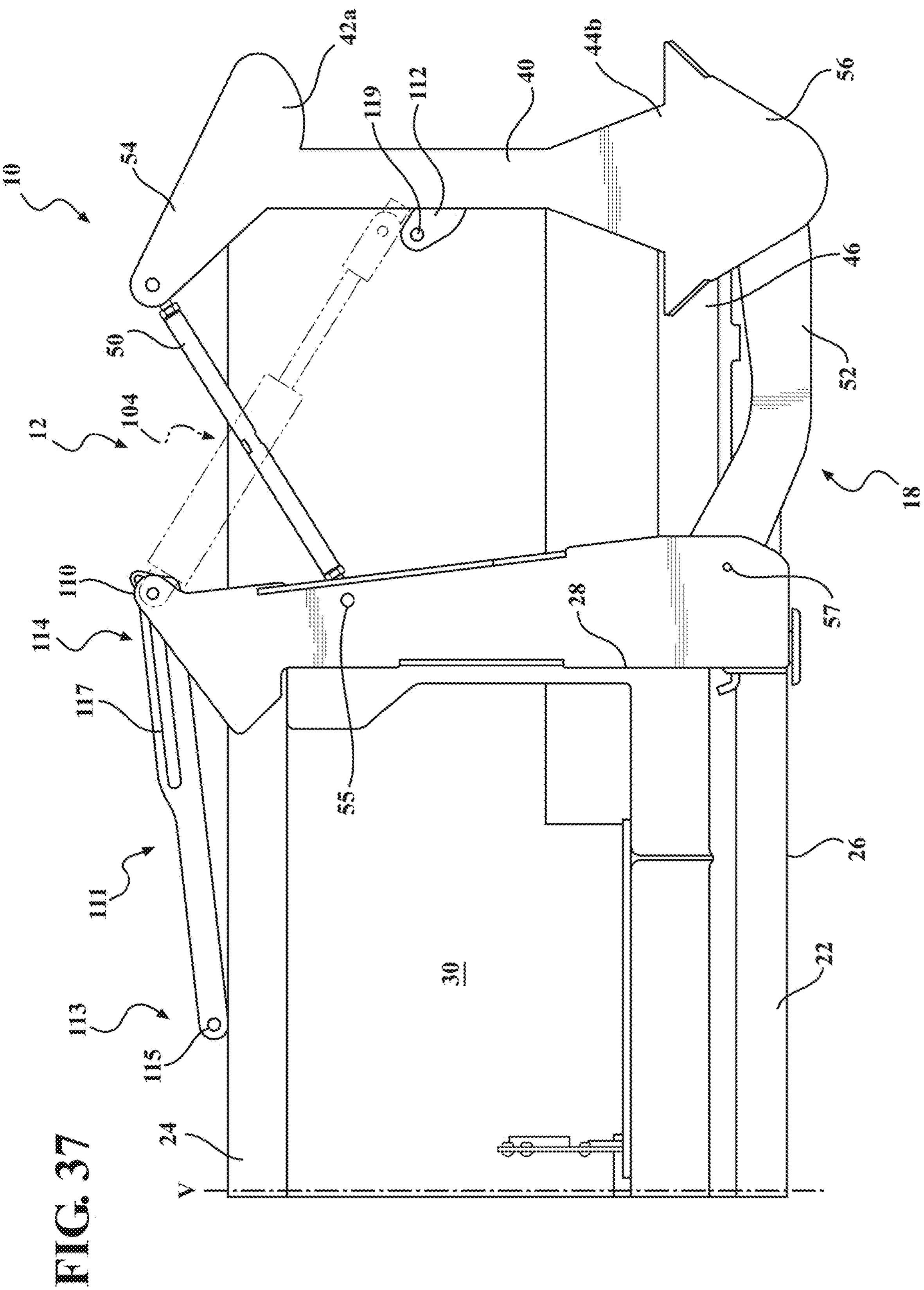
FIG. 37 is a fragmentary rear view of the header of FIG. 1 further showing the mechanical locking link in the storage position.
Figure 38:
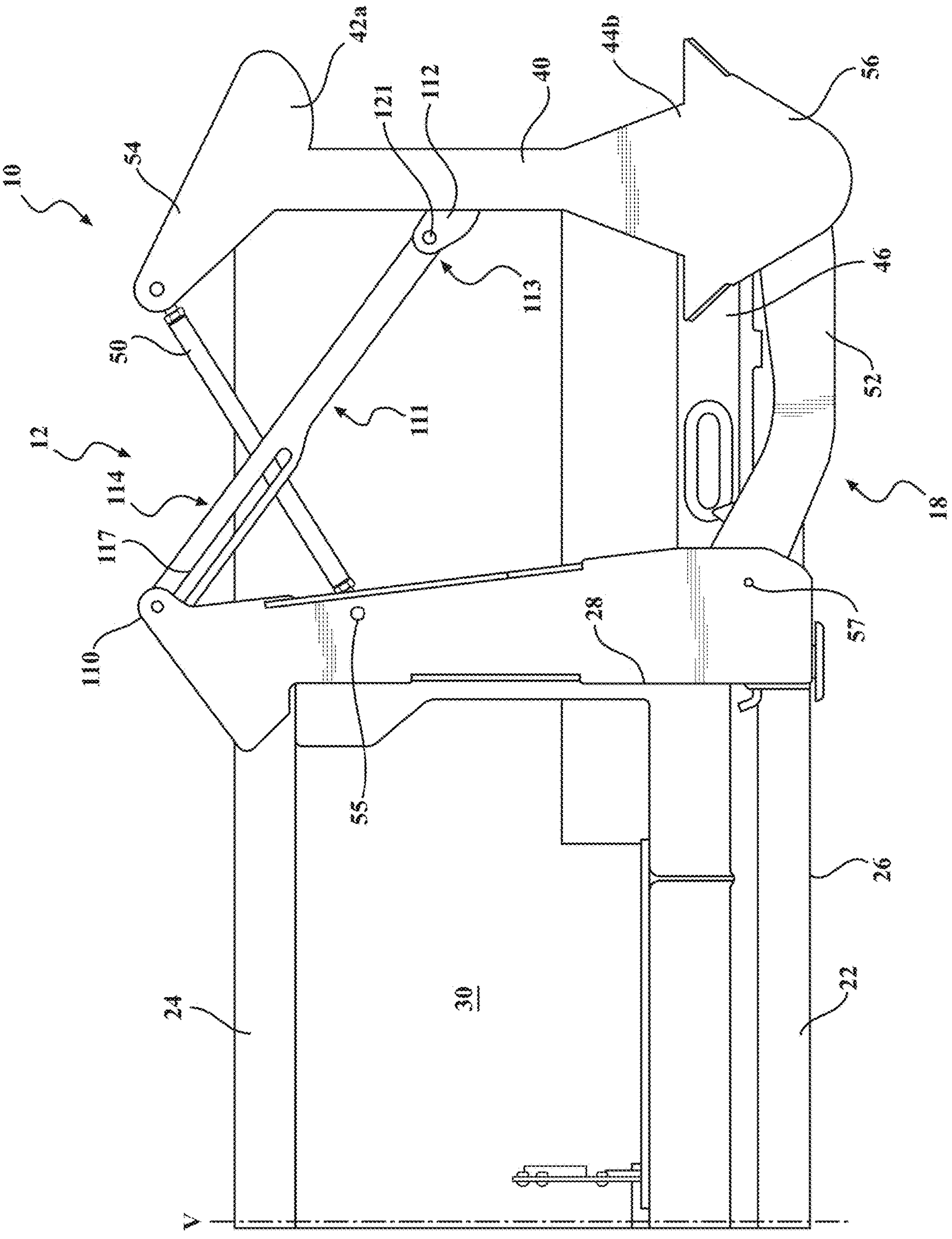
FIG. 38 is a fragmentary rear view of the header of FIG. 1 showing the mechanical locking link in a locked position.
Figure 39:
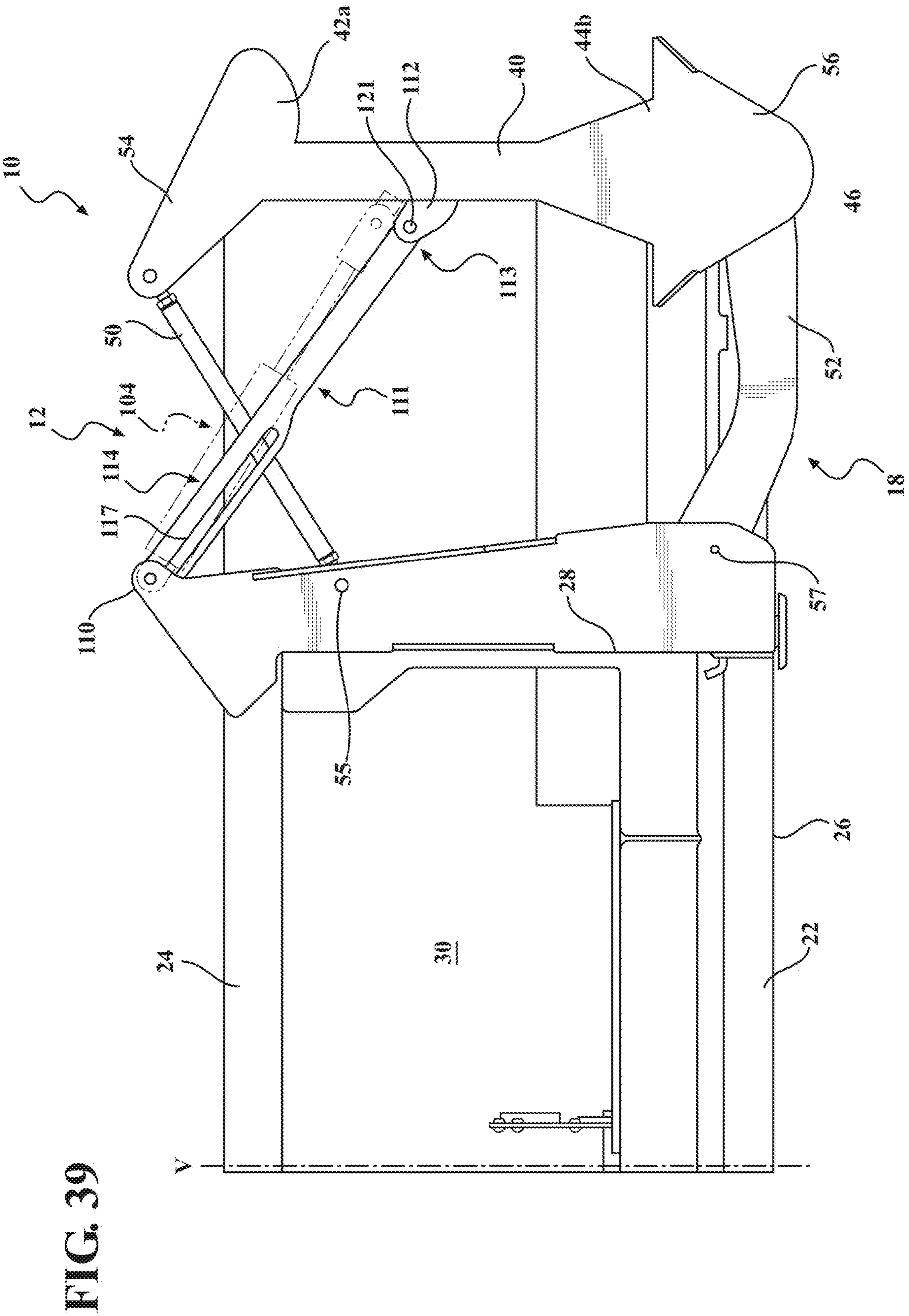
FIG. 39 is a fragmentary rear view of the header of FIG. 1 further showing the mechanical locking link in the locked position.

During typical harvesting operation of the header 10, the mechanical locking links 111 are positioned adjacent to vertical line V in the storage position, as shown in FIGS. 36 and 37, thereby allowing the side wing sections 18 of the header frame 12 to pivot relative to the center section 16 to contour to the surface of the field, including the farmable terraces, as described above. However, for other operations where it is beneficial for the side wing sections 18 to remain level with the center section 16, including transport of the header 10, the locking links 111 can be rotated from the storage position to the locked position for preventing pivoting of the side wing sections 18, as shown in FIGS. 38-39. In the locked position, the locking links 111 are positioned away from vertical line V substantially parallel to the hydraulic cylinders 104, as shown in FIG. 39, such that the aperture 115 in each locking link 111 is aligned with a corresponding aperture 119 in the attachment brackets 112 on the side wing sections 18 of the header frame 12. A removable pin 121, as is known in the art, is inserted through both the apertures 115 in the locking links 111 and the apertures 119 in the attachment brackets 112 to secure and retain the locking links 111 in the locked position, thereby keeping the side wing sections 18 level relative to the center section 16 of the header frame 12, as desired. It is also to be appreciated that any number of other removable pins, including a removable pin inserted through both the attachment brackets 110 and the elongated slots 117, may be used to further secure the locking links 111 in the storage or locked position, as desired.

A second embodiment of the header 10' is shown in FIGS. 13-18, wherein like elements of the second embodiment include primed like element numbers and, as the elements are substantially similar, will not be further explained herein. Rather than the hydraulic float system, the second embodiment of the header 10' instead includes a spring float system, shown generally at 116. The spring float system 116 performs a substantially similar function as the hydraulic float system of allowing the skid shoe plates 94" to "float" over the surface of the field at a predetermined, consistent load, even as the side wing sections 18' of the header frame 12' pivot relative to the center section 16', such as when harvesting on various sections of farmable terraces.

The spring float system 116 includes a spring attachment arm 118 corresponding to each side wing section 18' of the header frame 12'. Each spring attachment arm 118 extends between a medial end 120 and an opposite lateral end 122. The medial end 120 of each spring attachment arm 118 is pivotally coupled to a third attachment point 124 disposed at the edge 28' of the center section 16' of the header frame 12' above the respective second attachment point 57'. The spring attachment arm 118 extends laterally from the third attachment point 124 and terminates at the lateral end 122, which is spaced from the inner support member 40. A coil spring 126 extends downwardly from the lateral end 122 of each spring attachment arm 118 and is operatively coupled to the respective first lower support beam 46' of the side wing section 18' adjacent the inner support member 40'. A hydraulic cylinder 128 extends from each spring attachment arm 118 between the medial and lateral ends 120, 122 thereof to the center section 16' of the header frame 12'. The hydraulic cylinders 128 pivot the spring attachment arms 118 upwardly and downwardly relative to the center section 16' of the header frame 12' to optimize position of the coil springs 126 for regulating spring force, thereby allowing the skid shoe plates 94' to float over the surface of the field as described above.

Referring to FIGS. 13-18, the second embodiment of the header 10' also includes locking links 130 for selectively locking and unlocking the side wing sections 18' of the header frame 12'. Each locking link 130 extends between a first end 131 and an opposite second end 133 with a T-shaped slot 135 positioned adjacent the first end 131 thereof. The T-shaped slots 135 include two lateral arms (i.e., the "top" of the T-shaped slot) and a lower detent (i.e., the "bottom" of the T-shaped slot). The second end 133 of each locking link 130 is rotatably coupled to the respective fourth attachment bracket 110' of the center section 16', and the first end 131 of each locking link 130 is operatively coupled to the first attachment bracket 54' of the respective side wing section 18' such that a portion of the first attachment bracket 54' extends through the respective T-shaped slot 135. Using the hydraulic cylinders 128, as described in further detail below, the side wing sections 18' can be locked to remain level relative to the center section 16' of the header frame 12' when the respective portion of each first attachment bracket 54' is disposed in the bottom detent of the respective T-shaped slot 135.

Referring to FIGS. 45-49, the header 10 may also include a stalk deflector 200 for diverting leaning or down crop stalks downwardly towards the ground and under the front of the skid shoe plate 94 so that the crop stalks do not hook, pinch or interfere with the front skid shoe attachment arm 96. The stalk deflector 200 includes a link 202 extending between a first end 204 pivotally coupled to the skid shoe plate 94 at pivot 206 and an opposite second end 208 having a roller 210 slidably coupled to the bottom of the snout 82. More specifically, a bracket 212 is attached to the bottom of the snout 82 defining an elongated slot 214 for slidably receiving and guiding the roller 210 therein between first and second ends 216, 218. As shown in FIGS. 46-49, the roller 210 and slot 214 connection of the deflector link 202 to the snout 82 allows the skid shoe plate 94 to pivot when encountering objects in the field or when adjust the height or angular position of the snout 82 relative to the field.

Figure 54:
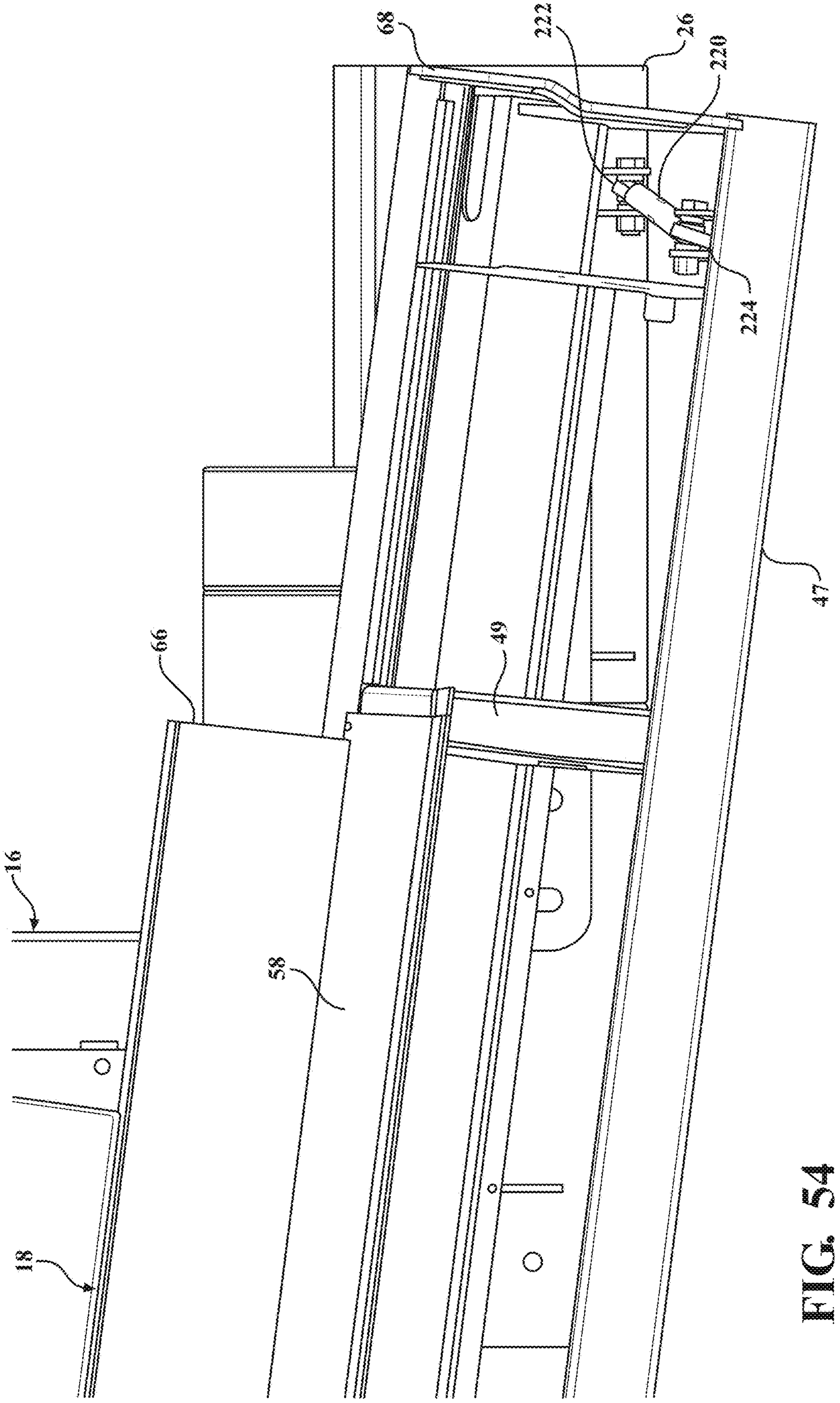
FIG. 54 is a fragmentary front view of the draft links with the wing section in a raised position.
Figure 55:
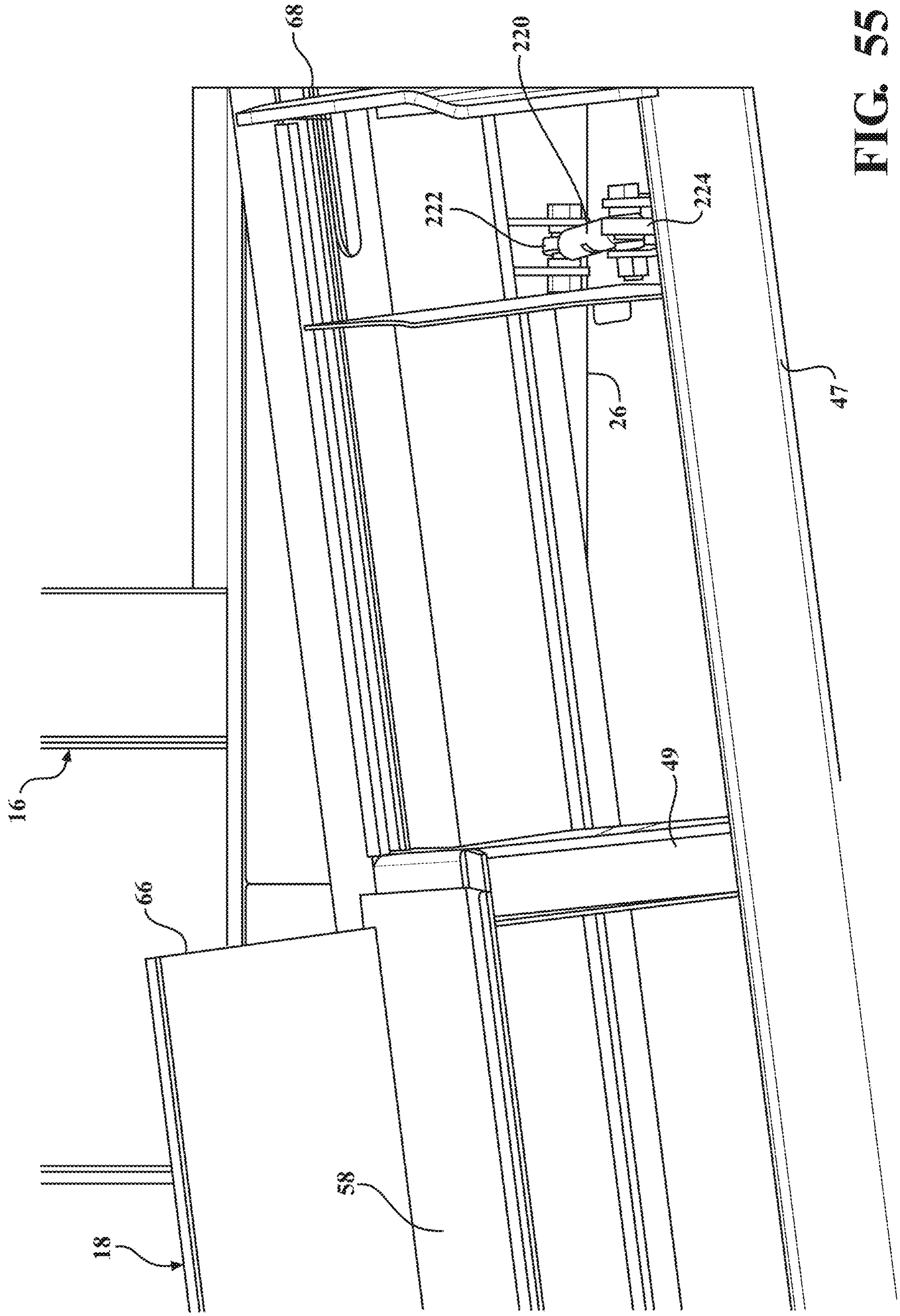
FIG. 55 is a fragmentary front view of the draft links with the wing section in a lowered position.

Referring to FIGS. 50-55, the header 10 also includes a draft link 220 extending between the center section 16 and each of side wing sections 18 to add strength to the header 10 and to keep the auger pan 58 positioned close to the opening 30 to the combine. More specifically, the draft link 220 is a linear manually adjustable cylinder extending between a first end 222 pivotally coupled to the bottom portion 26 of the center section 16 adjacent the center vertical line V and an opposite second end 224 pivotally coupled adjacent the inner distal end of the second lower support beam 47 of each side wing section 18. The pivotal connections at each end 222, 224 of the draft link 220 allow the side wing section 18 to still pivot through it range to follow the contour of the field to be harvested. However, the draft links 220 maintain the spacing or distance of the auger pan 58 to the aperture 30 in the center section 16 for feeding the cut crop into the combine. FIGS. 54 and 55 show the pivotal movement of the side wing sections 18 relative to the center section 16 with the minimal angular movement of the draft links 220 pivotally coupled therebetween to stabilize the pivotal connection between the side wing sections 18 and the center section 16.

Float System Control

Figure 40:
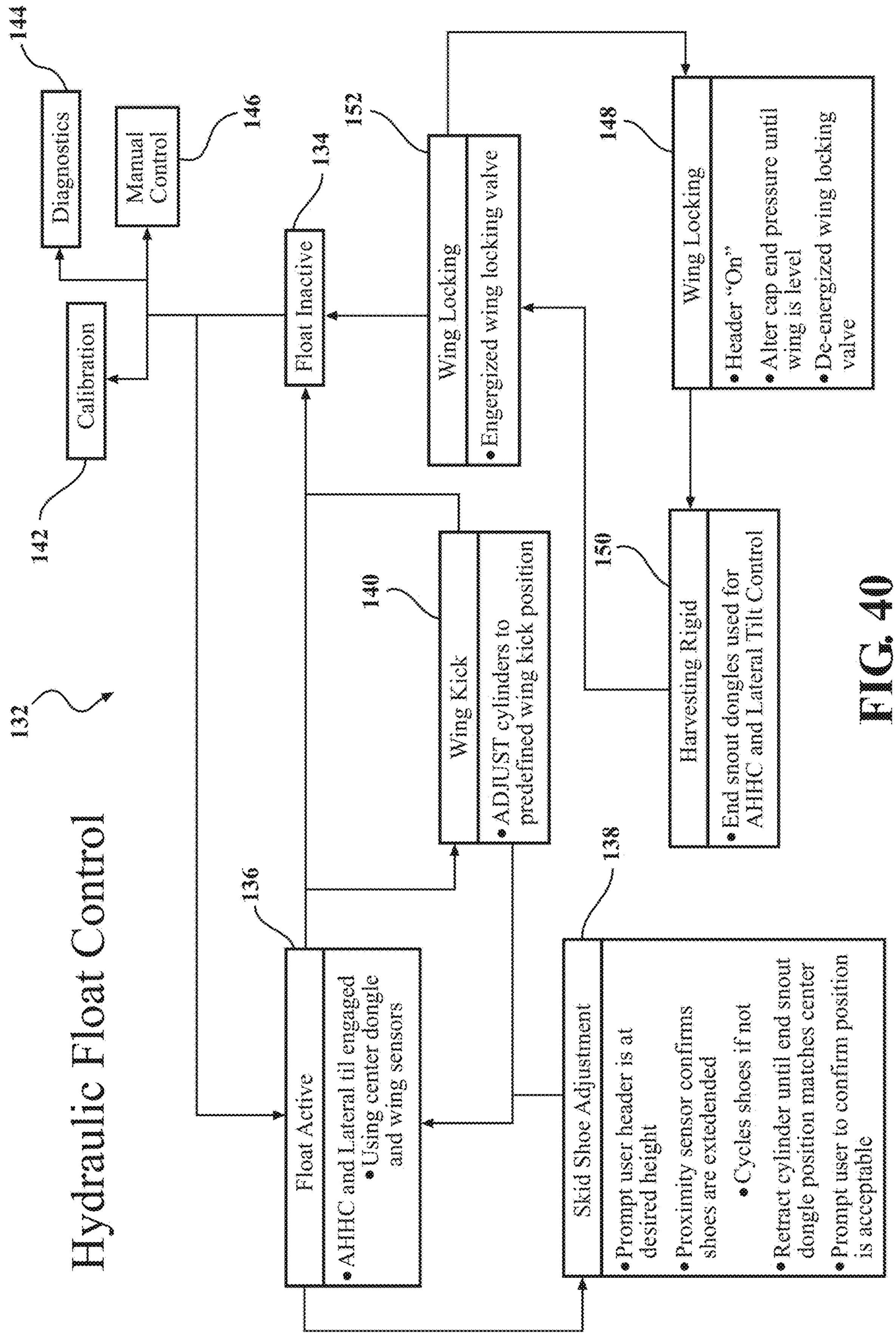
FIG. 40 is a flow diagram showing control of the hydraulic float system of the header of FIG. 1.

FIG. 40 illustrates a flow diagram 132 for controlling the hydraulic float system 102 on the header 10 using a control system. The control system transitions from a Float Inactive state 134 to a Float Active state 136 when the control system determines that the header 10 is "on" and that the header 10 has been lowered to the ground. The control system determines that the header 10 is "on" when pressure is detected on a combine supply circuit between a priority flow control valve 608 and a solenoid-controlled valve 627 (discussed with respect to FIG. 44D below). The control system determines that the header 10 has been lowered to the ground when voltage of an Automatic Header Height Control (AHHC) dongle is less than 4.5V for more than one second. When the hydraulic float system 102 is in the Float Active state 136, a center dongle and the wing position sensors are used for AHHC and lateral tilt control of the header 10.

To adjust the position of the skid shoe plates 94, shown at 138 in FIG. 40, the operator provides input to the control system to adjust the position of the skid shoe plates 94. The header 10 should be on level ground and stationary, although still running, to complete the initial height adjustment of the skid shoe plates 94. The control system requests the desired height from the operator, and the control system then moves the skid shoe plates 94 on each end 14 of the header frame 12 to the extended position. If the proximity sensors do not confirm that the skid shoe plates 94 are both fully extended, the hydraulic cylinders 100 are rephased until the proximity sensors confirm that both skid shoe plates 94 are fully extended. The control system then retracts the hydraulic cylinders 100 until an end snout dongle position matches a position of the center section 16 of the header frame 12. The control system then prompts the operator to confirm that the new position of the skid shoe plates 94 is acceptable. After the operator confirms that the new position of the skid shoe plates 94 is acceptable, the header 10 is turned back "on," and the control system returns to the Float Active state 136. In the Float Active state 136, the hydraulic cylinders 100 continuously adjust the position of the skid shoe plates 94 so that the end snout dongle position matches the position of the center section 16 of the header frame 12 (i.e., the relative position of the side wing sections 18 to the center section 16 of the header frame 12 remains constant).

While the header 10 is "on," if the control system detects that the AHHC dongle is greater than 4.5V for more than 2.5 seconds (i.e., that the header 10 has been raised), the control system enters a Wing Kick state 140. With the header 10 raised, the side wing sections 18 of the header frame 12 will typically droop relative to the center section 16 of the header frame 12. Thus, in the Wing Kick state 140, the control system adjusts the hydraulic cylinders 104 to a predefined wing kick position to raise the side wing sections 18 of the header frame 12 above level to gain additional ground clearance relative to the surface of the field when traveling across the field while not harvesting. This prevents the ends 14 of the header frame 12 from contacting the ground and becoming damaged. The control system returns to the Float Active state 136 when the header 10 is lowered and the control system determines that the AHHC dongle is less than 4.5V for more than one second.

When the operator turns the header 10 "off" (i.e., when pressure is not detected on the combine supply circuit), either from the Float Active state 136 or the Wing Kick state 140, the control system becomes inactive. From the Float Inactive state 134, the control system may be calibrated 142, diagnostics may be run on the system 144, or the header 10 may be manually operated 146. However, it is to be appreciated that the header 10 may need to be turned back "on" as required in any of these states.

If the operator provides input to the control system to lock the side wing sections 18 of the header frame 12 and confirms that the header 10 is raised, the control system enters a Wing Locking state 148. In the Wing Locking state 148, the control system prompts the operator to turn the header 10 to "on." The control system then alters a cap end pressure until the side wing sections 18 are level, and de-energizes a wing locking valve, thereby locking fluid in the hydraulic cylinder 104 so that it cannot extend or retract, as described in further detail below. After the side wing sections 18 are locked, the operator may harvest in a rigid mode 150. When the operator is harvesting in the rigid mode 150, the end snout dongles are used for AHHC and lateral tilt control. When the operator is done harvesting in the rigid mode 150, the operator may provide input into the control system to unlock the side wing sections 18. The control system then unlocks the side wing sections 18, shown at 152 in FIG. 40, by energizing the wing locking valve to allow fluid to move freely between the hydraulic cylinder 104 and the accumulator. After the operator turns the header "off," the control system then reenters the Float Inactive state 134.

Figure 41:
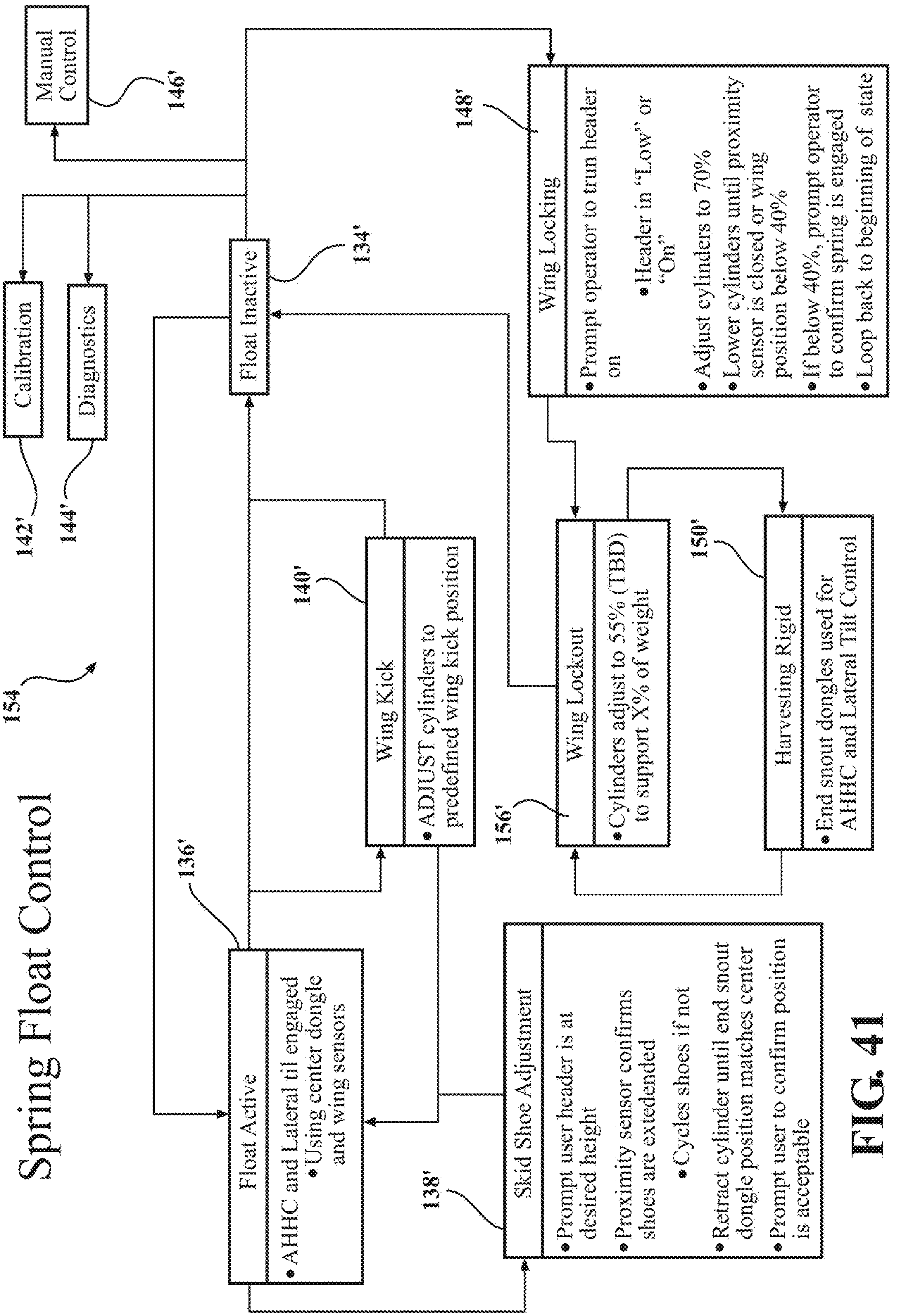
FIG. 41 is a flow diagram showing control of the spring float system of the header of FIG. 13.

FIG. 41 illustrates a flow diagram 154 for controlling the spring float system 116 on the header 10'. Operation and control of the spring float system 116 is similar to the hydraulic float system 102 except when locking and unlocking the side wing sections 18' of the header frame 12'. The control system enters the Wing Locking state 148' if the operator provides input to the control system to lock the side wing sections 18' and confirms that the coil spring 126 is engaged and that the header 10' is raised. In the Wing Locking state 148", the control system prompts the operator to turn the header 10' to "low" or "on." The control system then adjusts the hydraulic cylinders 128 to 70%, which brings the side wing sections 18' above level. The control system then slowly lowers the side wing sections 18' until either the wing position sensor closes, indicating the respective portions of the first attachment brackets 54' are disposed in the bottom detents of the T-shaped slots 135, or the side wing section 18 position goes below 40%, indicating the respective portions of the first attachment brackets 54' are not disposed in the bottom detents of the T-shaped slots 135. If the side wing section 18 position goes below 40%, the control system will prompt the operator to confirm that the coil spring 126 is engaged, and the control system readjusts the hydraulic cylinders 128 to 70%, thereby providing the wing position sensor another chance to close when the side wing sections 18 become level and the respective portions of the first attachment brackets 54' are disposed in the bottom detents of the T-shaped slots 135. When the wing position sensor closes, the side wing sections 18 are locked and the control system enters a Wing Lockout state 156.

In the Wing Lockout state 156, the hydraulic cylinders 128 are adjusted to a predetermined height (e.g., at 55%) to support a certain percentage of the side wing section 18" weight. In the Wing Lockout state 156, the side wing sections 18' do not float above the surface of the field and are rigidly fixed at level, which allows the operator to place the header 10' on a trailer or a similar implement. While the side wing sections 18' are locked, the operator also may harvest in the rigid mode 150'. When the operator is harvesting in the rigid mode 150', the end snout dongles are used for AHHC and lateral tilt control. When the operator is done harvesting in the rigid mode 150', the operator may turn the header 10' to "off" and provide input to the control system to unlock the side wing sections 18'. The control system then opens the wing position sensor, thereby unlocking the side wing sections 18'. The control system then reenters the Float Inactive state 134".

Hydraulic Systems

Referring to FIGS. 42A-44G, hydraulic systems for the first and second embodiments of the header 10, 10' are shown. The hydraulic systems are provided for operation of the spring float system 116 and the hydraulic float system 102 of the present invention, as well as other features thereof. The hydraulic systems include a plurality of subsystems for driving components of the header 10, 10' as described herein. Generally, the agricultural implement, such as the combine, includes a main hydraulic system which includes various hydraulic devices, such as pressure cylinders, a pump system for pressurizing hydraulic fluid used by the hydraulic devices, and flow control devices and pressure lines which route the hydraulic fluid to the various hydraulic devices on the combine and to the header 10, 10'. The main hydraulic control system of the combine will not be described herein, but it is to be understood that the main hydraulic system preferably serves as a fluid source for supplying hydraulic fluid to the hydraulic systems and may include additional fluid controls for controlling the operation of the header 10.

1. Spring Float System

Referring to FIGS. 42A-42G, the second embodiment of the header 10', which has the spring float system 116 (as shown in FIGS. 13-18), includes a hydraulic system 500. In more detail as to FIG. 42A, the several sub-systems include a deck plate control system 501, an end divider drive system 502, a skid shoe lift system 503, and a float control system 504, which are all provided with hydraulic fluid from one or more pressure sources, such as the main hydraulic system of the combine. The term pressure source is not so limited as to require that the pressurized fluid be provided by the combine, but it shall encompass any pressure source that supplies hydraulic fluid to the hydraulic system 500.

Figure 42A:
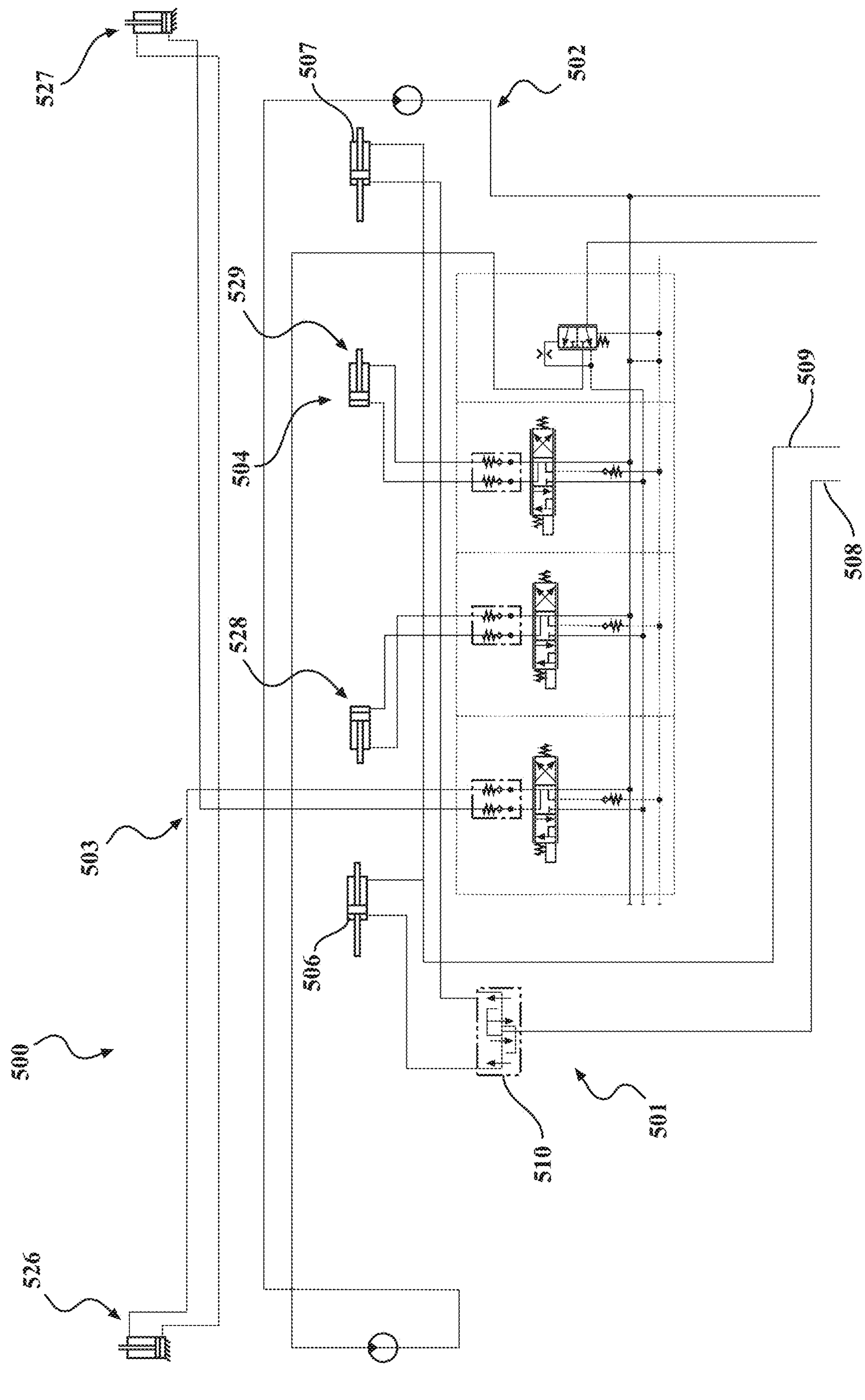
FIGS. 42A-42G are diagrammatic charts showing operative configurations of a hydraulic system of the header of FIG. 13.
Figure 42B:
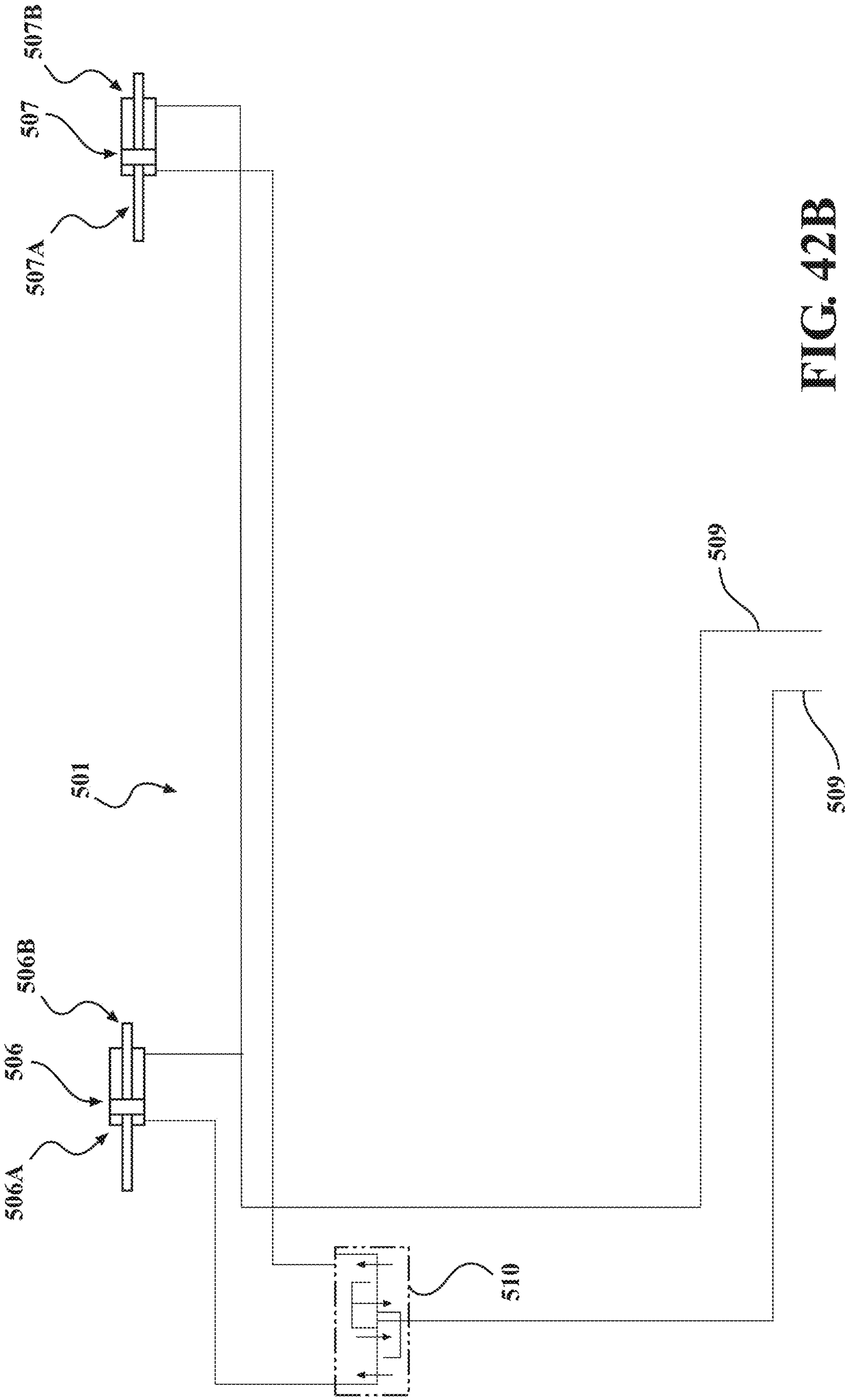

First, as to the deck plate control system 501, the header 10' may include a known system of movable deck plates that can be operated to narrow or widen the header 10' on the left hand (LH) and right hand (RH) sides thereof. In a preferred configuration as schematically shown in FIG. 42B, a deck plate includes an associated pressure cylinder, wherein the LH and RH deck plate pressure cylinders are designated by reference numerals 506, 507 and configured for moving the LH and RH deck plates. The pressure cylinders 506, 507 are operated to selectively displace the deck plates on the header 10' in opposite outward and inward directions.

The deck plate control system 501 includes pressure lines 508, 509 which direct pressurized hydraulic fluid to and from the combine fore/aft circuit provided on the combine. The pressure line 508 connects to a flow divider valve 510, which serves to proportionally divide an inlet flow or combine return flows, and further connects to one piston side 506A/507A of the pressure cylinders 506, 507. The other piston sides 506B/507B of the pressure cylinders 506/507 connect to the pressure line 509. The pressure lines 508, 509 in turn connect to a combine controller such as a joystick controller so that the operator can selectively control movement of the deck plates in opposite inward and outward directions.

Figure 42C:
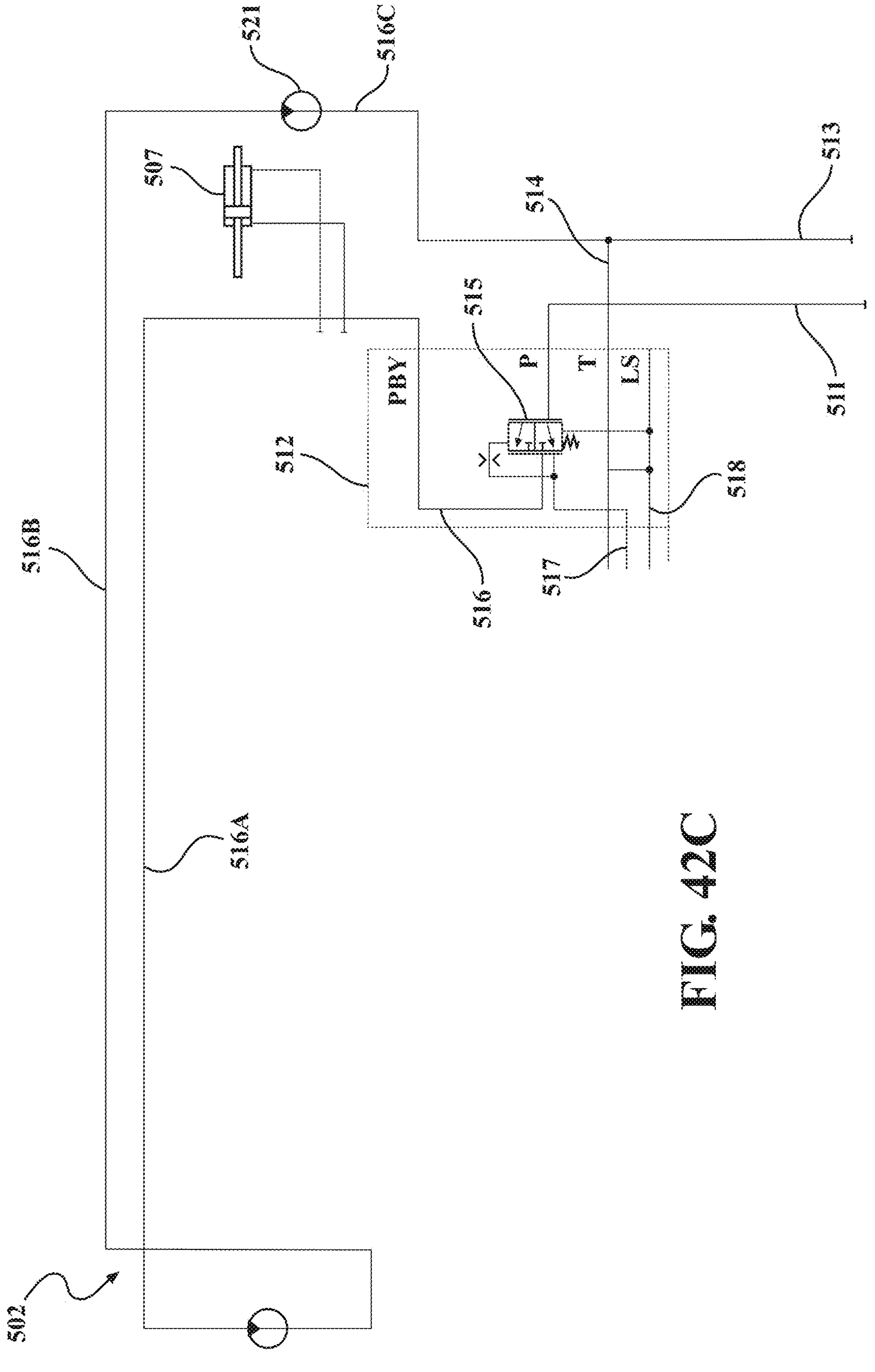

Next as to the end divider drive system 502 shown in more detail in FIG. 42C, a rotary end divider option may be provided on the header 10' to lift downed crop and aid in down crop conditions. The rotary end dividers are known and optionally provided on corn headers, wherein the rotary speed of the rotary end dividers is adjustable from the cab. Detailed disclosure as to the control system for the rotary end dividers is not necessary for an understanding of the present invention, but it will be understood that the end divider drive system 502 operates cooperatively with the skid shoe lift system 503 and the float control system 504 as described below.

To power the end divider drive system 502, a main system supply line 511 receives pressurized hydraulic fluid from a pressure source, such as the combine reel drive circuit provided on the combine, and connects to the pressure port P on a manifold unit 512. The end divider drive system 502 also includes a main return or drain line 513, which returns the pressure fluid to a fluid tank or other component of the main hydraulic system. The return line 513 also connects to an intermediate return line 514 that is connected to the manifold unit 512 at the tank port T and to the return line 514 by a T-connection.

In the manifold, the supply line 511 supplies fluid to port P, which in turn routes the pressure fluid to a priority flow control valve 515. The priority flow control valve 515 selectively supplies pressure fluid to an end divider supply line 516 and a further system supply line 517, which supplies pressure fluid to the skid shoe lift system 503 and the float control system 504 as will be described further herein. Further, the priority flow control valve 515 is connected to a load sense line 518 that also connects to the skid shoe lift system 503 and the float control system 504. Operation of the end divider drive system 502 is operatively governed by the priority flow control valve 515 which prioritizes operation of the skid shoe lift system 503 and the float control system 504 over the end divider drive system 502.

The supply line 516 exits the manifold unit 512 through port PBY and continues through a line connection to a downstream pressure line section 516A. The line section 516A connects to and drives rotation of a hydraulic motor 520, which in turn connects to a downstream pressure line section 516B that connects to and drives rotation of a further hydraulic motor 521. The motor 521 connects to and returns to a pressure line section 516C, which preferably defines the above-described return line 513. As such, the motors 520, 521 operate the rotary end dividers under the control of the priority flow control valve 515.

The speed of the hydraulic motors 520, 521 is governed by the supply of hydraulic fluid supplied through the priority flow control valve 515. When the priority flow control valve 515 is fully open to the end divider supply line 516, the hydraulic motors 520, 521 operate at full speed, but the priority flow control valve 515 is also variable so that the motor speed may be reduced by the priority flow control valve 515 as described below.

Figure 42D:
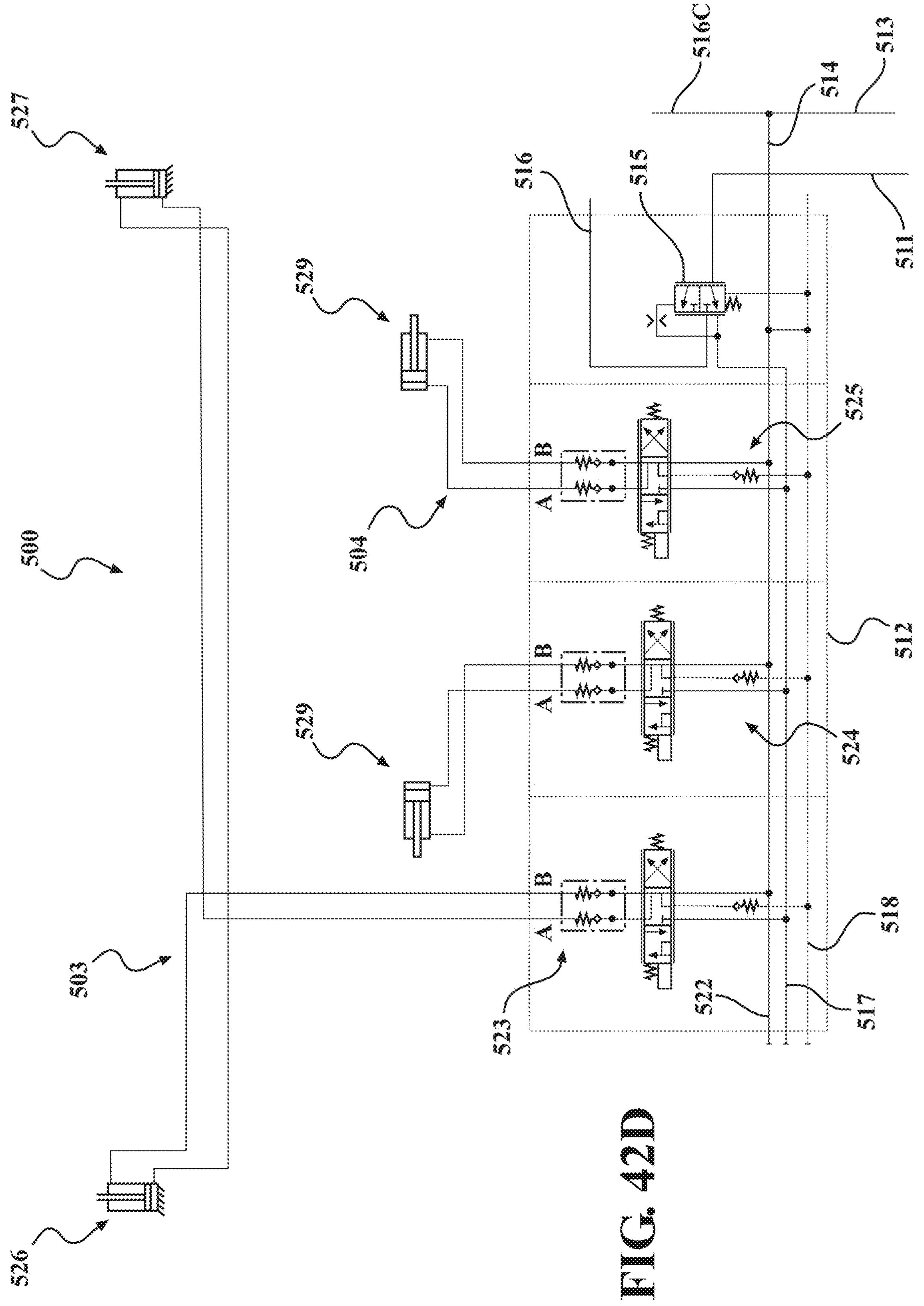

Generally, as to the skid shoe lift system 503 and the float control system 504 shown in FIG. 42D, both of these systems connect to the manifold unit as indicated in dashed outline in FIG. 42D and receive pressure fluid from the supply line 517 through the priority flow control valve 515. Further, each of the skid shoe lift system 503 and the float control system 504 connect to a tank return line 522 that connects to the system return line 513 through manifold port T. Still further, each of the skid shoe lift system 503 and the float control system 504 connect to the load sense line 518, which operatively connects to the priority flow control valve 515.

As generally seen in FIG. 42D, the manifold unit 512 includes first, second, and third circuit valve units 523, 524, 525. The first circuit valve unit 523 is part of the skid shoe lift system 503 and controls a pair of skid shoe lift cylinders 526, 527 (referred above generally, and shown in FIGS. 30-35, as hydraulic cylinders 100') that raise and lower the skid shoe plates 94' during header operation to set the cut height of the header 10'. The second and third circuit valve units 524, 525 are part of the float control system 504 and respectively control operation of a LH float cylinder 528 and RH float cylinder 529 (referred above generally, and shown in FIGS. 13-18, as hydraulic cylinders 128). In particular, the first to third circuit valve units 523, 524, 525 connect to respective parts of A/B ports on the manifold unit 512 to thereby control the pressure cylinders comprising the skid shoe lift cylinders 526, 527 and the float cylinders 528, 529.

Figure 42E:
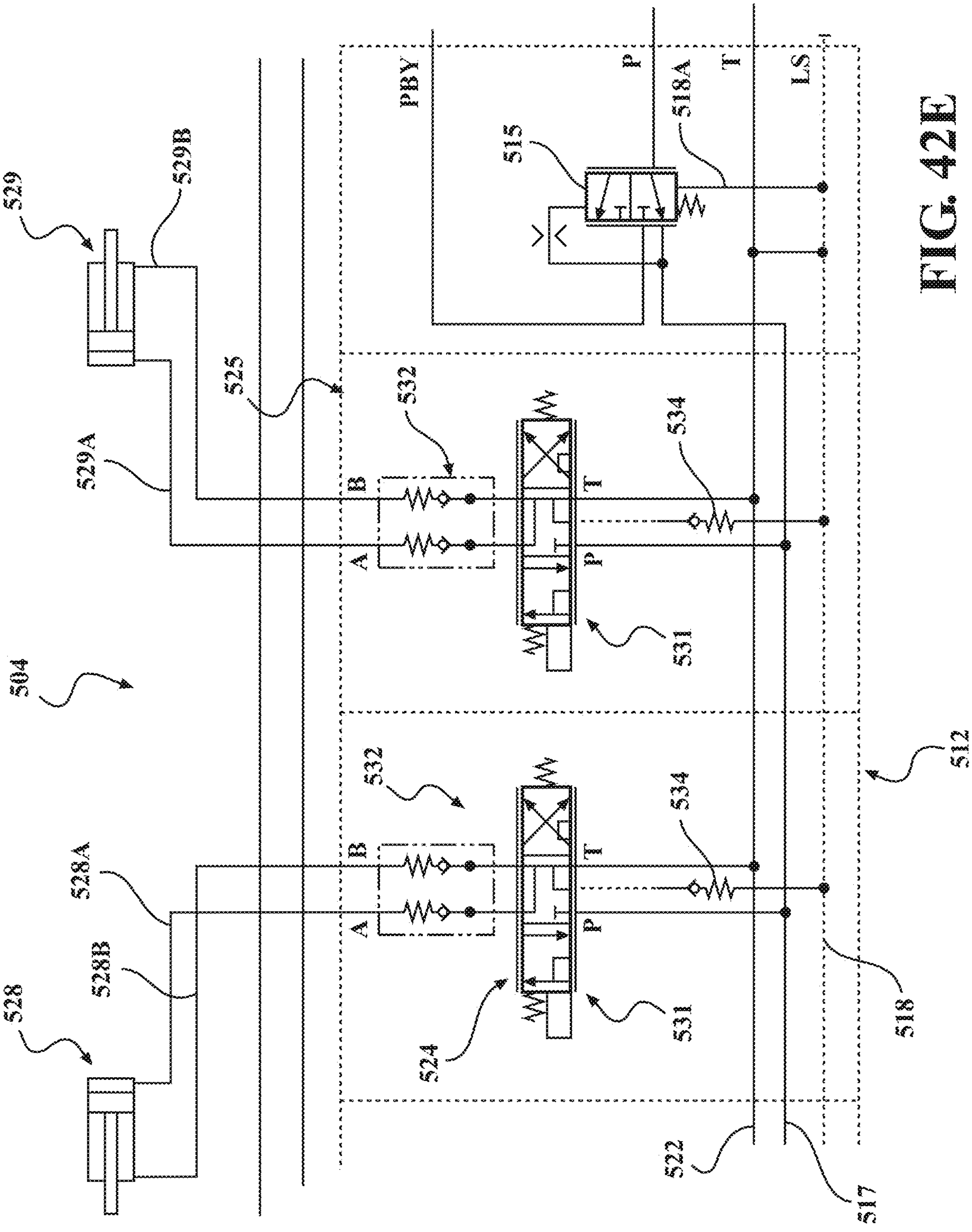

Referring in more detail to the float control system 504 of FIG. 42E, the float control system 504 is configured for the spring float system 116 configuration described above wherein the springs allow for float of the side wing sections 18' of the header frame 12' above the surface of the field. In this configuration, the float cylinders 528, 529 are configured to be pressurized to extend and thereby pivot the spring attachment arms 118 upwardly relative to the center section 16' of the header frame 12' to optimize the position of the coil springs 126 for regulating spring force, thereby allowing the skid shoe plates 94' to float over the surface of the field as described above. As such, the coil springs 126 reduce the weight on the side wing sections 18', and thereby reduce the load on the skid shoe plates 94' so they can more easily run over the ground. Less weight on the skid shoe plates 94' allows them to pass over debris and mud without pushing or plugging in front of the skid shoe plates 94'. The float cylinders 528, 529 also may be actuated to retract under the weight of the side wing sections 18' to lower a height of the side wing sections 18'. Therefore, the float cylinders 528, 529 each have their piston sides connected to a respective pressure line 528A/529A, through which pressure fluid flows to and from the respective A ports, and their rod sides connected to a respective pressure line 528B/529B, through which pressure fluid flows to and from the respective B ports. The flow of hydraulic pressure fluid is controlled by the circuit valve units 524, 525 forming part of the float control system 504.

In more detail, the circuit valve units 524, 525 preferably have common parts and may function in unison to operate the float cylinders 528, 529 together, although the circuit valve units 524, 525 may also be operated separately to lift and lower the side wing sections 18' to different elevations during a wing kick operation or locking of the header 10' into rigid mode, as described above. Due to the common parts, common reference numerals are used for equivalent components.

Figure 42F:
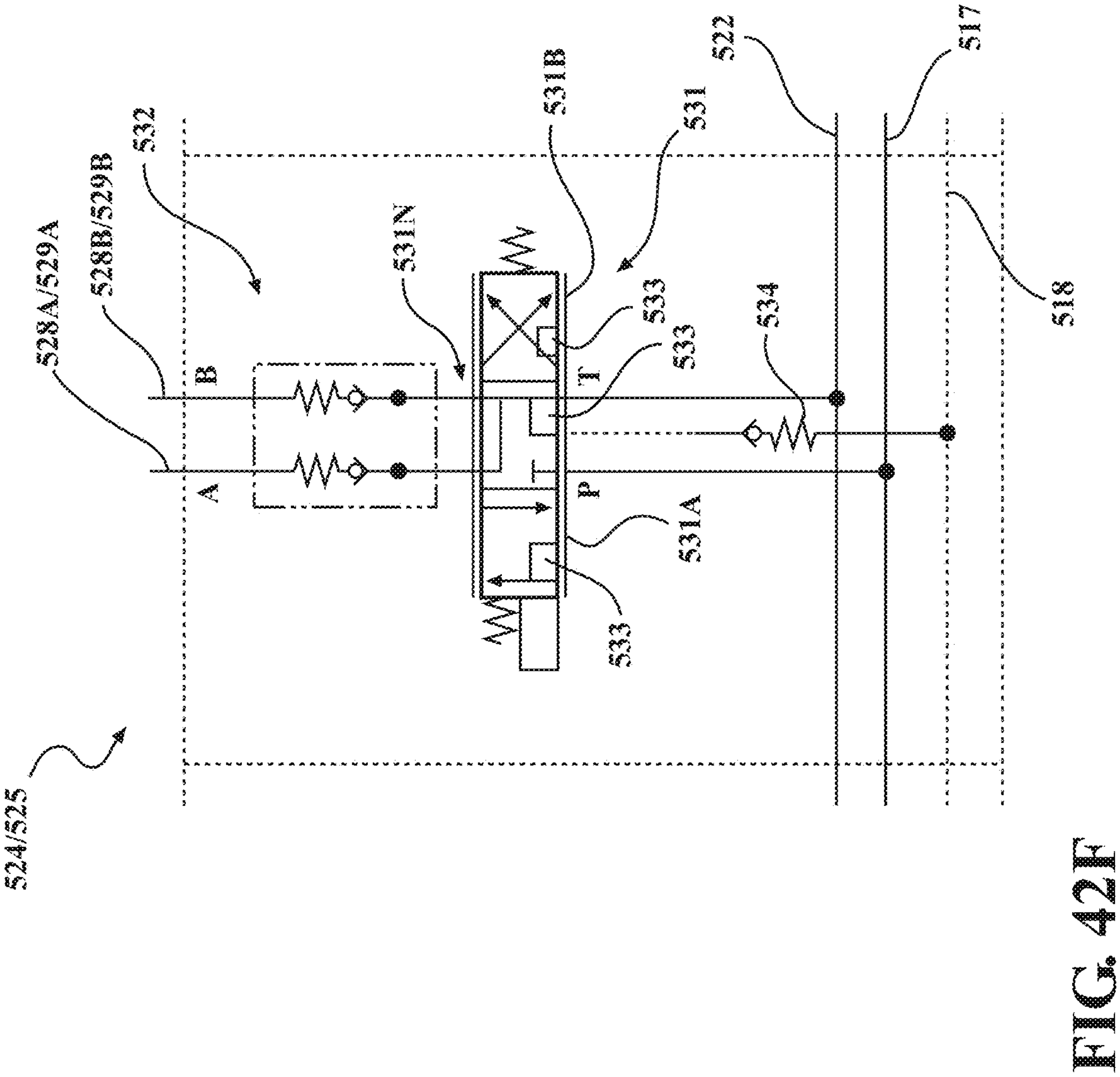
Figure 42G:
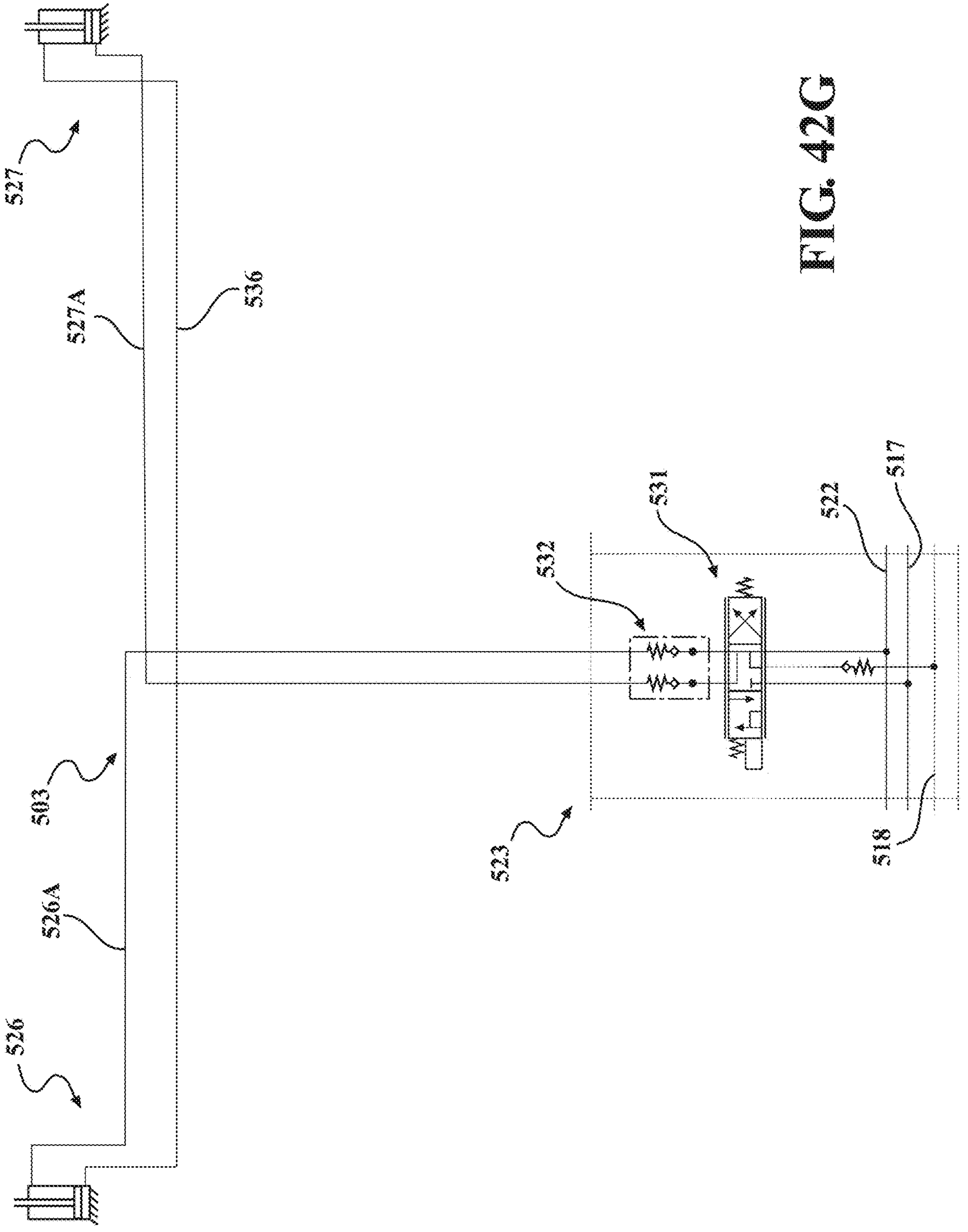

In particular, as seen in FIGS. 42E and 42F, each circuit valve unit 524, 525 includes a flow control configuration preferably comprising a control valve 531 and a pilot operated check valve 532, which fluidly connects to the A and B ports of the manifold unit 512. The control valve 531 preferably is a 3-way, 5-port valve having upstream P and T ports connected to the supply line 517 and the return line 522 and a further load sense port connected to the load sense line 518. The control valve 531 also includes downstream ports connected to the check valve 532.

Each control valve 531 is controlled by a header-mounted controller which automatically and selectively extend and retract the float cylinders 528, 529 based on the position of side wing sections 18'. Alternatively, the cylinders 528, 529 may be manually controlled through a user interface available in the combine, such as by a combine-mounted control device such as a joystick actuator, to selectively extend and retract the cylinders 528, 529. The check valve 532 operates with two check-valve controlled lines exiting through the A and B ports, which are normally closed to hold pressure in the float cylinders 528, 529 and thereby hold the extension of the float cylinders 528, 529 to thereby set the position of the spring attachment arms 118 so the stretch (load) in the spring 126 is optimized. If the springs 126 were to stretch too far or too little, either too much or too little weight would be taken of the side wing sections 18', resulting in poor skid shoe performance. However, since the side wing sections 18' include the coil springs 126 as described herein, the side wing sections 18' are still able to float even when the float cylinders 528, 529 are locked in position by the check valve 532. As such, each circuit valve unit 524 and 525 serves to extend and retract the float cylinders 528, 529 and also includes a lockout feature to lock the float cylinders 528, 529 in a set position to set the position of the spring attachment arms 118.

Each check valve 532 is pilot operated on the upstream side such that pressurization of one of the A and B sides allows pressure fluid to flow toward one piston side of the respective float cylinder 528 or 529 and also opens the other A or B side to allow pressure fluid to flow away from the other piston side of the pressure cylinders 528, 529. For example, when the A side is pressurized, the pressure fluid flows to the float cylinders 528, 529, which then extend, while the B side opens to allow fluid to drain away from the float cylinders 528, 529. To retract the float cylinders 528, 529, the B side of the check valves 532 can be pressurized, wherein pressure fluid drains from the float cylinders 528, 529 through the A side. As such, the check valves 532 allow pressure fluid to flow into and out of the opposite piston sides of the float cylinders 528, 529 during extension and retraction thereof.

The flow through each check valve 532 is controlled by the respective control valve 531. The control valve 531 preferably is a 3-position solenoid valve. The control valve 531 is automatically actuated by the header-mounted controller or manually by the operator between one of three operative positions. In the neutral valve position 531N as seen in FIG. 42F, the neutral valve position 531N closes the supply line 517. Since no pressure is supplied to the check valve 532 from the upstream valve side, the check valve 532 is closed by the normal spring biased action of the check valve 532. This holds the extension of the float cylinders 528, 529 to set the position of the spring attachment arms 118 so the stretch (load) in the spring 126 is optimized, as discussed above. In this neutral valve position 531N, the upstream side of the check valve 532 fluidly communicates with the tank line 522, which drains pressure fluid on the upstream side of the check valve 532 so that the higher fluid pressure on the cylinder side of the check valve 532 holds the check valve 532 closed.

The neutral valve position 531N also has a load sense bypass 533 that connects to the load sense line 518 through an inline check valve 534. Referring to FIGS. 42E and 42F, since the bypass 533 is depressurized in the neutral valve position, the check valve 534 remains closed, and the load sense line 518 thereby is depressurized or at a low pressure. The load sense line 518 connects to the priority flow control valve 515 through a load sense inlet line 518A to provide a feedback pressure loop to the priority flow control valve 515. In this low-pressure condition, the priority flow control valve 515 would be open to supply pressure fluid to the rotary end divider drive system 502 described above. However, as will be described further below; when the control valves 531 activate, the priority flow control valve 515 would switch and preferentially route pressure fluid to one or both of the skid shoe lift system 503 and the float control system 504 for their operation, while routing fluid pressure away from the rotary end divider drive system 502. As such, the priority flow control valve 515 preferably supplies pressure fluid to the skid shoe lift system 503 and the float control system 504 while reducing the speed of the end divider motors 520, 521 or even allowing the motors 520, 521 to stop.

Referring again to FIGS. 42E and 42F, the control valve 531 is preferably actuated by a solenoid to one of two operative valve positions 531A or 531B to extend and retract the float cylinders 528, 529. In valve position 531A, pressure fluid from the supply 517 is routed to the A line of the check valve 532 so that the pressure fluid is supplied to the A port and pressure drains through the B port in accord with the above description of the check valve 532. The priority flow control valve 515 also actuates to slow down or stop the rotary end dividers 521, which thereby ensures a full flow of pressure fluid to the float cylinders 528, 529 during extension.

When the control valve 531 is switched by the operator, the other operative valve position 531B reverses the flow through the A and B ports of the check valve 532 to pressurize the B port and drain the A port, thereby retracting the float cylinders 528, 529. Here again, in this condition, the load sense bypass line 533 is pressurized to open the check valve 534 and again allow flow to the load sense line 518. This valve actuation in turn switches the priority flow control valve 515 to slow down or stop the rotary end dividers 521, which thereby ensures a full flow of pressure fluid to the float cylinders 528, 529 during retraction. Preferably, a control valve 531 is provided for each float cylinder 528, 529 so that the elevation each can be set independent of the other. Or else, a single control signal might be sent to the solenoids of both control valves 531, or just a single control valve 531, to simultaneously adjust the spring attachment arms 118 together, if desired.

After the spring attachment arms 118 are set, the float cylinders 528, 529 are turned off by actuating the control valve 531 back to the neutral valve position 531N, which locks the side wing sections 18'. Further, the priority flow control valve 515 again actuates to restore full fluid power to the rotary end divider motors 520, 521. Under normal conditions, the end divider power is only reduced temporarily.

Referring to the skid shoe system lift system 503, the circuit valve unit 523 is formed the same as the circuit valve units 524/525 described above, and common part numerals are used to identify common parts. The circuit valve unit 523 includes a combination of the control valve 531 and check valve 532. The upstream side of the control valve 531 has P and T ports and a load sense bypass line that connect to the supply line 517, the tank line 522, and the load sense line 518. The downstream A and B ports on the check valve 532 connect to the pressure lines 526A, 527A that in turn connect to the skid shoe cylinders 526, 527. The skid shoe cylinders 526 also connect to an intermediate pressure line 536 that connects to the rod side on the cylinder 527 and piston side on the cylinder 526 so that the skid shoe cylinders 526, 527 operate in unison through a master/slave configuration.

For example, when the control valve 531 is actuated to the valve position 531A, the A port and pressure line 527A are pressurized, which extends the skid shoe cylinder 527, forces pressure fluid from the cylinder 527 to the driven cylinder 526 through intermediate pressure line 536 and extends cylinder 526. Pressure fluid flows from the cylinder 526 to the B port drain during extension.

When the control valve 531 is switch to the control valve position 532B, the B port supplies the skid shoe cylinder 526 through pressure line 526A, and the pressure flow reverses between the cylinders 526, 527 wherein the A port serves to drain pressure fluid as the skid shoe cylinders 526, 527 retract. When the control valve 531 is actuated to the neutral valve position 531N, the skid shoe assemblies 36' are now locked at the selected elevation.

Here again, the priority flow control valve 515 preferentially supplies pressure fluid to the skid shoe drive system 503 and reduces or stops the flow of pressure fluid to the end divider motors 520, 521. In the preferred configuration, the skid shoe cylinders 526, 527 and the float cylinders 528, 529 can be adjusted or operated together since there is enough supply pressure to operate simultaneously once the motor supply is reduced by priority flow control valve 515. With the above-described hydraulic system 500, the spring-biased side wing sections 18' and the height of the skid shoe assemblies 36' (and thus, the cut height) can be selectively adjusted by the operator.

2. Hydraulic Float System

Figure 43A:
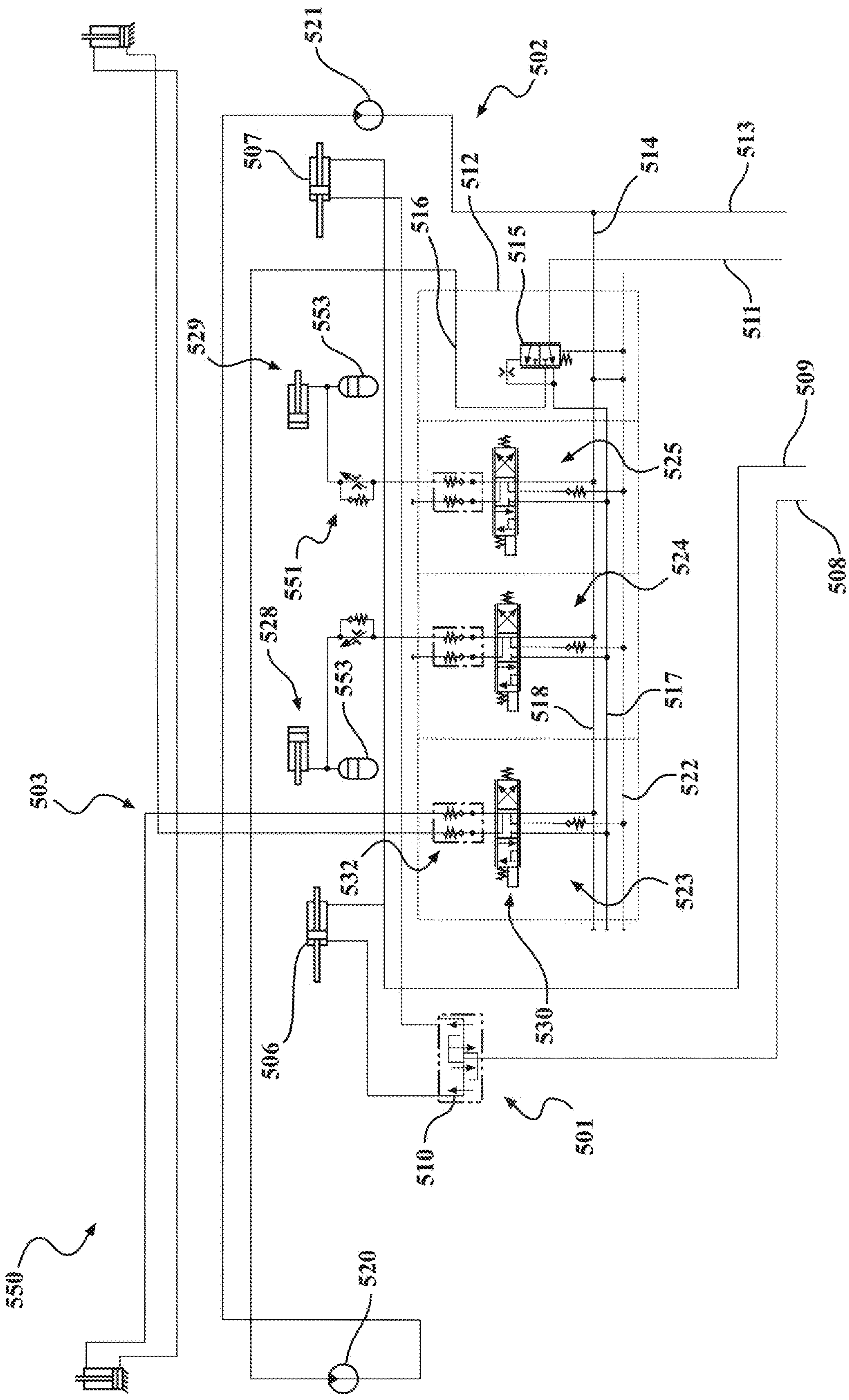
FIGS. 43A-43C are diagrammatic charts showing operative configurations of a first embodiment of a hydraulic system of the header of FIG. 1.
Figure 43B:
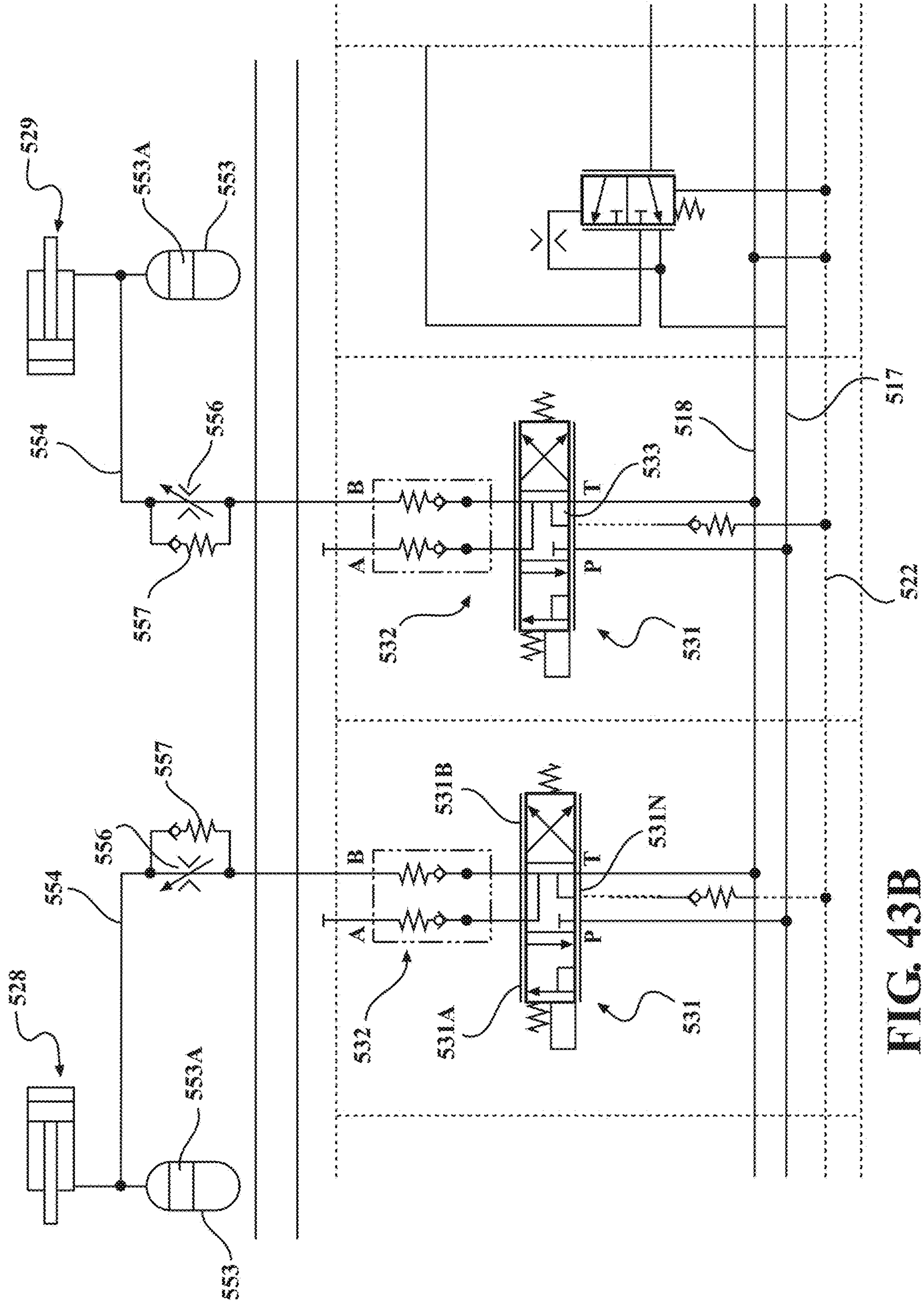
Figure 43C:
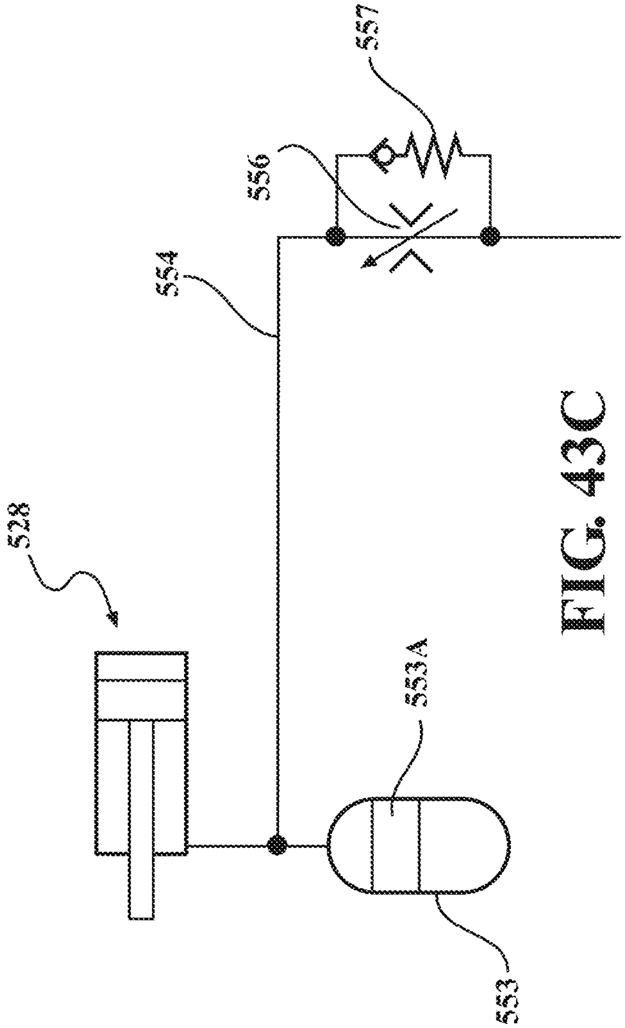

Referring to FIGS. 43A-43C, the first embodiment of the header 10, which has the hydraulic float system 102 (as shown in FIGS. 7-12), includes a first embodiment of a hydraulic system 550. As described herein, this embodiment omits the coil springs and relies upon a hydraulic float system 102 to permit float of the side wing sections 18. The hydraulic system 550 incorporates several common subsystems previously described herein relative to FIGS. 42A-42C, and common reference numerals are used to describe common sub-systems and the common parts thereof. Here again, the main hydraulic control system does not require disclosure, wherein it will be understood that the main hydraulic system preferably serves as a fluid source for supplying hydraulic fluid to the hydraulic system 550 and may include additional fluid controls for controlling the operation of the header 10.

As described in more detail as to FIGS. 43A-43C, the common sub-systems include a deck plate control system 501, an end divider drive system 502, and a skid shoe lift system 503. The above disclosure of these sub-systems is the same and a detailed discussion is not required herein. The hydraulic system 550 further includes an alternative configuration for a float control system identified by reference numeral 551.

As illustrated in FIG. 43A, the deck plate control system 501 includes the pressure cylinders 506, 507 that are operated to selectively displace the deck plates on the header 10 in opposite outward and inward directions. The deck plate control system 501 includes the pressure lines 508, 509, which direct pressurized hydraulic fluid to and from the combine fore/aft circuit provided on the combine. The pressure line 508 connects to a flow divider valve 510 and further connects to the pressure cylinders 506, 507. As previously described, the pressure lines 508, 509 connect to a combine controller such as a joystick controller so that the operator can selectively control movement of the deck plates in opposite inward and outward directions.

The end divider drive system 502 optionally may be provided on the header 10 to lift downed crop to aid in down crop conditions. The end divider drive system 502 operates cooperatively with the skid shoe lift system 503 and the float control system 504 in the same manner as previously described herein. The end divider drive system 502 is fed by the supply line 511 that connects to the pressure port P on the manifold unit 512. The end divider drive system 502 also includes a return line 513 that returns the pressure fluid to a fluid tank or other component of the main hydraulic system.

The supply line 511 supplies fluid to port P, which in turn routes the pressure fluid to a priority flow control valve 515. The priority flow control valve 515 preferentially supplies pressure fluid to the skid shoe lift system 503 and the float control system 551, and secondarily supplies pressure to the end divider drive system 502, depending upon the pressure control signal supplied to the priority flow control valve 515 through load sense line 522.

The speed of the hydraulic motors 520, 521 is governed by the supply of hydraulic fluid supplied through the priority flow control valve 515, as described above. When the priority flow control valve 515 is fully open to the end divider supply line 516, the hydraulic motors 520, 521 operate at full speed, but the priority flow control valve 515 is also variable so that the motor speed may be reduced by the priority flow control valve 515 as described below.

Generally, as to the skid shoe lift system 503 and the float control system 551 shown in FIG. 43A, both systems preferably connect to the manifold unit 512 and receive pressure fluid from the supply line 517 through the priority flow control valve 515. Further, each of the skid shoe lift system 503 and the float control system 551 connect to a tank return line 522 that connects to the system return line 513. Still further, each of the skid shoe lift system 503 and the float control system 551 connect to the load sense line 518, which serves to operatively connect to the priority flow control valve 515, wherein the priority flow control valve

515 preferentially supplies pressure fluid to the skid shoe lift system 503 and the float control system 504.

As generally seen in FIG. 43A, a first circuit valve unit 523 is provided as part of the skid shoe lift system 503 and controls the skid shoe lift cylinders 526, 527 that raise and lower the skid shoes plates 94 during header operation to set and maintain the cut height of the header 10. Referring to the skid shoe system lift system 503, the circuit valve unit 523 is formed the same as the circuit valve units 523/524/525 described above relative to FIGS. 42A-42G. The circuit valve unit 523 includes the same combination of the control valve 531 and check valve 532, which connect to the skid shoe cylinders 526, 527 so that they operate in unison through a master/slave configuration.

In more detail, in FIGS. 43A-43C, this embodiment of the header 10 omits the spring float system and instead incorporates the hydraulic float system 102. The hydraulic float system 102 is controlled by a float control system 551 that is substantially similar to the float control system 504, and common parts use common reference numerals. The alternate float control system 551 is controlled by second and third circuit valve units 524, 525 that have similar fluid connections. However, some fluid connections are modified.

The float control system 551 controls operation of a LH float cylinder 528 and a RH float cylinder 529 (referred above generally, and shown in FIGS. 7-12, as hydraulic cylinders 104). Each of the second and third circuit valve units 524, 525 fluidly connect to the B ports for controlled retraction of the float cylinders 528, 529. However, the B ports are inactive and capped in this configuration.

Referring in more detail to the float control system 551 of FIGS. 43B and 43C, the float control system 551 is configured for the hydraulic float system 102 configuration described above, wherein an accumulator 553 allows for float of the side wing sections 18 above the surface of the field. Once the hydraulic circuit has charged the accumulator 553, there is enough hydraulic fluid in the accumulator 553 to extend and retract the float cylinders 528 and 529 fully. The geometry of the cylinder 528 and 529 is such that the force (weight/load) taken off each side wing section 18 is consistent throughout the entire range of the cylinder extension. As such, during the entire range of extension and retraction of the float cylinders 528 and 529, no additional hydraulic fluid is added to the hydraulic circuit once the accumulator circuit is initially charged with hydraulic fluid to a given pressure. In more detail as to this configuration, the float cylinders 528, 529 are configured to be pressurized to retract and thereby counteract at least a portion of the weight of the side wing sections 18 and control pivoting of the side wing sections 18 to a desired height with the cutting height of the header 10 being set by the skid shoe assemblies 36. The float cylinders 528, 529 may also be actuated to retract under the weight of the side wing sections 18 to lift the side wing sections 18, for example, to the wing kick position. Therefore, the float cylinders 528, 529 each have the rod side connected to a pressure line 554 through which pressure fluid flows to and from the respective B ports. The other piston side of the float cylinders 528, 529 is not pressurized and may communicate with air. The flow of hydraulic pressure fluid is controlled by the circuit valve units 524, 525 forming part of the float control system 551.

The pressure line 554 also connects with the pressurized accumulator 553, which is pre-charged to a pre-set internal pressure appropriate to the load of the side wing sections 18. As noted, the float cylinders 528, 529 can be supplied with pressure fluid through pressure line 554 to retract the float cylinders 528, 529 to lift the side wing sections 18. When pressure is drained through pressure line 554, the pressure cylinders 528, 529 can extend to lower the side wing sections 18. When pressure flow is stopped by the second and third circuit valve units 524, 525, the float cylinders 528, 529 are effectively locked to a degree in that the volume of pressure fluid in the float cylinders 528, 529, the pressure line 554, and the accumulator 553 is fixed and does not change in this operative condition. However, the accumulator 553 is pressurized with a gas in a known manner and an internal bladder 553A or other pressure compensator allows pressure fluid to flow into and out of the accumulator 553. The accumulator 553 holds the pressure of the fluid but also allows fluid movement so that the float cylinders 528, 529 can extend to a limited degree under movement of the side wing sections 18 during operation of the combine. In essence, the side wing sections 18 "float" in that they can move up and down a limited degree similar to the coil spring in the spring float system described above. The accumulator 553 thereby serves as a "float," or in other words, a fluid spring that counteracts shocks from the side wing sections 18 during use.

Additionally, the pressure supply line 554 includes a needle valve or orifice 556 inline with the pressure supply line 554 to restrict pressure flow therethrough, and the pressure supply line 554 also includes a bypass valve or check valve 557 in parallel with the needle valve 556. The needle valve 556 restricts flow to more accurately charge the accumulator 553 to the intended pressure of the pressure fluid.

In more detail as to the operation of the float cylinders 528, 529, the circuit valve units 524, 525 preferably function in unison to operate the float cylinders 528, 529 together, although the circuit valve units 524, 525 may also be operated separately to lift and lower the side wing sections 18 to different elevations.

Each circuit valve unit 524, 525 includes a control valve 531 and a pilot operated check valve 532, which fluidly connect to the B port to control the supply and draining of pressure fluid through the pressure line 554. The check valve 532 is pilot operated on the upstream side such that pressurization of the B side allows pressure fluid to flow toward the respective float cylinder 528, 529 to thereby retract said cylinders 528, 529 and also charge the accumulator 553 with pressure fluid. Further, pressurization of the A side does not open the A side, and while flow is closed off through the A port, this A side pressure opens the B side check valve to allow pressure fluid to flow away from the pressure cylinders 528, 529 and drain to the tank line. As such, the check valves 532 allow pressure fluid to flow into and out of the rod sides of the float cylinders 528, 529 during retraction and extension thereof.

The flow through each check valve 532 is controlled by the control valve 531. The control valve 531 preferably is a 3-position solenoid valve and operates as described above between one of three operative positions. The neutral valve position 531N closes the check valve 532 by the normal spring biased action of the check valve 532 and closes the supply line 554 to fix the volume of pressure fluid in the supply line 554, the accumulator 553, and the rod side of each float cylinder 528, 529. This holds, or locks, the side wing sections 18 at the selected elevation, although limited the side wing section 18 motion is permitted by the presence of the accumulator 553. In this neutral valve position 531N, the higher fluid pressure and check valve springs of the check valve 532 hold the check valve 532 closed.

In this valve-closed condition, the priority flow control valve 515 would be open to direct pressure fluid to the rotary end divider drive system 502, described above. However, when the control valves 531 are open, the priority flow control valve 515 would switch and preferentially redirect pressure fluid to one or both of the skid shoe lift system 503 and the float control system 551 for their operation, while routing fluid pressure away from the rotary end divider drive system 502. As such, the priority flow control valve 515 preferably prioritizes the skid shoe lift system 503 and the float control system 504 while reducing the speed of the end divider motors 520, 521, or even allowing the motors 520, 521 to stop.

The control valve 531 is preferably actuated by a solenoid to one of two operative valve positions 531A or 531B to charge and drain the accumulator 553 of hydraulic pressure fluid. In valve position 531A, pressure fluid from the supply 517 is routed to the A line of the check valve 532 so that the pressure fluid is supplied to the A port and pressure drains through the B port in accord with the above description of the check valve 532, which thereby allows the float cylinders 528, 529 to extend and lower the side wing sections 18.

When the control valve 531 is switched by the operator to the other operative valve position 531B, the control valve 531 reverses the flow to the A and B lines of the check valve 532 to pressurize the B port, supply pressure fluid to the pressure line 554 and accumulator 553, and thereby retract the float cylinders 528, 529. Here again, opening the control valve 531 in turn switches the priority flow control valve 515 to slow down or stop the rotary end dividers 521, which thereby ensures a full flow of pressure fluid to the float cylinders 528, 529 during retraction. Preferably, a control valve 531 is provided for each float cylinder 528, 529 so that the elevation of each side wing section 18 can be set independent of the other. Or, alternatively, a single control signal might be sent to the solenoids of both control valves 531 to simultaneously adjust the side wing sections 18 together, if desired. After the side wing section 18 elevations are set, the operator turns off the float cylinders 528, 529 by actuating the control valve 531 back to the neutral valve position 531N, which locks the side wing sections 18 elevation while allowing floating thereof due to the presence of the accumulators 553.

In the preferred configuration, the skid shoe cylinders 526, 527 and the float cylinders 528, 529 can be adjusted together or separately since there is enough supply pressure to operate them simultaneously once the motor supply is reduced by priority flow control valve 515. With the above-described hydraulic system 550, the side wing sections 18 and the height of the skid shoe assemblies 36 (and thus, the cut height) can be selectively adjusted by the operator.

Referring to FIGS. 44A-44D, the first embodiment of the header 10, which has the hydraulic float system 102 (as shown in FIGS. 7-12), may include a second embodiment of a hydraulic system 600. As described herein, this embodiment omits the coil springs and relies upon the hydraulic float system 102 to permit automatic adjustment, or floating, of the side wing sections 18. The hydraulic system 600 is generally similar to the hydraulic systems 500 and 550 previously described herein relative to FIGS. 42A and 42A, and common reference numerals are used to describe common sub-systems and the common parts thereof. Here yet again, the main hydraulic control system does not require disclosure, wherein it will be understood that the main hydraulic system preferably serves as a fluid source for supplying hydraulic fluid to the hydraulic system 600 and may include additional fluid controls for controlling the operation of the header 10.

As described in more detail as to FIGS. 44A-44G, the hydraulic system 600 includes the common deck plate control system 501, and also includes alternative embodiments for an end divider drive system 602, a skid shoe lift system 603, and a float control system 604. Ultimately, these sub-systems operate similar in structure and function to the above-described sub-systems, with the following disclosure focusing on the improvements included in the hydraulic system 600.

Figure 44A:
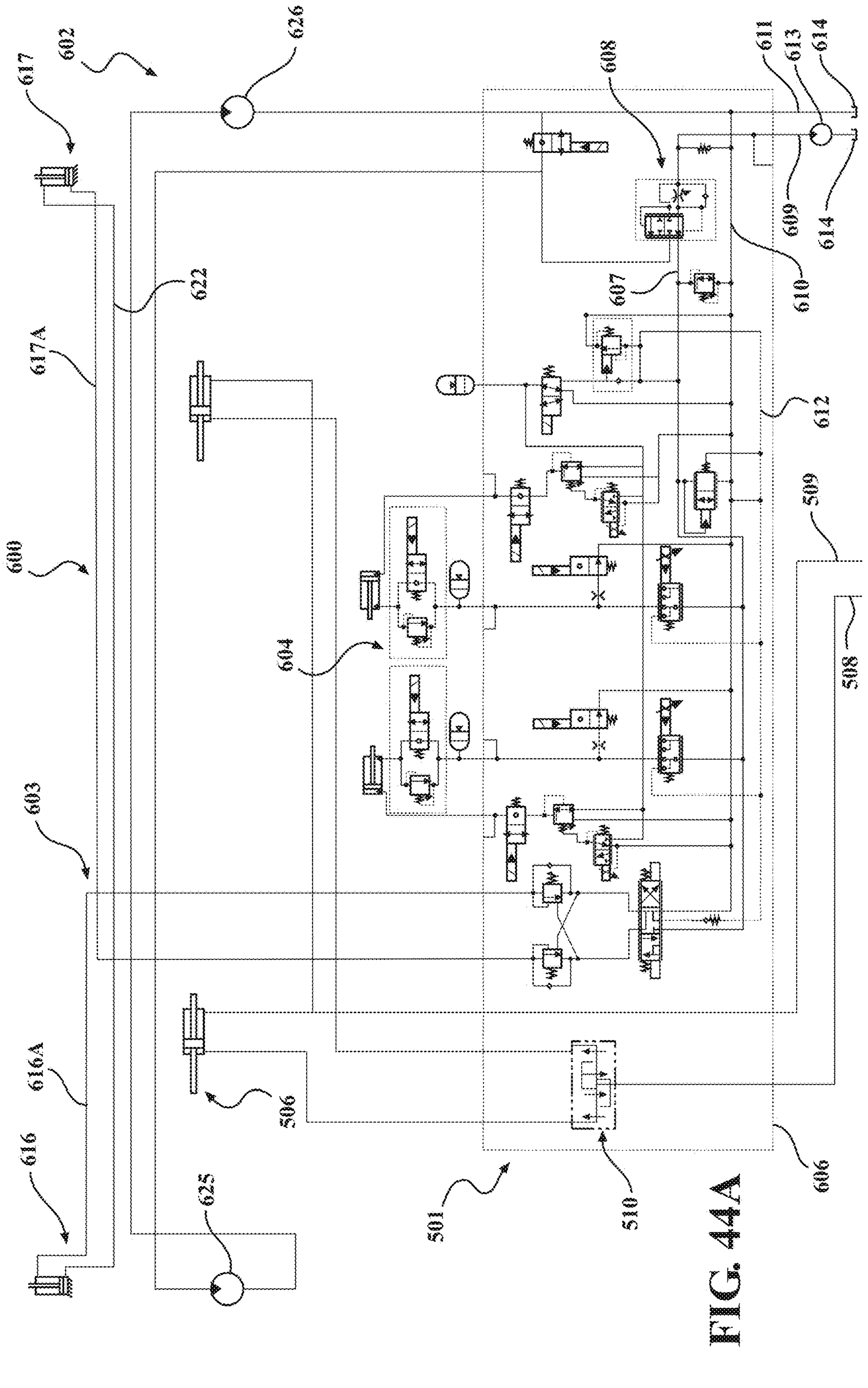
FIGS. 44A-44G are diagrammatic charts showing operative configurations of a second embodiment of a hydraulic system of the header of FIG. 1.
Figure 44B:
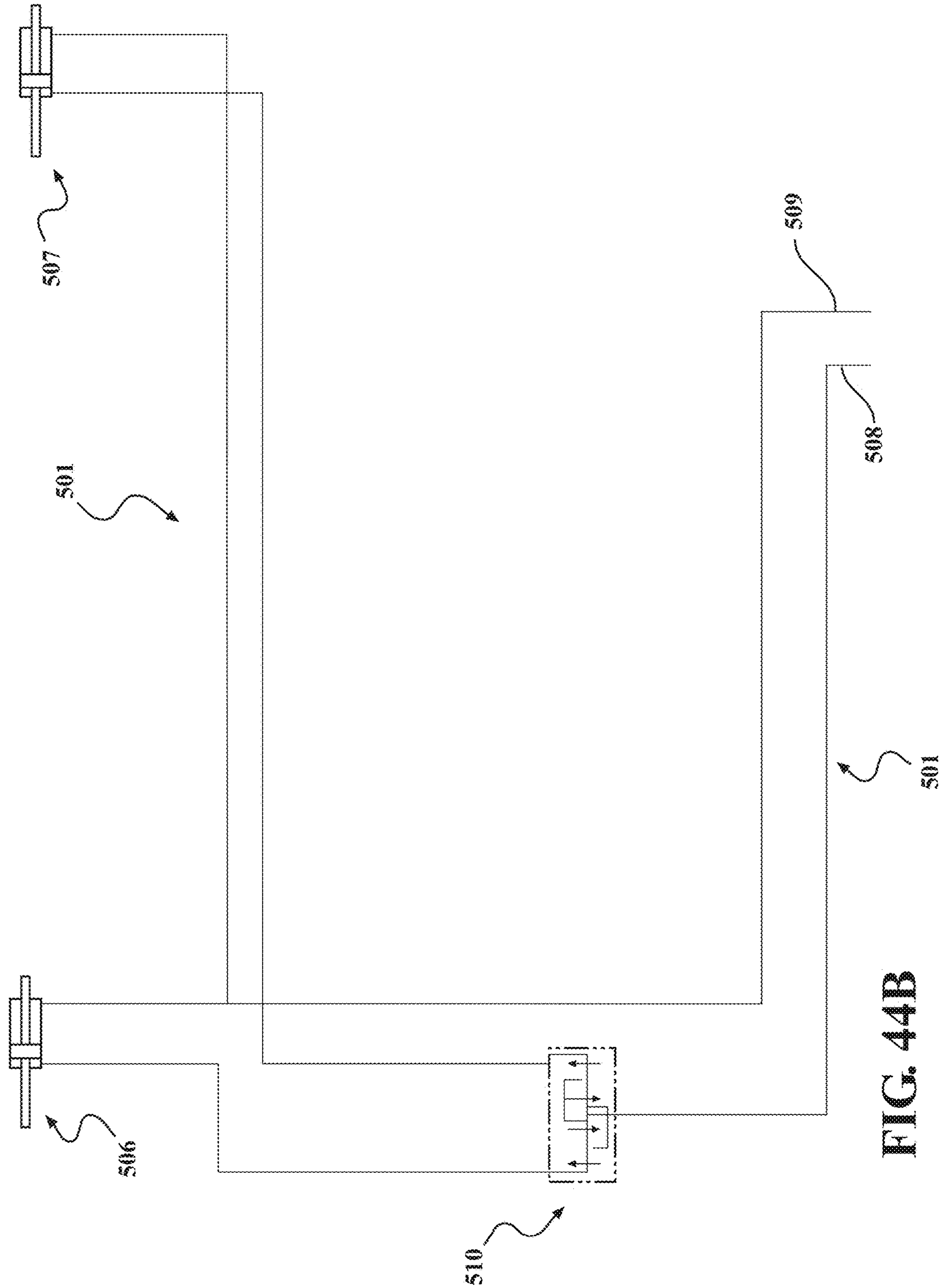

As illustrated in FIG. 44A, the deck plate control system 501 is the same as the deck plate control system 501 illustrated in FIGS. 42B and 43A. The deck plate control system 501 is further illustrated in FIGS. 44A and 44B and includes the pressure cylinders 506, 507 that are operated to selectively displace the deck plates on the header 10 in opposite outward and inward directions. The deck plate control system 501 includes the pressure lines 508, 509, which direct pressurized hydraulic fluid to and from the combine fore/aft circuit provided on the combine. The pressure line 508 connects to a flow divider valve 510, which in turn connects to the pressure cylinders 506, 507. As previously described, the pressure lines 508, 509 connect to a combine controller such as a joystick controller so that the operator can selectively control movement of the deck plates in opposite inward and outward directions.

Generally, as to the skid shoe lift system 603 and the float control system 604 shown in FIG. 44A, both of these systems preferably connect to the manifold unit 606 and receive pressure fluid from a supply line 607 through the priority flow control valve 608, which is supplied with fluid from the system supply line 609. Further, each of the skid shoe lift system 603 and the float control system 604 connect to a tank return line 610 that connects to the system return line 611. Still further, each of the skid shoe lift system 603 and the float control system 604 connect to the load sense line 612, which serves to operatively control operation of the priority flow control valve 608 depending upon the operative condition of the skid shoe lift system 603 and the float control system 604. A further control valve 605 is connected between the supply line 607 and tank return line 610 and operates as described below.

The system supply line 609 and system return line 611 are operatively connected to the main hydraulic system on the combine, which may include a hydraulic pump 613 for pressurizing and pumping the pressure fluid to the header 10 and a return tank 614 for recovering the hydraulic fluid in a conventional manner. Similar system components may also be provided in the above-described embodiments.

Figure 44C:
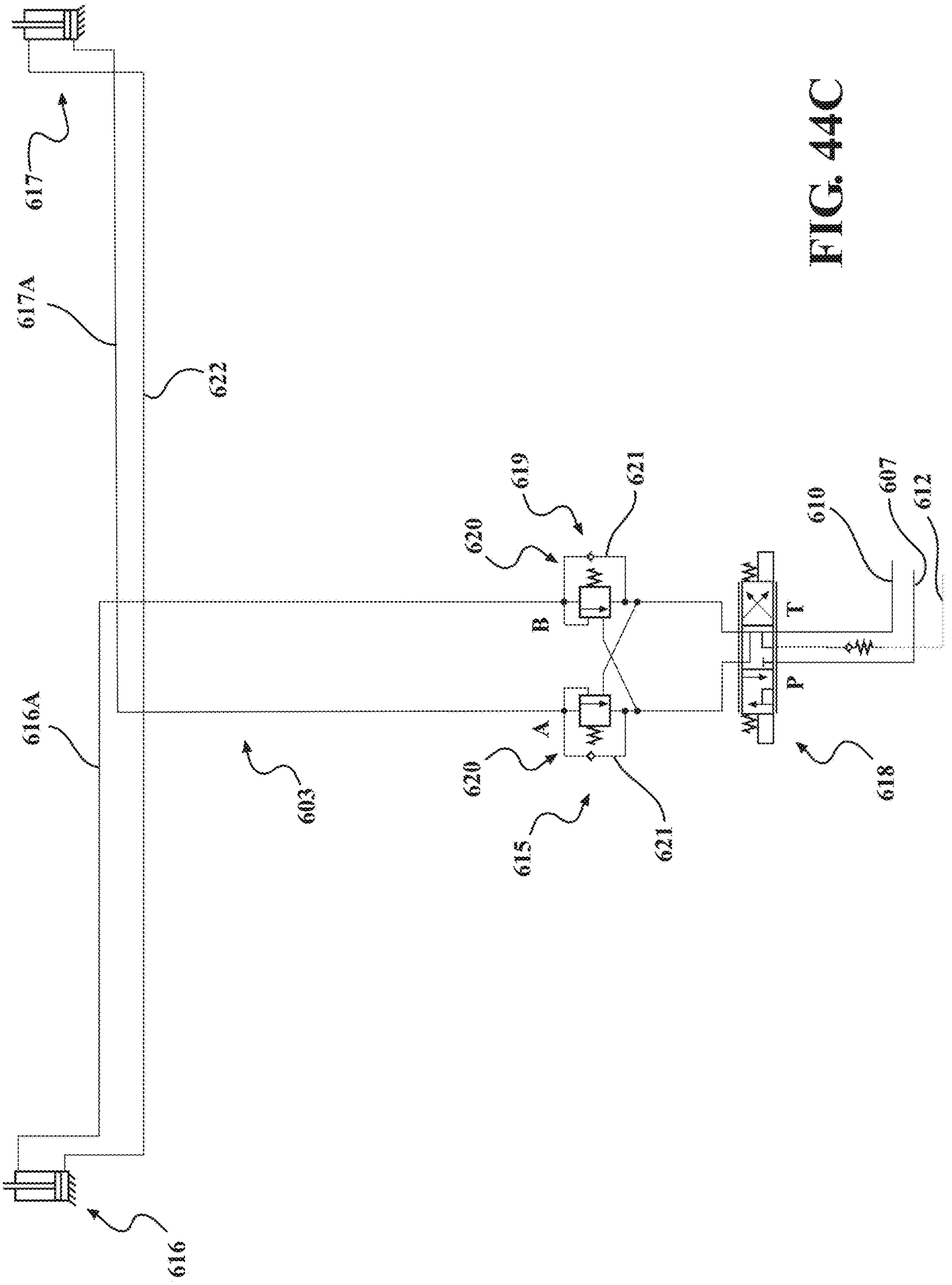

In more detail, as to the skid shoe lift system 603 illustrated in FIGS. 44A and 44C, a first circuit valve unit 615 is provided that controls the skid shoe lift cylinders 616 and 617 to raise and lower the skid shoe plates 94 during header operation to set the cut height of the header 10. The circuit valve unit 615 is formed similar to the circuit valve units 523/524/525 described above relative to FIGS. 42A and 43A. The circuit valve unit 615 includes a control valve 618, which is structurally and functionally the same as the control valve 531 and controls fluid flow to the skid shoe cylinders 616, 617 so that they operate in unison through a master/slave configuration. The circuit valve unit 615 for the skid shoes has a load sense feature as well. The control valve 618 is supplied with pressure fluid by the flow control valve 608, which supplies pressure fluid to the skid shoe lift system 603 and the end divider drive system 602 in accord with the disclosures herein. The operation of this valve 608 is different than the previous hydraulic schematics. Instead of using a load sense line to steal flow away from the rotary end divider drive system 602, a set amount of fluid (X), for example 3 gallons per minute (gpm), is always sent to the float control system 604 and skid shoe lift system 603 (unless total supply from inlet port P is less than X amount). Any fluid that is not used may be sent over the optional control valve 605 at low pressure. Any excess amount of fluid pressure over the set amount of X is sent to the rotary end divider system 602. The amount of fluid sent to the rotary end divider 602 that is above X is dependent on total amount supplied through port P by supply line 609 from the combine. That is, the operator has the ability to adjust the total flow of fluid through port P supplied by the combine. The operator can therefore adjust the speed of the rotary end dividers 602 without affecting the flow to the skid shoes 603 and float control system 604.

The circuit valve unit 615 includes a flow control configuration that preferably comprises a lockout or load holding feature. In the previous embodiments, the load holding feature is provided by the pilot operated check valves 532. In the improved embodiment of FIGS. 44A and 44C, the load holding feature is provided by a counterbalance valve unit 619 that has its downstream side fluidly connected to the A and B ports of the manifold unit 606, and its upstream side fluidly connected to the control valve 618. The control valve 618 preferably is a 3-way, 5-port valve having upstream P and T ports connected to the supply line 612 and the return line 610 and having a further load sense port connected to the load sense line 607. The control valve 618 also includes downstream ports connected to the counterbalance valve unit 619.

Like the control valves 531, the control valve 618 is controlled by the controller on the header to selectively actuate the skid shoe cylinders 616, 617 by a combine-mounted control device such as a joystick actuator provided in the combine cab. The counterbalance valve unit 619 includes a pair of counterbalance valves 620 provided with two check valves in parallel with a load holding valve 621, wherein crossover lines are provided to actuate the load holding valves 621 in a manner similar to the pilot operated check valves 632. The two counterbalance valves 620 exit through the A and B ports and are normally closed to hold pressure in the skid shoe cylinders 616, 617 thereby holding the skid shoe plates 94 at their set elevation. As such, the circuit valve unit 615 serves to actuate the skid shoe cylinders 616, 617 and also includes a lockout feature to lock the skid shoe cylinders 616, 617 in a set position to set the cut height of the header 10.

Like the skid shoe cylinders 526, 527, the skid shoe cylinders 616, 617 are connected in a master/slave configuration through pressure lines 616A, 617A and intermediate pressure line 622. The counterbalance valves 620 are normally closed but are operated on the upstream side by crossover pressure lines such that pressurization of the A side allows pressure fluid to flow through pressure line 617A toward the rod side of the respective skid shoe cylinders 616, 617 and also opens the other B side to allow pressure fluid to drain away from the piston side of the skid shoe cylinders 616, 617 through pressure line 616A.

For example, when the A side is pressurized, the pressure fluid flows through pressure line 616A to one side of the skid shoe cylinders 616, 617, which then extend, while the B side opens to allow fluid to drain away from the skid shoe cylinders 616, 617. To retract the skid shoe cylinders 616, 617, the B side of the counterbalance valves 621 can be pressurized, wherein pressure fluid drains from the skid shoe cylinders 616, 617 through the A side. As such, the counterbalance valve unit 619 allows pressure fluid to flow into and out of the opposite piston sides of the skid shoe cylinders 616, 617 during extension and retraction thereof.

The flow through each counterbalance valve unit 619 is controlled by the control valve 618 in the same manner as control valve 531. In the neutral valve position shown, the neutral valve position closes the supply line 607, and each counterbalance valve 621 is spring-biased and normally closed. This holds the skid shoes plates 94 at the selected elevation as disclosed above. In this closed-valve condition, the priority flow control valve 608 would be open to supply pressure fluid to the rotary end divider drive system 602, as will be described below.

Briefly, the control valve 618 is preferably actuated by a solenoid to one of two operative valve positions, like positions 531A or 531B described above, to extend and retract the skid shoe cylinders 616, 617. In the first operative valve position, like 531A, pressure fluid from the supply 607 is routed to the A line of the counterbalance valve unit 619 so that the pressure fluid is supplied to the A port and pressure drains through the B port. This operative condition extends the skid shoe cylinders 616, 617. This in turn closes valve 605 to stop diverting flow to the return line 610 and there is no change in speed of the rotary end divider drive system 602. When the control valve 618 is switched by the operator to the other operative valve position, like 531B, the control valve 618 reverses the flow through the A and B ports to pressurize the B port and drain the A port and thereby retract the skid shoe cylinders 616, 617.

After the skid shoe plate 94 elevations are set, the operator turns off the skid shoe cylinders 616, 617 by actuating the control valve 618 back to the neutral valve position, like 531N, which locks the skid shoe cylinders 616, 617 by the counterbalance valve unit 619. Further, valve 605 opens to divert priority flow of pressure fluid from valve 608 to return line 610.

Figure 44D:
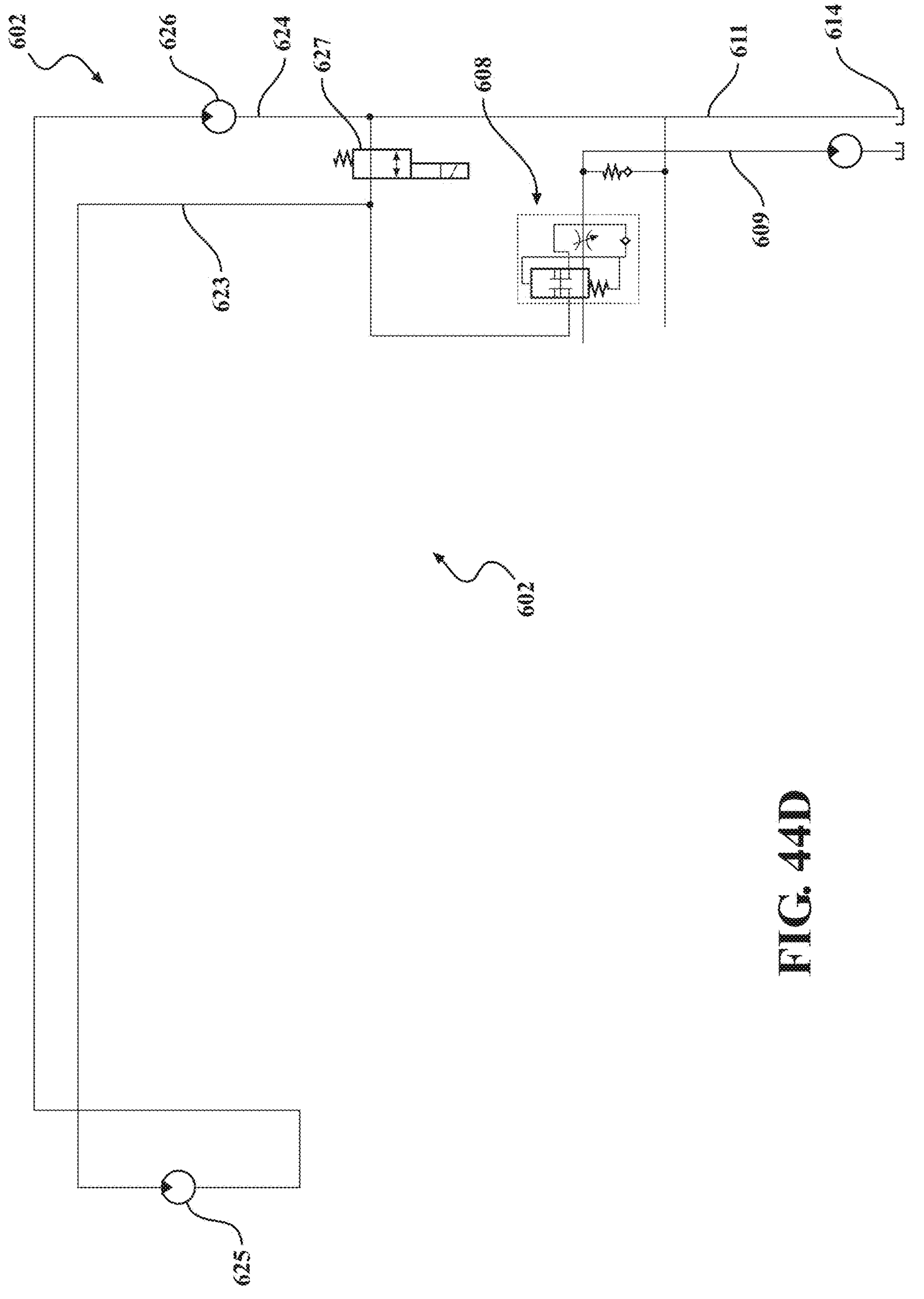
Figure 44E:
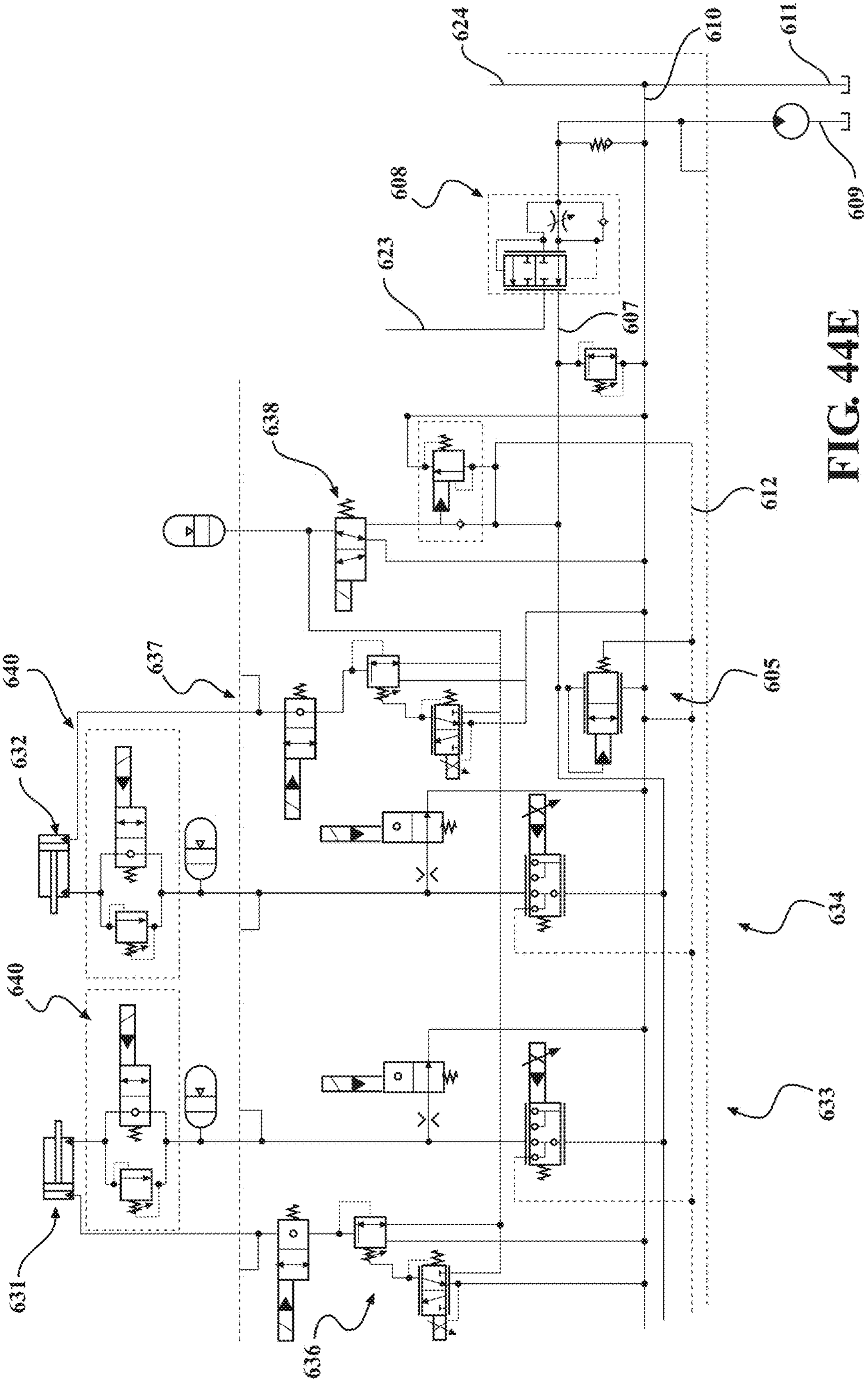

Next, as to FIGS. 44A and 44D, the end divider drive system 602 optionally may be provided on the header 10 to lift downed crop to aid in down crop conditions. The end divider drive system 602 operates cooperatively with the skid shoe lift system 603 and the float control system 604 in substantially the same manner as previously described herein, wherein priority is given to the skid shoe lift system 603 and the float control system 604. The end divider drive system 602 is fed by the supply line 623, which connects to the priority flow control valve 608. The end divider drive system 602 also connects to the return line 611 through pressure line 624, which returns the pressure fluid to a fluid tank 614 or other component of the main hydraulic system.

The priority flow control valve 608 is an adjustable flow regulator valve that serves as a priority flow regulator. As such, the priority flow control valve 608 supplies a set amount of pressure fluid to the skid shoe lift system 603 and the float control system 604, without affecting the flow of fluid to the rotary end divider system 602 as long as the input flow P is greater than the priority flow X, for example 3 gpm.

The speed of the hydraulic motors 625, 626 is governed by the supply of hydraulic fluid supplied throughout the priority flow control valve 608. When the priority flow control valve 608 is fully open to the end divider supply line 623, the hydraulic motors 625, 626 operate at full speed, but the priority flow control valve 608 is also variable so that the motor speed may be reduced by the priority flow control valve 608, as described below. In this embodiment of the end divider drive system 602, the solenoid-controlled valve 627 is provided between the pressure lines 623, 624, wherein the valve 627 is normally closed but may be opened when energized. The main function/intent of this valve 627 is to bypass the rotary end divider drive system 602 when the rotary end dividers are not installed, as the end dividers are an optional feature that may or may not be installed on the header 10, or if the end dividers are installed but not needed and are therefore turned off with valve 627.

The priority flow control valve 608 also supplies pressure fluid to the supply line 607 to operate the skid shoe lift system 603 (described above) and the float control system 604. In more detail in FIGS. 44E-44G, this embodiment incorporates the hydraulic float system 102. The float control system 604 is functionally similar to the float control system 551 to permit hydraulic float, but also pressurizes both sides of the float cylinders 631, 632 to reduce static float pulses and further improve dynamic friction responsiveness. Since pressure is controlled to both sides of the pistons in the float cylinders 631, 632, more uniform movement of the cylinder rod and piston is achieved, and it is easier to change directions. Therefore, less load is required on the skid shoe plates 94 to move the side wing sections 18.

In more detail, the float cylinders 631, 632 are preferably controlled in one direction by circuit valve units 633, 634, which control pressure fluid to the rod sides of these respective float cylinders 631, 632 for retraction thereof. The float control system 604 also includes circuit valve units 636, 637 and a pressure supply unit 638, which supplies pressure fluid to the circuit valve units 636, 637 for extension of these float cylinders 631, 632. A load sense feature is also included to stabilize operation. It is to be understood that the term "units" may encompass one or more flow control devices operatively connected to perform the functions disclosed herein. It is to be further understood that other flow control devices may be provided in place of, or in addition to, the disclosed flow control devices to perform these functions and operate the float cylinders 631, 632. In the broadest sense, the disclosed configuration of flow control devices performs the function of providing a hydraulic float feature to the float cylinders 631, 632.

Figure 44F:
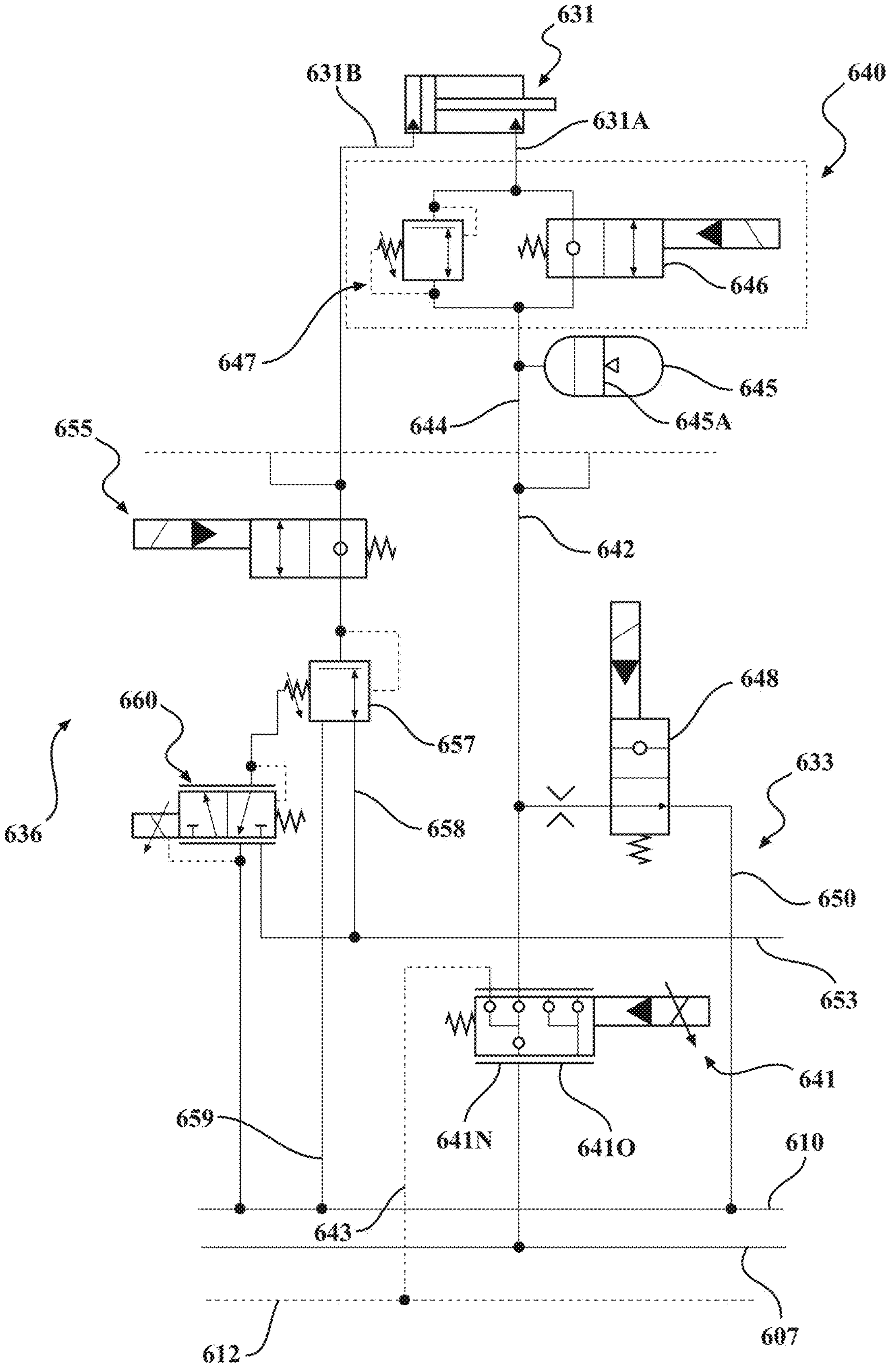

The float control system 604 controls operation of the LH float cylinder 631 (FIGS. 35E and 35F) and the RH float cylinder 632 (FIGS. 35E and 35G) and allows the float cylinders 631, 632 to float as described previously. Generally, the float cylinder 631 connects to pressure lines 631A, 631B that respectively connect to the circuit control valves 633, 636 as illustrated in FIG. 44F. Further, the float cylinder 632 connects to pressure lines 632A, 632B that respectively connect to the circuit control valves 634, 637 as illustrated in FIG. 44G.

Figure 44G:
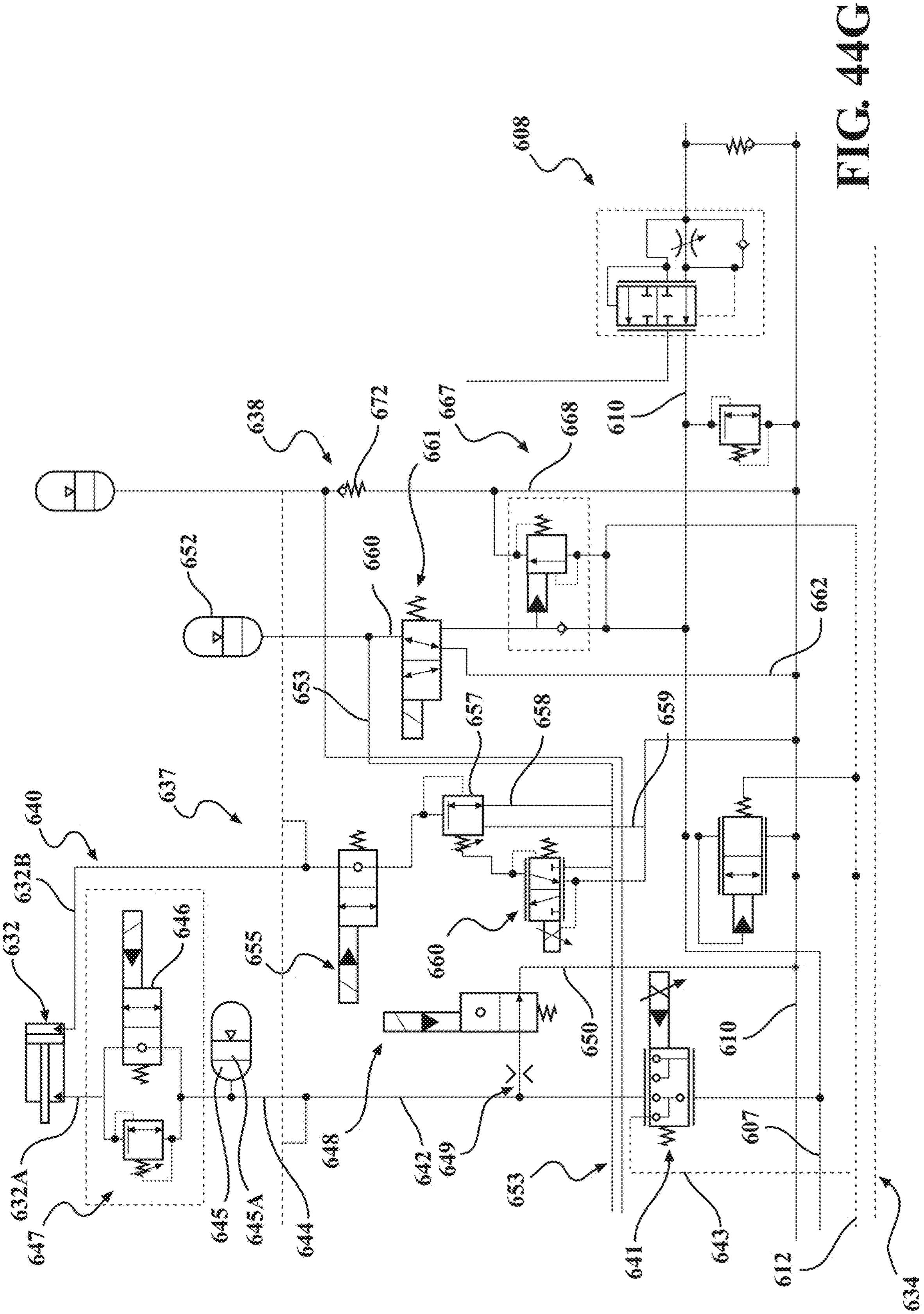
Figure 45:
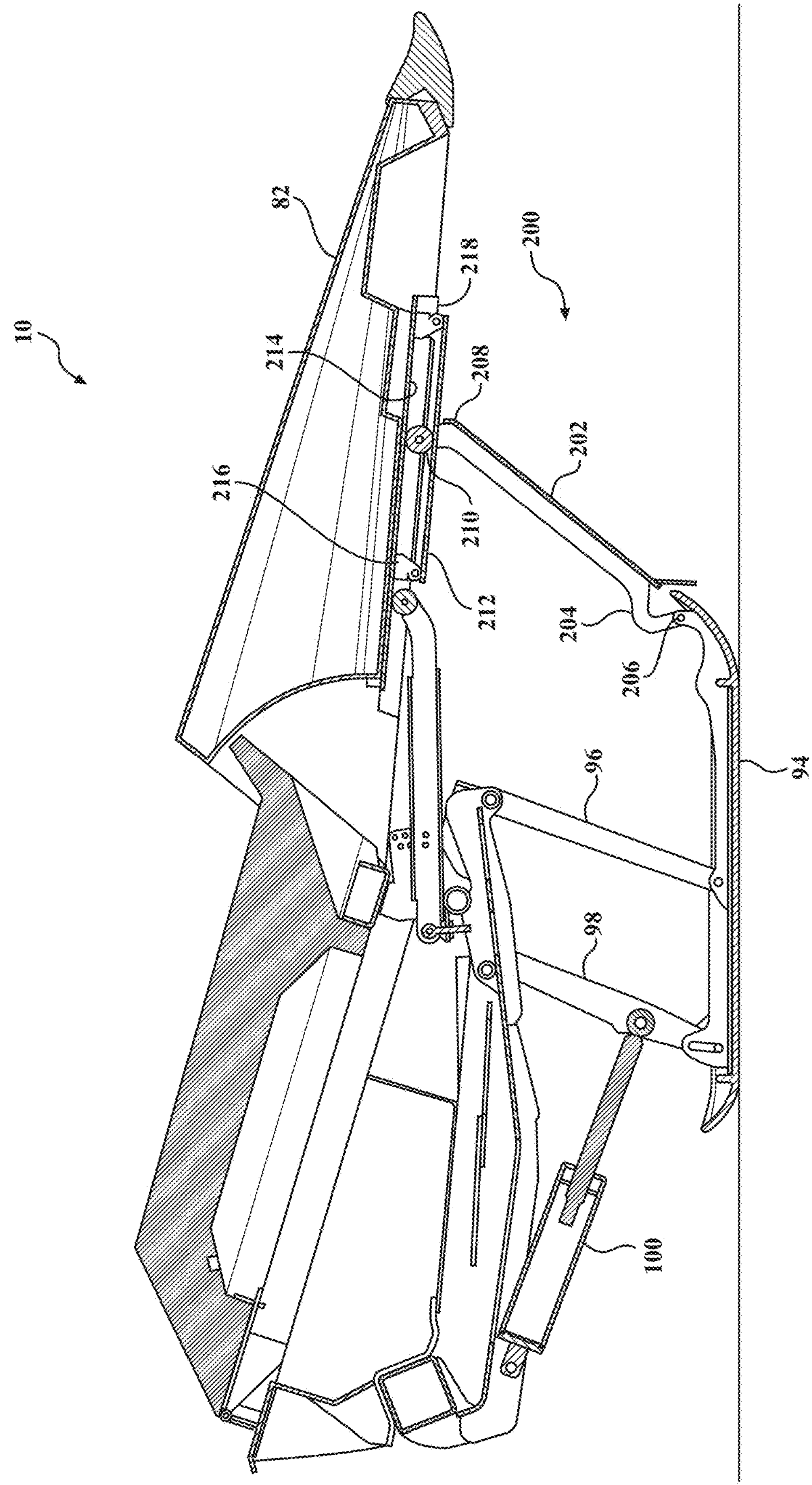
FIG. 45 is a fragmentary side view of the header showing the skid shoe assembly in an extended position and a stalk deflector between the skid shoe and snout.
Figure 46:
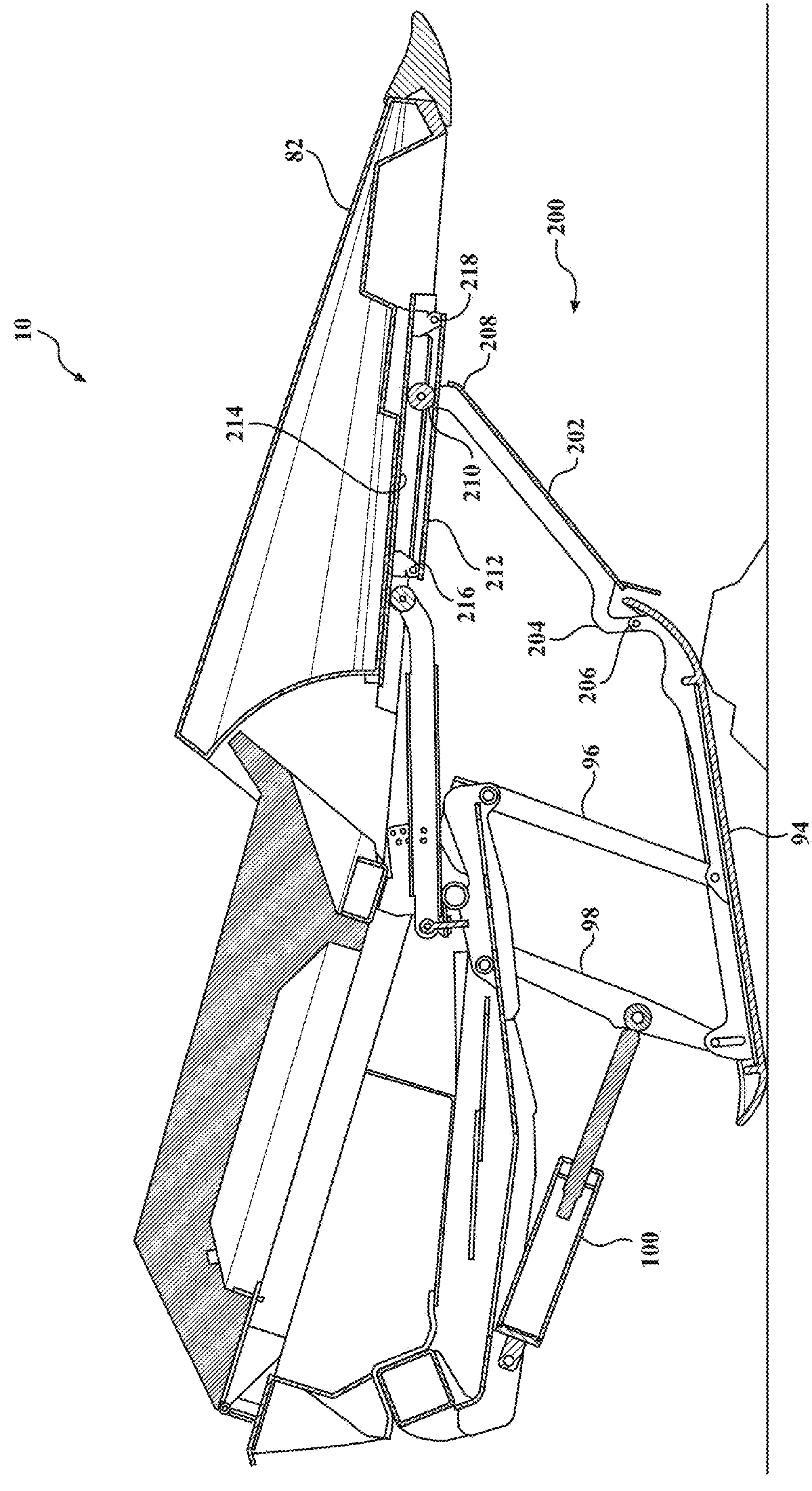
FIG. 46 is a fragmentary side view of the header showing the stalk deflector position when the skid shoe engages an obstacle in the field.
Figure 47:
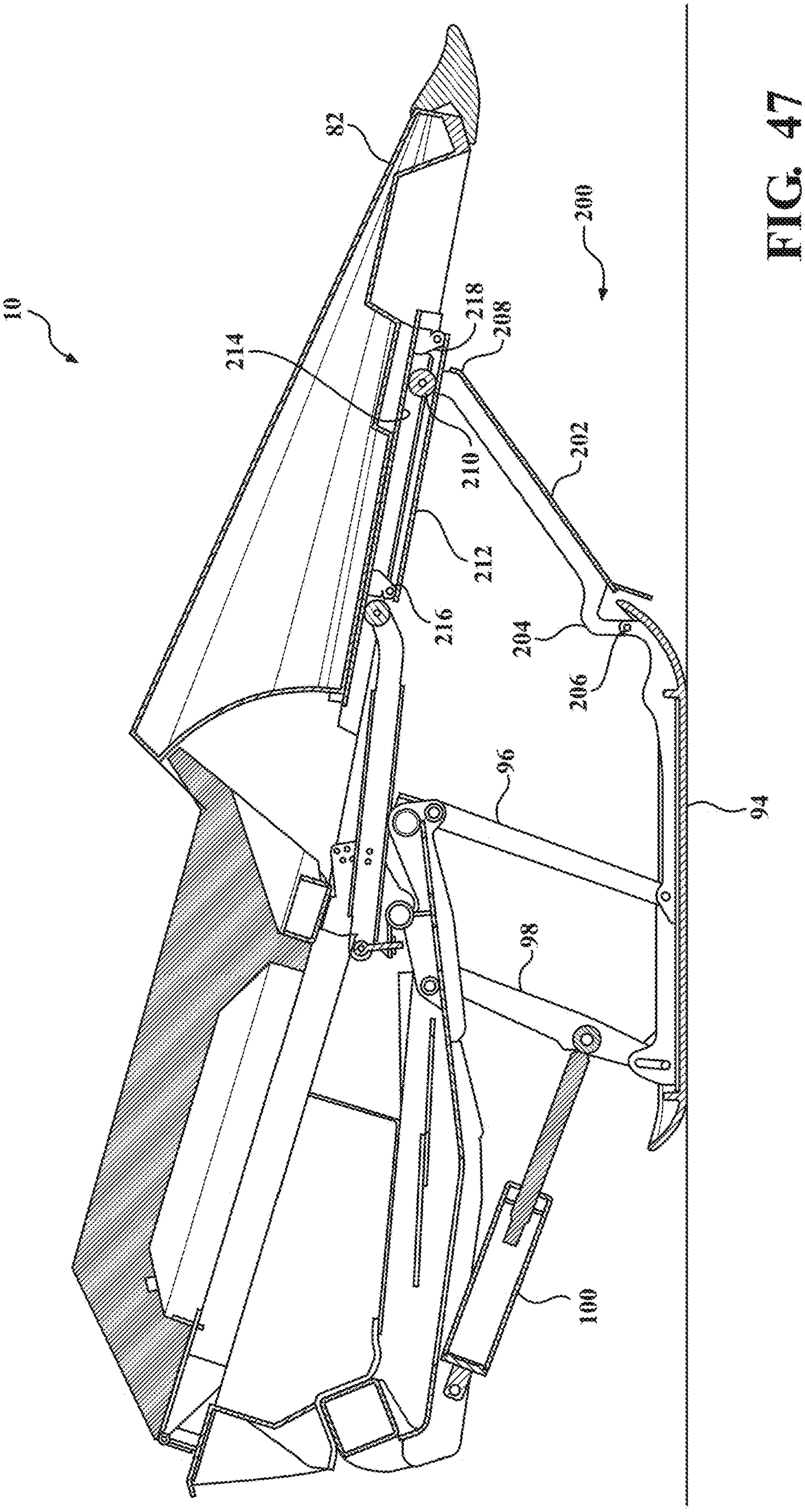
FIG. 47 is a fragmentary side view of the header showing the stalk deflector as the skid shoe lowers the header.
Figure 48:
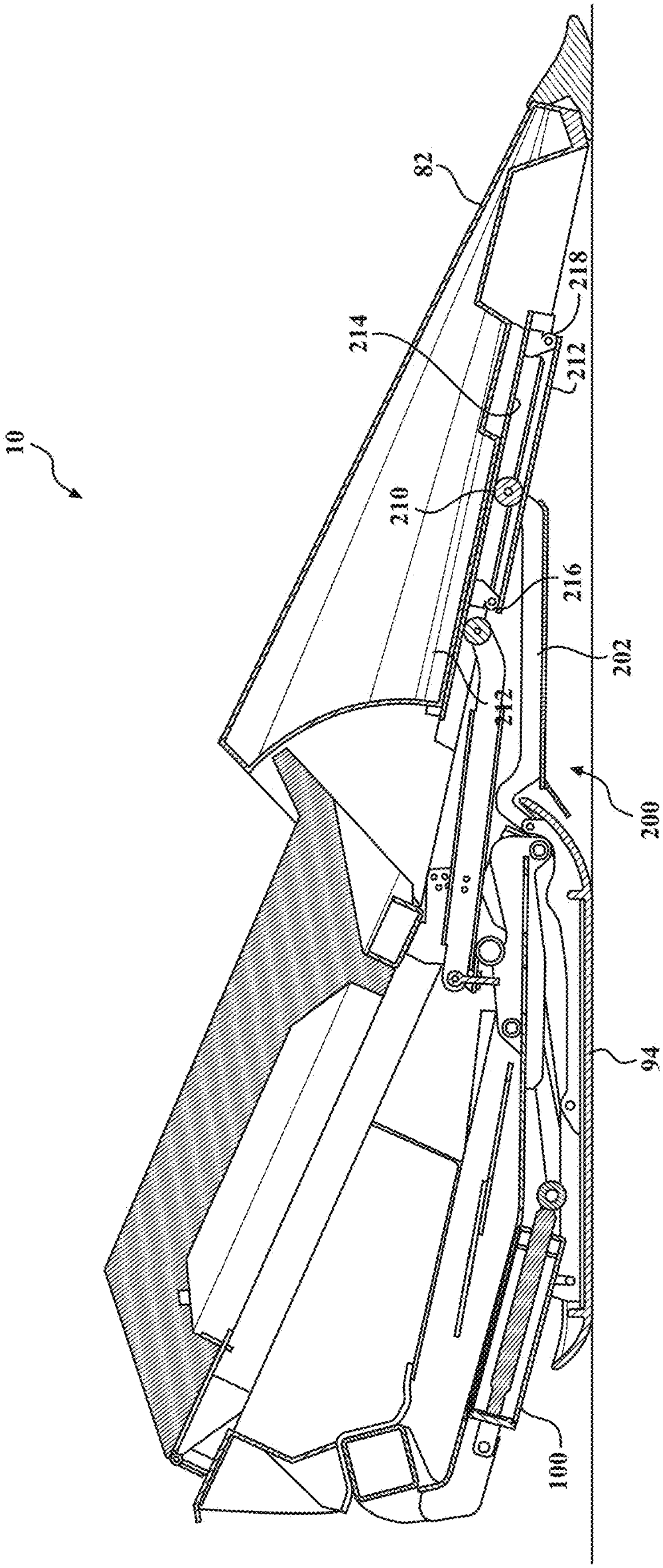
FIG. 48 is a fragmentary side view of the header showing the stalk deflector position with the skid shoe fully retracted.
Figure 49:
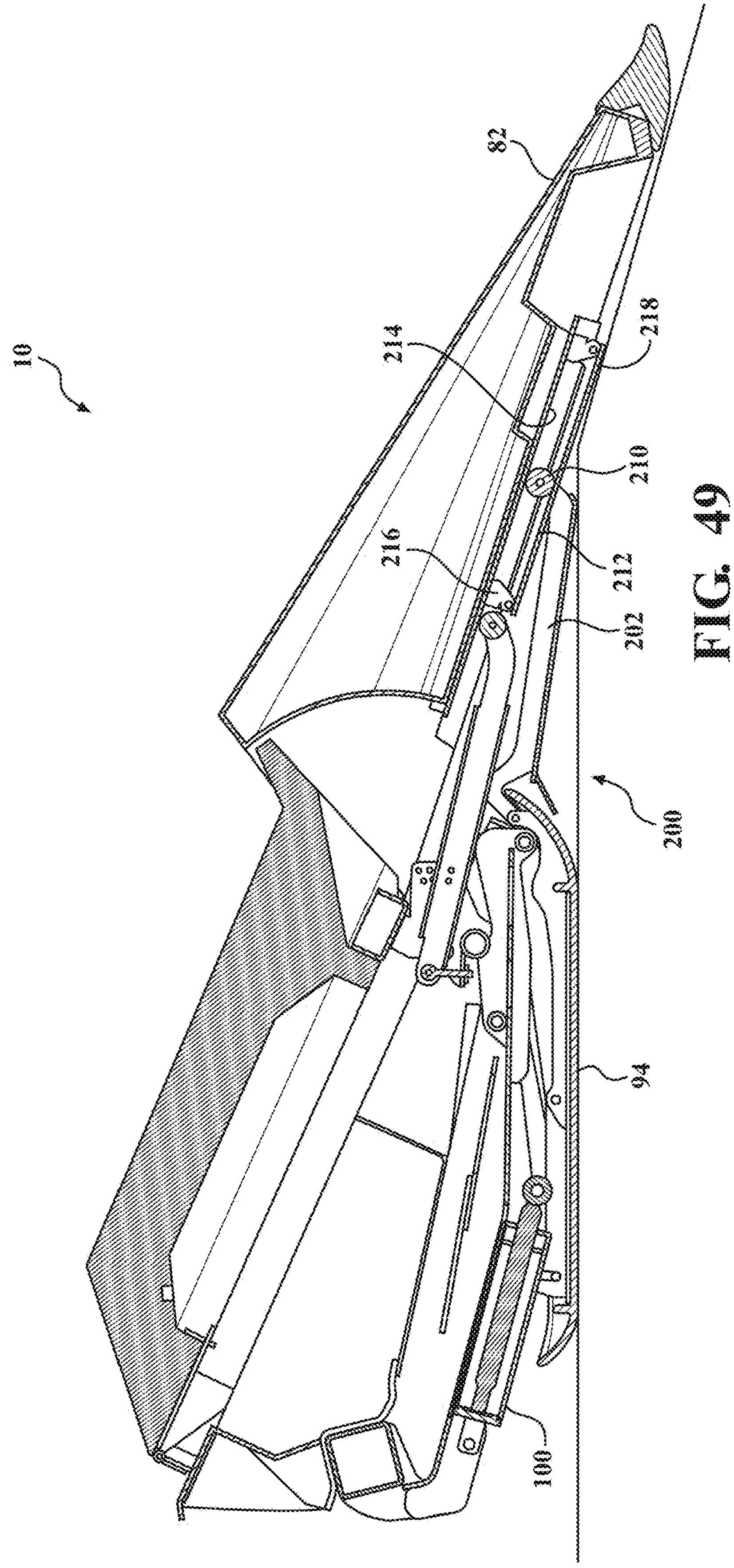
FIG. 49 is a fragmentary side view of the header showing the stalk deflector allowing the snout to pivot relative to the skid shoe.
Figure 50:
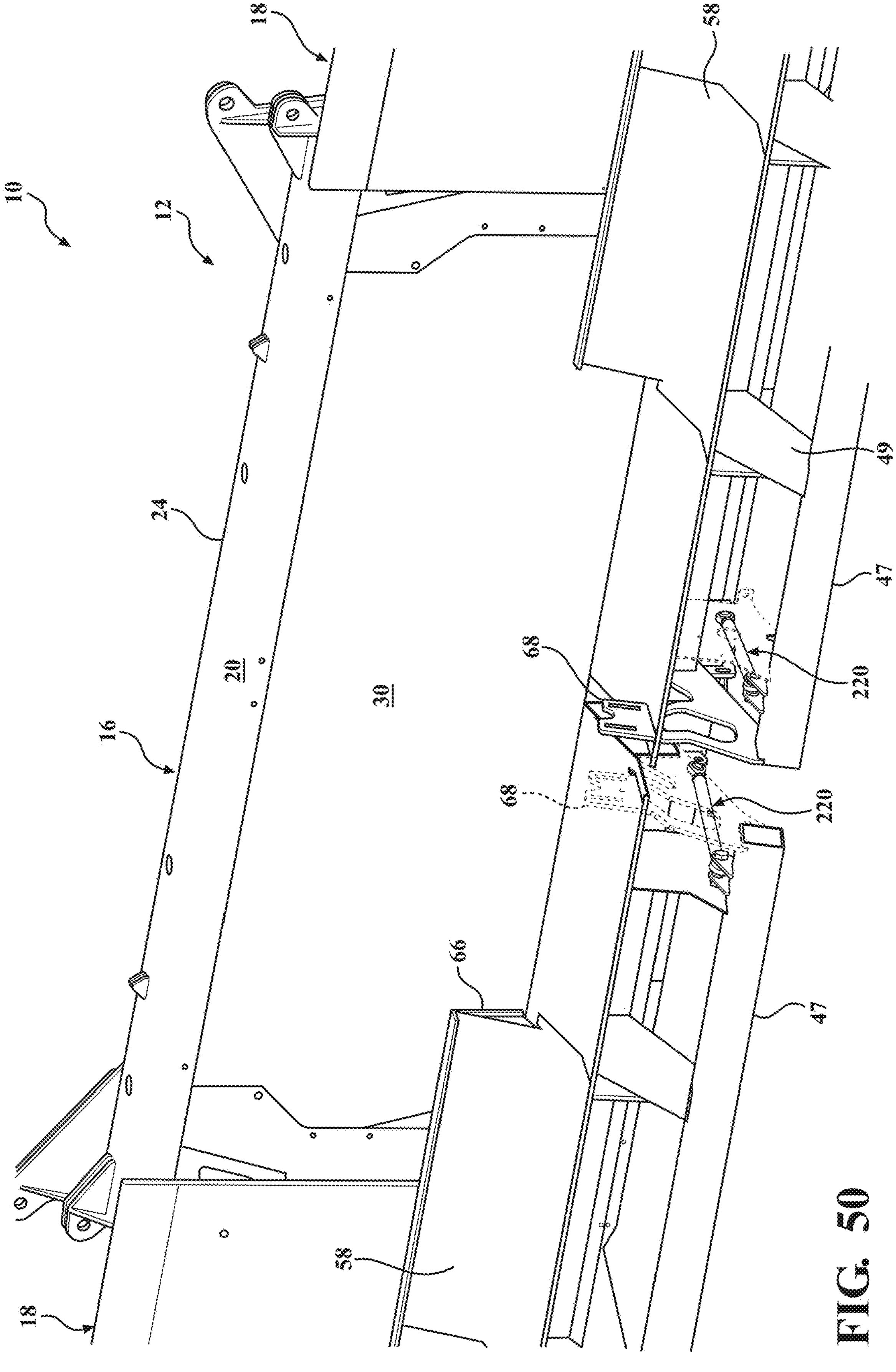
FIG. 50 is a fragmentary perspective view of the header with draft links coupling the center section and wing sections.
Figure 51:
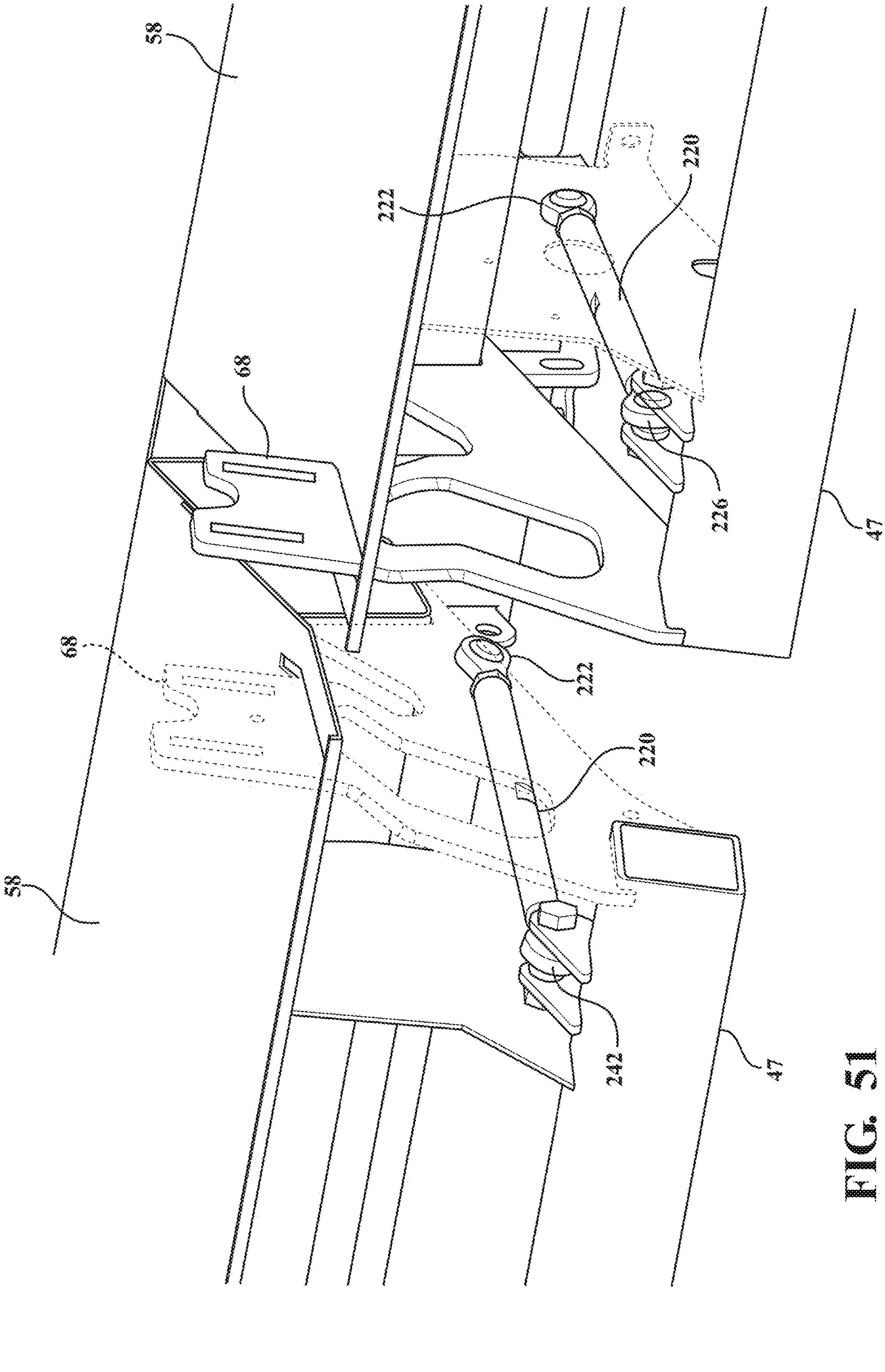
FIG. 51 is an enlarged perspective view of FIG. 50.
Figure 52:
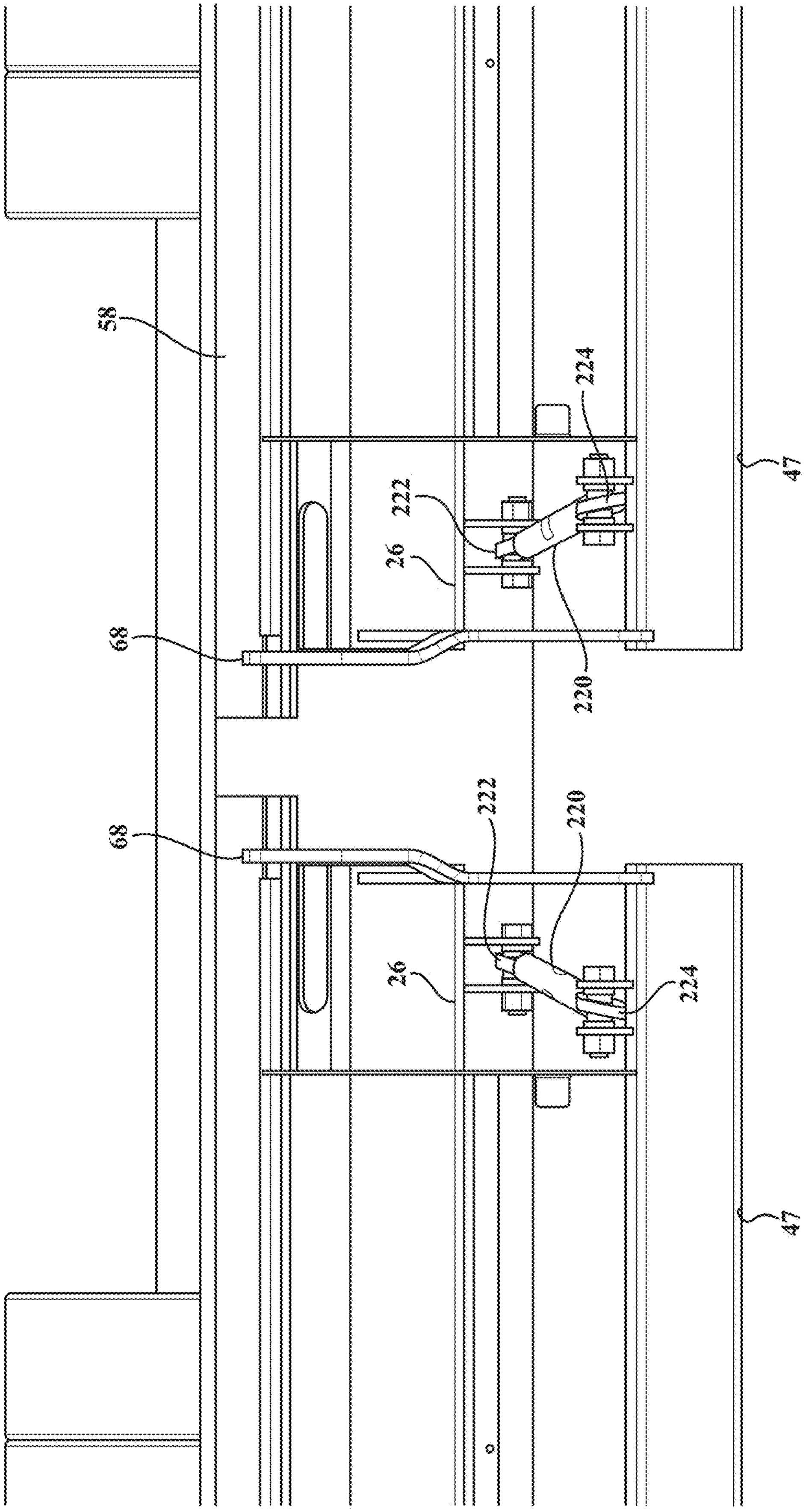
FIG. 52 is a fragmentary front view of the draft links coupling the center section and wing sections.
Figure 53:
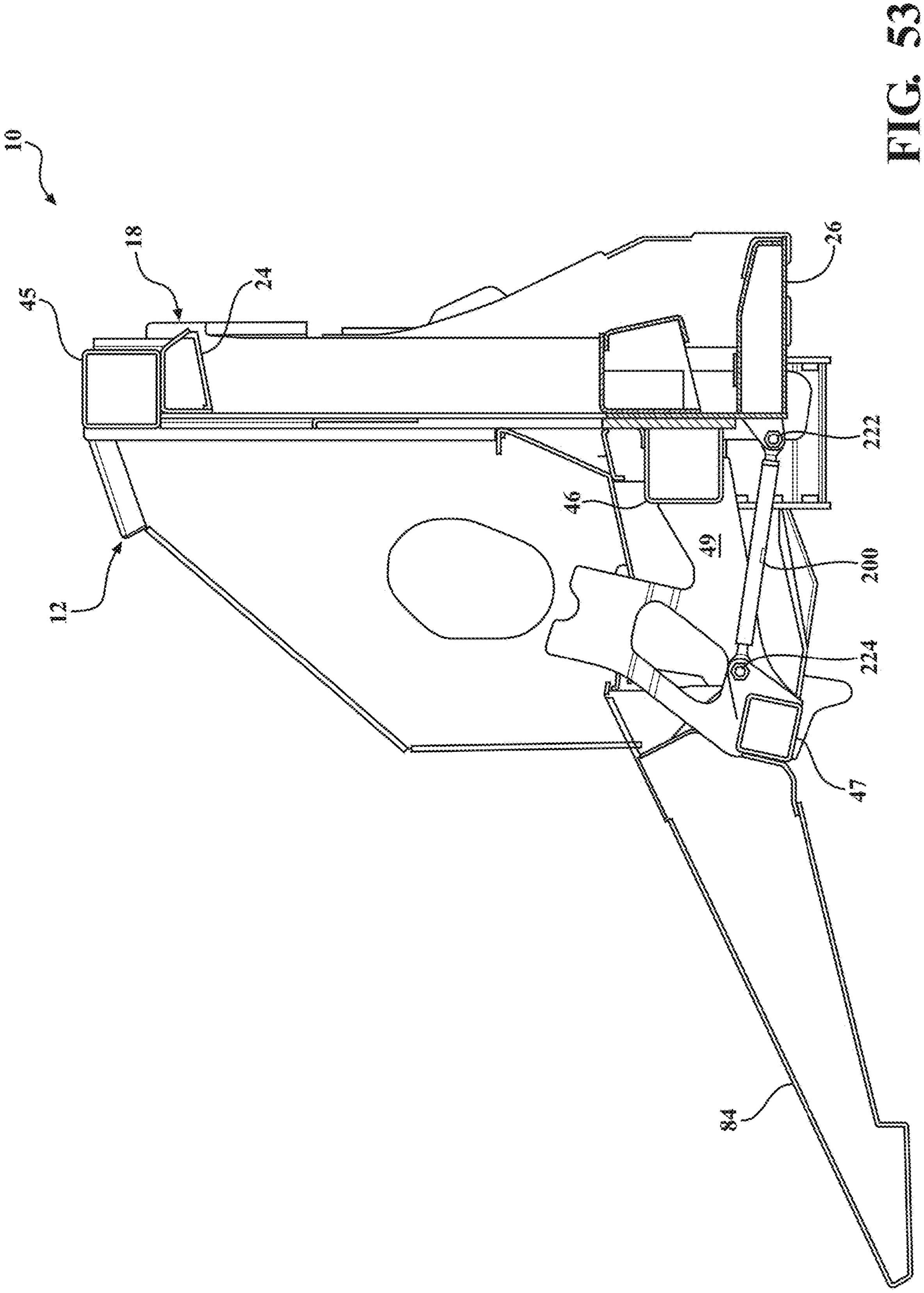
FIG. 53 is a side view of the draft links coupling the center section and wing section.

Referring in more detail to the float cylinders 631, 632 and circuit valve units 633, 634 of FIGS. 44F and 44G, common components are used and identified by common reference numerals. For simplicity, the following disclosure primarily references the float cylinder 631 and circuit valve unit 633 of FIG. 44F, with it being understood that this disclosure also applies to the common components of FIG. 44G.

As noted above, the float control system 604 is configured for the hydraulic float system 102 configuration, wherein the circuit valve unit 633 is coupled to an accumulator unit 640 that allows for float of the side wing sections 18. In this configuration, the float cylinders 631, 632 are configured to be pressurized to retract and thereby carry the weight of the side wing sections 18 and raise the side wing sections 18 to a desired height. The float cylinders 631, 632 also may be actuated to extend under the weight of the side wing sections 18 to lower the side wing sections 18.

As to the circuit valve unit 633 (and also the circuit valve 634), the circuit valve unit 633 includes a normally-closed, solenoid-operated control valve 641 that is connected on the upstream side to the supply line 607 and a downstream side to a pressure line 642. The control valve 641 also connects to a load sense line 643 that communicates with the main load sense line 612. In the neutral valve position 641N, all ports are essentially closed. When the float cylinder 631 is to be retracted, the circuit valve 641 is actuated to the operative open position 641O, which supplies pressure fluid to pressure line 642 and pressurizes the load sense line 643.

The pressure line 642 connects to a further supply line 644, which in turn supplies pressure fluid to the accumulator unit 640. The accumulator unit 640 comprises an accumulator 645 that is pressurized by the pressure fluid. The accumulator 645 also has been charged with a charging fluid on the opposite of a bladder 645A or other interface, which maintains fluid pressure while allowing flow of pressure fluid into and out of the accumulator 645. Between the accumulator 645 and float cylinder 631, a solenoid-operated control valve 646 is provided. The solenoid-operated control valve 646 is normally closed in the neutral position to prevent reverse fluid flow away from the float cylinder 631. When actuated to the second open position, the control valve 646 allows two-way flow between the float cylinder 631 and accumulator 645, wherein the two-way flow allows the side wing sections 18 to float and return to their set elevation in response to the fluid pressure maintained by the accumulator 645. Therefore, the primary purpose of the control valve 646 is to lock the side wing sections 18 such as when the header is shut off, or power is lost (safety).

The accumulator unit 640 is also provided with a relief valve, or sequence valve, 647 that is normally closed but opens automatically in response to increased fluid pressure to thereby limit pressure within the float cylinder 631. The primary purpose for the relief valve 647 is to counteract changes in temperature and fluid expansion thereof when the locking valves (655, 646) are closed. The accumulator 645 is then used in this instance to store any fluid that is relieved over valve 647 since it cannot escape at this point. In accord with the foregoing disclosure of prior embodiments, the two-way flow between the float cylinders 631, 645 provides for hydraulic float of the side wing sections 18.

As previously mentioned, the elevation of the header 10 is set by the skid shoe assemblies 36, wherein the float cylinders 631, 632 take weight off the side wing sections 18 and therefore adjust the load on the skid shoe plates 94. This provides advantages over the float control system 551 described above in FIGS. 43A-43C.

Further, extension of the float cylinders 631, 632 also requires that pressure fluid on the rod side be drained away through a controlled or restricted flow to the return line 610, since the control valve 641 is closed during cylinder extension and the volume of fluid on the rod side will be reduced. Yet, at the same time, the fluid pressure is maintained within the accumulator 645 and the pressure lines 631A, 644, 642. Therefore, the pressure line 642 also connects to a solenoid-operated control valve 648 that is normally open when deenergized, but that closes when energized. As previously referenced above, the accumulators 645 can accommodate all of the fluid from the pressure cylinders 631 and 632 during normal operation, wherein the return line 610 is installed (along with valves 648) to drain the accumulators 645 when the header 10 is disconnected from the combine, or power is lost (safety) so that service on the accumulators 645 or related valves/hoses can be done safely.

The control valve 648 receives pressure fluid through a constricted orifice 649 on the upstream side and drains fluid through drain line 650 to the main drain line 610. The control valve 648 is configured to hold load when closed. During cylinder retraction, the circuit valve 641 opens to supply pressure fluid, wherein the control valve 648 is in a closed condition to prevent drainage to the tank line 650 while the control valve 646 is in the opened condition to supply the float cylinder 631 and retract same. However, as mentioned, the float cylinders 631 and 632 can both extend and retract due to the flow of fluid into and out of the accumulators 645 during combine operation. When the side wing sections 18 are adjusted and the load on the skid shoe plates 94 is set, the control valve 648 is closed and the closed control valve 648 holds pressure while the accumulator 645 allows the float cylinder 631 to float.

When the side wing sections 18 are to be adjusted by extending the float cylinder 631, a restricted volume of pressure fluid flows into the pressurized accumulator 645. Further, the accumulator 645 may drained for storage and service of the header 10 by opening the control valve 648, which allows a controlled, constricted flow through the orifice 649. Once the side wing sections 18 have been adjusted, the control valve 648 can be closed to hold pressure and hold the side wing section load, which can still float due to the fluid response provided by accumulator 645. Both the control valve 648 and the control valve 641 are preferably configured as load-hold valves to hold the side wing section 18 elevation.

In the event of a loss of power, the control valve 646 automatically closes and is configured to hold the pressure load from the float cylinder 631. This configuration thereby prevents the float cylinder 631 from dropping the side wing section 18 under power loss. The control valve 648 is also configured to actuate and open upon power loss, which allows for constricted release of the fluid pressure in the accumulator 645 and pressure line 642 to the drain line 650. Alternatively, the control valve 648 may remain closed when deenergized to keep the accumulators 645 pressurized when the combine is turned off and not allow fluid to flow back to the reservoir unless "service mode" is selected by the operator or a manual override is selected to open the valve 648 for service of the header.

To extend the pressure cylinder 631, the circuit valve unit 636 is provided to control the flow of pressure fluid into the piston side of the pressure cylinder 631. The circuit valve unit 636 preferably receives a pressurized supply of fluid from the accumulator unit 638, which comprises a supply accumulator 652 that supplies and maintains pressure fluid in a downstream pressure line 653, which in turn supplies pressure fluid to the circuit valve unit 636. The accumulator unit 638 is described in further detail below.

Turning first to the circuit valve unit 636, the circuit valve unit 636 includes a load-holding control valve 655 that is normally closed but is openable to supply pressure fluid to the piston side of the float cylinder 631 to extend same. When closed, the control valve 655 can hold reverse flows and retraction of the float cylinder 631 but allow limited forward flows. Therefore, when adjusting the side wing section 18 elevations, the control valve 655 can be opened to pressurize and more easily extend the float cylinder 631 to overcome friction therein. When retracting the float cylinder 631, the control valve 655 is also open to allow fluid flow out of the pressure cylinder 631.

Since the fluid cylinder 631 is pressurized on both of the rod and piston sides, the circuit valve unit 636 also includes pressure regulating components that regulate the flow into and out of the piston side of the pressure cylinder 631 to adjust for the fluid flow on the rod side thereof. In this regard, the circuit valve unit 636 includes a flow control valve 657 that connects to supply pressure through pressure line 658 and drains through drain line 659. The flow control valve 657 is normally open to the pressure supply but may open to the drain line 659 in response to the fluid pressures in the pressure lines during extension and retraction of the float cylinder 631. A pressure regulating valve 660 is also provided. As such, when the float cylinder 631 is being extended, pressure fluid is supplied to the piston side of the float cylinder 631, while a constricted flow of pressure fluid drains from the rod side as described above while the pressure of the first accumulator 645 is maintained during extension.

During cylinder retraction, a regulated flow of pressure fluid flows out of the pressure cylinder 631 through the flow control valve 657 to drain pressure fluid while maintaining the fluid pressure in the second accumulator 652. During float, the float cylinder 631 may both extend and retract, wherein the accumulators 645, 652 on both the rod and piston sides of the pressure cylinder 631 are able to compensate for this movement and assist in overcoming dynamic friction within the float cylinder 631.

To control the supply of pressure fluid to the accumulator 652, the accumulator 652 is pressurized by supply line 660, which is controlled by a double blocking control valve 661. The control valve 661 is open to the drain line 662 when deenergized but is open to the supply line 662 when energized. When deenergized under control or due to power loss, the control valve 661 shifts to close the supply flow and drain pressure through the drain line 662. If this occurs under a power loss condition, the above-described control valve 655 would also close to hold pressure within the pressure cylinder 631 and hold the side wing section 18 elevation. Alternatively, the control valve 661 may similarly remain closed when deenergized under control or due to power loss, keeping the accumulator 652 charged when electrical power is removed. The accumulator 652 will then drain only if "service mode" is selected by the operator or manual override is actuated to allow service to the header without a combine.

The system also includes an unloading valve 667 which allows a flow to pressure line 662. When the control valve 661 is open, the pressure fluid flows therethrough, but when closed, the pressure fluid flows to drain line 668. The valve 667 is primarily provided to charge the accumulator 652 with hydraulic fluid to a set pressure. Once the set pressure is reached, the pilot line in valve 667 shifts the valve 667 so all remaining flow is diverted to line 668.

In this float control system 604, the float control cylinders 631, 632 can float to allow the elevation for the side wing sections 18 to vary in response the skid shoe plates 94 as they move through the field. By pressurizing both sides of the float control cylinders 631, 632 a more uniform cylinder actuation is achieved while still allowing for hydraulic float of the side wing sections 18.

Finally, as shown in FIG. 44G, an additional accumulator 670 and check valve 672 may also be connected in line to the pressure reducing/relieving valve 667 and tank return line 610 to isolate the valve 670 from pressure spikes when any of the other accumulators 645, 652 are drained back to tank 614.

The invention has been described in an illustrative manner, and it is to be understood that the terminology which has been used is intended to be in the nature of words of description rather than of limitation. Directional references employed or shown in the description, Figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A row crop header for harvesting crop in a field, the header comprising:

a header frame extending between opposite ends, wherein a vertical line (V) bisects the header frame substantially equidistant between the opposite ends, the header frame including a center section adapted to removably couple the header to a harvester and a pair of side wing sections operatively coupled to the center section;

the center section including a top portion and a bottom portion extending laterally between a pair of opposing side edges;

each of the side wing sections includes an upper support beam and lower support beam, wherein the upper support beam extends laterally between a pair of inner and outer support members and the lower support beam extends laterally from the outer support member, intersects the inner support member and terminates along the bottom portion of the center section adjacent the vertical line (V);

an upper link pivotally coupled between the center section and each one of the side wing sections adjacent the top portion and upper support beam;

a lower link pivotally coupled between the center section and each one of the side wing sections adjacent the bottom portion and lower support beam;

wherein the upper links and lower links provide independent pivotal movement of the side wing sections relative to the center section to contour to the surface of the field.

2. The row crop header as set forth in claim 1 further including a float system operatively coupled between the center section and each one of the side wing sections to adjust the weight of the side wing sections on the surface of the field.

3. The row crop header as set forth in claim 2 wherein the float system includes a hydraulic cylinder extending between the center section and each one of the side wing sections.

4. The row crop header as set forth in claim 3 wherein each hydraulic cylinder includes a first end coupled to the inner support member of the side wing section and an opposite second end coupled to the center section above the upper link.

5. The row crop header as set forth in claim 2 wherein the float system includes a spring attachment arm extending between a medial end pivotally coupled to each side edge of the center section to an opposite terminal lateral end.

6. The row crop header as set forth in claim 5 wherein the float system includes a spring extending between the lateral end of the spring attachment arm and lower support beam of each side wing section for supporting the weight of the side wing section from the center section.

7. The row crop header as set forth in claim 6 wherein the float system includes a hydraulic cylinder extending from each spring attachment arm between the medial and lateral ends thereof to the corresponding side edge of the center section for pivoting the spring attachment arms relative to the center section and thereby adjusting the position of the spring to regulate the spring force and weight of the side wing sections on the surface of the field.

8. The row crop header as set forth in claim 4 or 7 further including a locking link selectively extending between the center section and each of the side wing sections for locking the pivotal position of the side wing section relative to the center section.

9. The row crop header as set forth in claim 8 wherein each of the side wing sections including a second lower support beam spaced forward of the first lower support beam and fixedly coupled there by a plurality of intermediate supports extending therebetween.

10. The row crop header as set forth in claim 9 further including an auger assembly comprising an auger pan extending the first lower support beams and intermediate supports of each side wing section and extending between a lateral end and a medial end disposed adjacent the vertical line of the center section.

11. The row crop header as set forth in claim 10 further including a flexible material extending between the medial ends of each auger pan to allow the auger pans to independently pivot with the respective side wing sections.

12. The row crop header as set forth in claim 11 wherein each auger pan has a generally arcuate shape with a rear cutout portion disposed adjacent the medial end to allow crop to enter an aperture in the center section for transport to the harvester.

13. The row crop header as set forth in claim 12 wherein the auger assembly includes an auger rotatably supported above each auger pan of the side wing sections to transfer cut crops through the aperture in the center section.

14. The row crop header as set forth in claim 13 further including a plurality of row units pairs extending forwardly from the second lower support beam of each side wing section and forming a channel therebetween for gathering and cutting the row crops and a conical snout supported above each of the row unit pairs for directing crops into the channels.

15. The row crop header as set forth in claim 14 further including a skid shoe assembly operatively coupled to at least one of the row units adjacent each end of the header frame for maintaining the cut height of the header as the skid shoe assembly engages the surface of the field of crops to be harvested.

16. The row crop header as set forth in claim 15 wherein the skid shoe assembly includes a skid shoe bracket affixed to the row unit, a skid shoe plate for engaging the surface of the field of crops to be harvested, and front and rear attachment arms extending between the skid shoe bracket and skid shoe plate for rotatably adjusting the position of the skid shoe plate relative to the skid shoe bracket between a retracted position engaged against the bracket to an extended position spaced downwardly from the bracket.

17. The row crop header as set forth in claim 16 wherein the skid shoe assembly further includes a hydraulic cylinder extending between the skid shoe bracket and the rear attachment arms for automatically rotating the front and rear attachment arms and move the skid shoe plate between the retracted and extended positions relative to the side wing sections thereby adjusting the cutting height of the header.

18. The row crop header as set forth in claim 17 wherein the skid shoe plate includes a vertically-elongated slot for slidably receiving lower portions of the rear attachment arms to allow the skid shoe plate to pivot relative to the rear attachment arms when engaging with objects in the field of row crops to be harvested.

19. The row crop header as set forth in claim 18 wherein the skid shoe assembly further includes a stalk deflector extending between the skid shoe plate and the snout for diverting crops away from the skid shoe front attachment arms, the stalk deflector includes a link extending between a first end pivotally coupled to the skid shoe plate and an opposite second end having a roller slidably received in an elongated slot formed in a bracket in the bottom of the snout, wherein the roller and slot connection of the link allows the skid shoe plate to pivot when encountering objects in the field or when adjusting the height or angular position of the snout relative to the field.

20. The row crop header as set forth in claim 19 further including an longitudinally adjustable draft link extending between a first end pivotally coupled to the bottom portion of the center section and an opposite second end pivotally coupled to the first lower support beam of each one of the side wing sections to stabilize the side wing sections and maintain the position of the auger pans to the aperture in the center section.

* * * * *